(12) United States Patent
Kushida et al.

(10) Patent No.: US 7,620,964 B2
(45) Date of Patent: Nov. 17, 2009

(54) RECOMMENDED PROGRAM SEARCH DEVICE AND RECOMMENDED PROGRAM SEARCH METHOD

(75) Inventors: Takayuki Kushida, Tokyo (JP); Aki Kimura, Tokyo (JP); Eiji Matsuo, Tokyo (JP); Jun Yukawa, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 329 days.

(21) Appl. No.: 11/643,992

(22) Filed: Dec. 22, 2006

(65) Prior Publication Data

US 2007/0174862 A1 Jul. 26, 2007

(30) Foreign Application Priority Data

Dec. 26, 2005 (JP) .............................. 2005-371842
Apr. 13, 2006 (JP) .............................. 2006-110544
Jun. 1, 2006 (JP) .............................. 2006-152976

(51) Int. Cl.
*H04H 60/32* (2008.01)

(52) U.S. Cl. ........................... 725/14; 725/46; 725/100

(58) Field of Classification Search ............... 725/9–21, 725/46, 100
See application file for complete search history.

(56) References Cited

U.S. PATENT DOCUMENTS

| | | | | |
|---|---|---|---|---|
| 5,734,444 A * | 3/1998 | Yoshinobu | .................... | 725/14 |
| 5,754,938 A * | 5/1998 | Herz et al. | .................... | 725/116 |
| 5,926,207 A * | 7/1999 | Vaughan et al. | ............. | 725/139 |
| 6,128,009 A * | 10/2000 | Ohkura et al. | ................. | 725/46 |
| 6,490,724 B1 * | 12/2002 | Ha et al. | .......................... | 725/9 |
| 6,732,367 B1 * | 5/2004 | Ellis et al. | ..................... | 725/27 |
| 6,735,777 B1 * | 5/2004 | Kim | .............................. | 725/44 |
| 7,120,922 B2 * | 10/2006 | Rodriguez et al. | ............ | 725/39 |
| 7,185,355 B1 * | 2/2007 | Ellis et al. | ..................... | 725/46 |
| 2002/0038457 A1 * | 3/2002 | Numata et al. | ................. | 725/47 |
| 2002/0104081 A1 * | 8/2002 | Candelore et al. | .............. | 725/9 |
| 2002/0175953 A1 * | 11/2002 | Lin | ............................ | 345/811 |
| 2002/0188948 A1 * | 12/2002 | Florence | ...................... | 725/46 |
| 2003/0018973 A1 * | 1/2003 | Thompson | .................... | 725/47 |
| 2003/0046696 A1 * | 3/2003 | Mizuno et al. | ................. | 725/46 |

(Continued)

FOREIGN PATENT DOCUMENTS

JP 8-180504 A 7/1996

(Continued)

*Primary Examiner*—Scott Beliveau
*Assistant Examiner*—Nicholas T Corbo
(74) *Attorney, Agent, or Firm*—Birch, Stewart, Kolasch & Birch, LLP.

(57) ABSTRACT

A recommended program search device includes a viewing history information acquiring block which acquires a viewing channel and a viewing time by the user for each area corresponding to a time division and stores viewing history information including the viewing channel and the viewing time that are associated with each area in the storage, a program information acquiring block which acquires scheduled broadcast program information, including program time information enabling calculation of a program start time and a program broadcast time for a scheduled broadcast program and channel information about the scheduled broadcast program, and a search block which determines a user's favorite program from the scheduled broadcast program on the basis of a result of comparison between the program time information and the channel information included in the scheduled broadcast program information and the viewing channel and the viewing time stored in the storage.

24 Claims, 42 Drawing Sheets

U.S. PATENT DOCUMENTS

2004/0068741 A1 * 4/2004 Kimura .................. 725/46

FOREIGN PATENT DOCUMENTS

| JP | 2001-275048 A | 10/2001 |
| JP | 2002-288210 A | 10/2002 |
| JP | 2005-86324 A | 3/2005 |
| JP | 2005-109924 A | 4/2005 |
| JP | 2005-269162 A | 9/2005 |
| JP | 2005-286743 A | 10/2005 |
| JP | 2005-352754 A | 12/2005 |

* cited by examiner

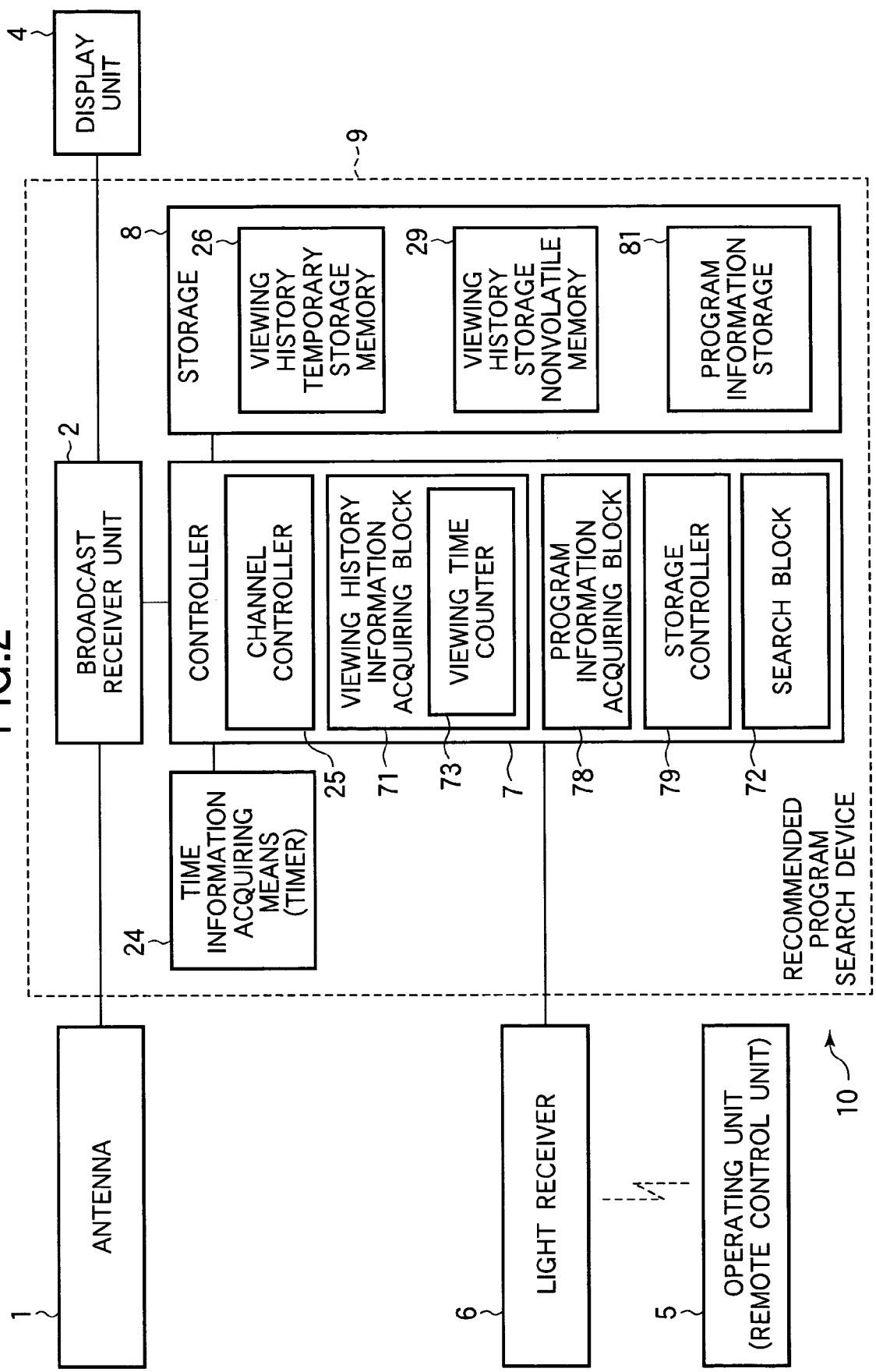

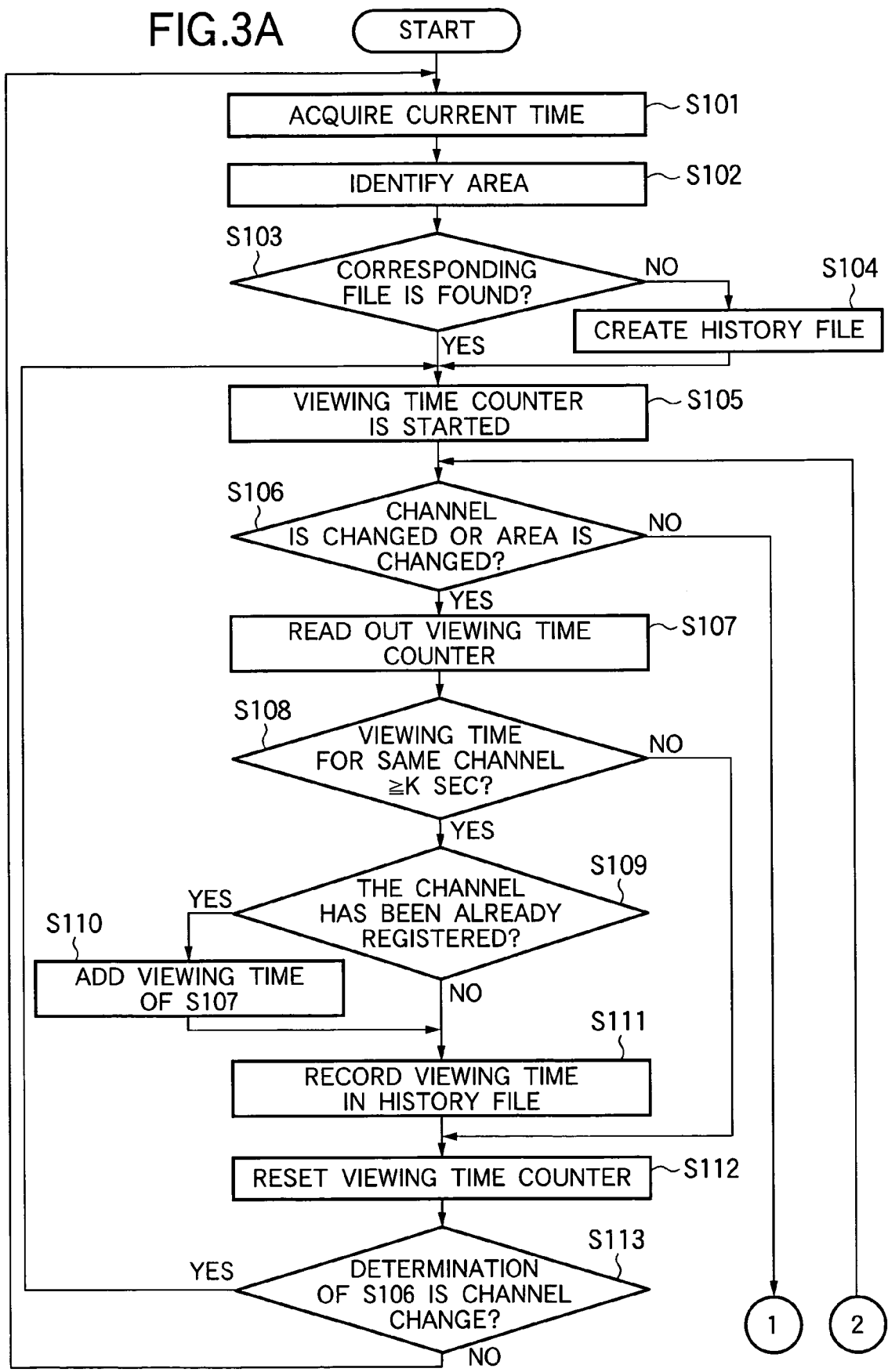

FIG.10

| CHANNEL | NETWORK ID | SERVICE ID |
|---------|------------|------------|
| 1 | TR | 41 |
| 2 | BS | 103 |
| ... | ... | ... |
| 299 | | |

MAX 300CH (rows)

4 byte

FIG.11

| CHANNEL | 1 WEEK AGO | 2 WEEKS AGO | 3 WEEKS AGO | 4 WEEKS AGO | 5 WEEKS AGO | 6 WEEKS AGO | 7 WEEKS AGO |
|---------|------------|-------------|-------------|-------------|-------------|-------------|-------------|
| 1 | 1 | 0 | 0 | 10 | 10 | 10 | 0 |
| 2 | 3 | 5 | 10 | 0 | 0 | 0 | 0 |
| 3 | 6 | 5 | 0 | 0 | 0 | 0 | 10 |
| ... | ... | ... | ... | ... | ... | ... | ... |
| 299 | 0 | 0 | 0 | 0 | 0 | 0 | 0 |

MAX 300CH (rows)

1 ITEM OF DATA : 4 bit × 7

FIG.16A
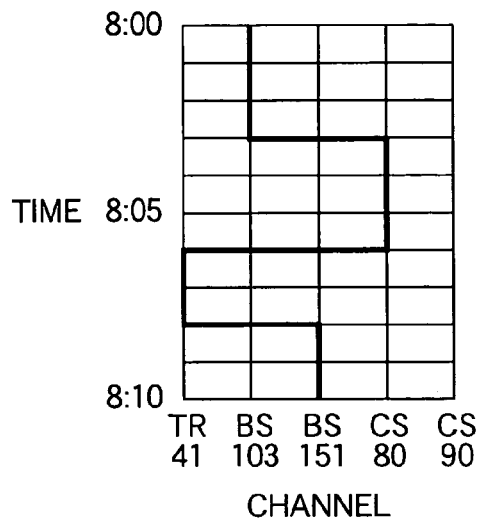
FIG.16B
UPDATE SERVICE LIST
| SERVICE ID | NETWORK ID | VIEWING TIME |
|---|---|---|
| 103 | BS | 3 |
| 80 | CS | 3 |
| 41 | TR | 2 |
ITEM ADDED
CHANNEL CHANGE AT 8:08
FIG.16C
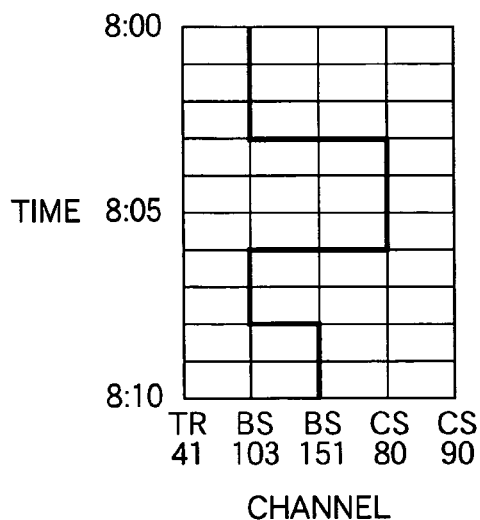
FIG.16D
UPDATE SERVICE LIST
| SERVICE ID | NETWORK ID | VIEWING TIME |
|---|---|---|
| 103 | BS | 5 |
| 80 | CS | 3 |
CHANNEL CHANGE AT 8:08
TIME NOTIFICATION AT 8:10
FIG.16E
UPDATE SERVICE LIST
| SERVICE ID | NETWORK ID | VIEWING TIME |
|---|---|---|
| 103 | BS | 5 |
| 80 | CS | 3 |
| 151 | BS | 2 |

| GENRE CODE | 1 WEEK AGO | 2 WEEKS AGO | 3 WEEKS AGO | 4 WEEKS AGO | 5 WEEKS AGO | 6 WEEKS AGO | 7 WEEKS AGO |
|---|---|---|---|---|---|---|---|
| 0 | 1 | 0 | 0 | 10 | 10 | 10 | 0 |
| 1 | 3 | 5 | 10 | 0 | 0 | 0 | 0 |
| 2 | 6 | 5 | 0 | 0 | 0 | 0 | 10 |
| ... | ... | ... | ... | ... | ... | ... | ... |
| 16 | 0 | 0 | 0 | 0 | 0 | 0 | 0 |

1 ITEM OF DATA : 4 bit × 7

FIG.23

| VIEWING CHANNEL | VIEWING TIME | | |
|---|---|---|---|
| | 1 WEEK AGO | 2 WEEKS AGO | 3 WEEKS AGO |
| CHANNEL 2 | 0 (MINUTES) | 10 (MINUTES) | 15 (MINUTES) |
| CHANNEL 5 | 15 (MINUTES) | 5 (MINUTES) | 0 (MINUTES) |

FIG.45A

| CHANNEL | NETWORK ID | SERVICE ID |
|---|---|---|
| 1 | TR | 41 |
| 2 | BS | 103 |
| 3 | CS | 80 |
| ... | ... | ... |
| 299 | | |

MAX 300CH

⇩ CHANNEL 80 OF CS DISAPPEARS

FIG.45B

| CHANNEL | NETWORK ID | SERVICE ID |
|---|---|---|
| 1 | TR | 41 |
| 2 | BS | 103 |
| 0 | CS | 80 |
| ... | ... | ... |
| 299 | | |

MAX 300CH

⇩ AFTER USING MAXIMUM VALUE OF CHANNEL ID, ADD CHANNEL 804 OF CS

FIG.45C

| CHANNEL | NETWORK ID | SERVICE ID |
|---|---|---|
| 1 | TR | 41 |
| 2 | BS | 103 |
| 300 | CS | 804 |
| ... | ... | ... |
| 299 | | |

MAX 300CH

RECOMMENDED PROGRAM SEARCH DEVICE AND RECOMMENDED PROGRAM SEARCH METHOD

BACKGROUND OF THE INVENTION

1. Field of the Invention

The present invention relates to a recommended program search device and a recommended program search method, for searching for a recommended program which is determined to be a user's favorite program from scheduled broadcast programs, using viewing history information on programs that have been viewed in the past by the user, i.e., the viewer of broadcast programs.

2. Description of the Related Art

There is proposed a search device which stores viewing history information on broadcast programs viewed by a viewer (user) in a small capacity memory, receives program information including additional information indicative of the contents of broadcast programs, stores the received program information in the memory, and searches for a user's favorite program from program information corresponding to scheduled broadcast programs to be broadcast in the future. Refer to Japanese Patent Application Kokai (Laid-Open) Publication No. 2005-86324 (Patent Document 1), for example.

The aforementioned search device, however, has a problem that the device can detect a channel meeting user's preference but the device cannot identify a program meeting user's preference because of a limitation that the determination of the user's favorite program must be made with use of the small capacity memory.

In the aforementioned search device, when a time point (view start time) of starting viewing a program in last week is different from a time point of starting viewing the same program in this week, the program cannot be registered as a user's favorite program. However, in particular, when the device power is turned on or a channel is changed, it is rare for the view start time in last week to coincide with the view start time in this week, and therefore the viewing history information cannot be desirably stored disadvantageously.

Further, the aforementioned search device is arranged to increment the number of viewing times by one when the channel selected by the user in this week coincides with the channel so far selected in every week, and to decrement the number of viewing times by one when the channel selected by the user in this week is different from the channel so far selected in every week. Accordingly, when the user successively views the same program at the same time point in every week, a numeric value indicating the number of viewing times becomes large. However, when the contents of a program so far broadcast at the same time point in every week was remarkably modified after the time of change of the scheduled broadcast program, for example, the numeric value indicative of the number of viewing times cannot be properly decremented. This results in the fact that it takes a long time for the search device to become capable of making a proper judgment for the user's favorite program from when the scheduled broadcast programs are changed.

SUMMARY OF THE INVENTION

It is an object of the present invention to provide a recommended program search device and a recommended program search method, which make it possible to adequately search scheduled broadcast programs for a recommended program that is determined to be a user's favorite program.

Further, it is another object of the present invention to provide a recommended program search device and a recommended program search method, which can adequately determine user's favorite program in a relatively short time even in the case that scheduled broadcast programs are changed to a large extent.

In accordance with the present invention, a recommended program search device includes a broadcast receiver unit which receives a broadcast wave and converts the broadcast wave to a video signal and an audio signal; an operating block which is operated for channel change by a user; a time information acquiring block which acquires time information upon the channel change; a storage which stores information; a viewing history information acquiring block which acquires a viewing channel and a viewing time by the user for each area corresponding to a time division, the viewing history information acquiring block storing viewing history information including the viewing channel and the viewing time that are associated with each area in the storage; a program information acquiring block which acquires scheduled broadcast program information, including program time information enabling calculation of a program start time and a program broadcast time for a scheduled broadcast program and channel information about the scheduled broadcast program; and a search block which determines a user's favorite program from the scheduled broadcast program on the basis of a result of comparison between the program time information and the channel information included in the scheduled broadcast program information and the viewing channel and the viewing time stored in the storage.

Further, in accordance with the present invention, a method of searching for a recommended program to be executed by a device comprising: a broadcast receiver unit which receives a broadcast wave and converts the broadcast wave to a video signal and an audio signal; an operating block which is operated for channel change by a user; a time information acquiring block which acquires time information upon the channel change; and a storage which stores information. The method includes the steps of: acquiring a viewing channel viewed by the user and a viewing time thereof for each area corresponding to a predetermined time division and storing viewing history information having the viewing channel and the viewing time associated with each area in the storage; acquiring scheduled broadcast program information including program time information capable of calculating a program start time of a scheduled broadcast program and a program broadcast time thereof and including channel information on the scheduled broadcast programs; and determining a user's favorite program from the scheduled broadcast programs on the basis of a result of comparison between the program time information and the channel information included in the scheduled broadcast program information and the viewing channel and the viewing time stored in the storage.

In accordance with the present invention, the recommended program search device can suitably search scheduled broadcast programs for a program and can determine the program that has been searched for, as a user's favorite program with use of viewing history information relating to programs viewed in the past by a user, while suppressing the used amount of memory.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 2 is a block diagram showing a configuration of a television receiver set including a recommended program search device according to a first embodiment of the present invention;

FIGS. 3A and 3B are flowcharts showing a method of storing user's viewing history information in the recommended program search device according to the first embodiment;

FIG. 10 is a diagram showing an example of a data structure of a channel list in the second embodiment;

FIG. 11 is a diagram showing an example of a data structure of the viewing history stored in the second embodiment;

FIGS. 16A to 16E are diagrams for describing an updating process of an update service list in the second embodiment;

FIG. 23 is a diagram showing contents of a history file having viewing history information registered therein and corresponding to a plurality of past weeks in a recommended program search device according to a fourth embodiment of the present invention;

FIGS. 45A to 45C are diagrams showing an example of updating a channel list in the twelfth embodiment;

DETAILED DESCRIPTION OF THE INVENTION

Further scope of applicability of the present invention will become apparent from the detailed description given hereinafter. However, it should be understood that the detailed description and specific examples, while indicating preferred embodiments of the invention, are given by way of illustration only, since various changes and modifications will become apparent to those skilled in the art from the detailed description.

Figure 1:
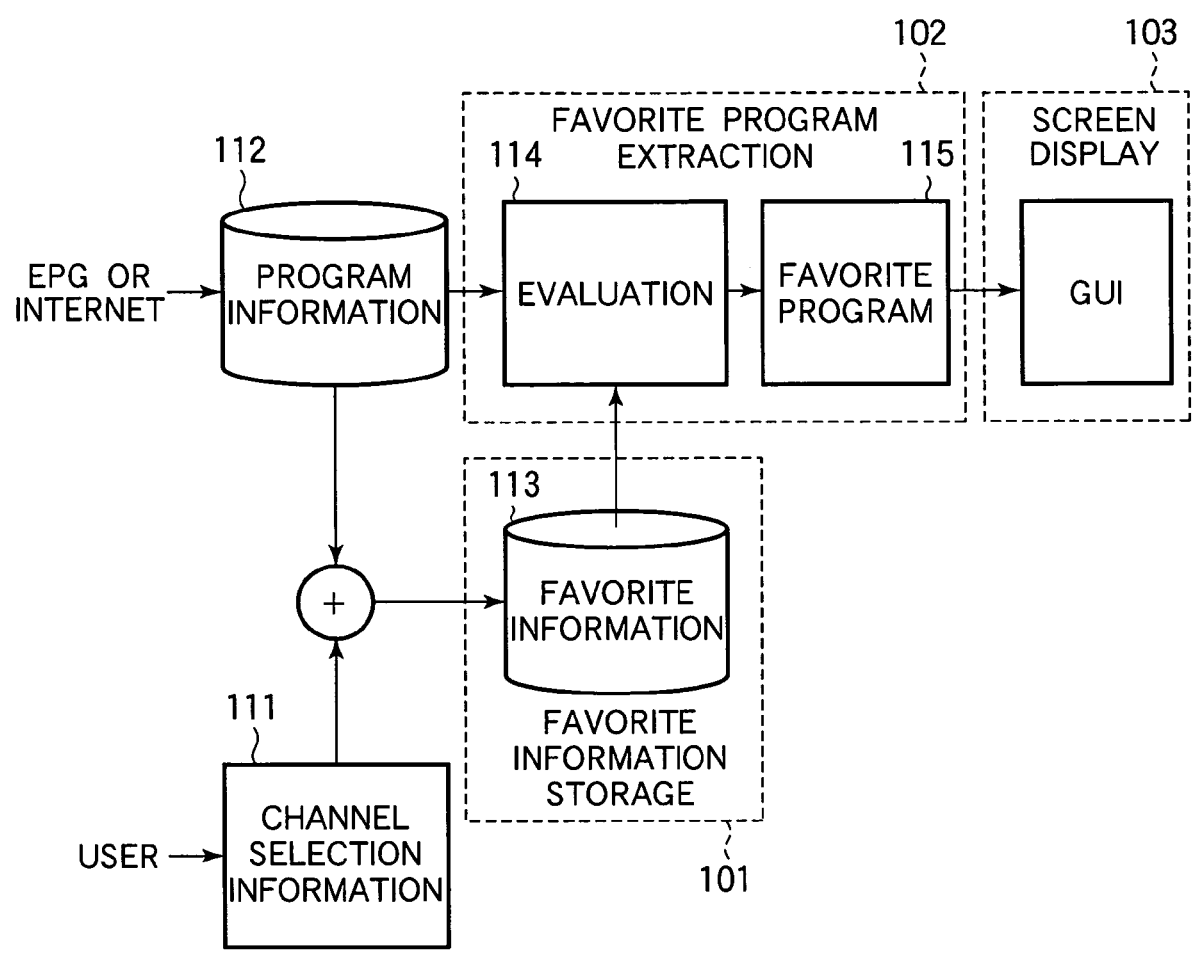
FIG. 1 is a functional block diagram for conceptually describing a summary of the present invention.

FIG. 1 is a functional block diagram for conceptually describing a summary of the present invention. A favorite information storage block 101 stores user's favorite information 113 including channel selection information 111 which was entered by a user and program information 112 which was received from an electronic program guide (EPG) or the Internet. In a favorite program extraction block 102, an evaluation block 114 analyzes and evaluates user's viewing time bands and user's viewing channels on the basis of the previously stored user's favorite information 113, and a favorite program block 115 extracts a favorite program on the basis of the program information 112 received from the EPG or the Internet. A screen display block 103 using GUI presents favorite program information extracted from the favorite program block 115 of in the favorite program extraction block 102, to the user.

First Embodiment

FIG. 2 is a block diagram showing a configuration of a television receiver set 10 including a recommended program search device 9 according to the first embodiment of the present invention. As shown in FIG. 1, the television receiver set 10 is connected to an antenna 1 which receives a broadcast signal such as a digital terrestrial broadcast signal, a broadcast satellite (BS) digital broadcast signal, a communication satellite (CS) digital broadcast signal, or an analog broadcast signal. The television receiver set 10 includes a broadcast receiver unit 2 having a tuner for selecting a viewing channel from a broadcast signal received by the antenna 1 and outputting a video signal and an audio signal. The television receiver set 10 also includes a display unit 4 which displays an image and produces a sound on the basis of the video signal and the audio signal output from the broadcast receiver unit 2. Further, the television receiver set 10 includes a controller 7 which controls (e.g., selects a viewing program) the broadcast receiver unit 2 and extracts a user's favorite program in accordance with an instruction from a remote control unit (operating unit) 5 or from an operating part (not shown) of a main body of the television receiver set 10. Furthermore, the television receiver set 10 includes a storage 8, a time information acquiring means (timer) 24 which acquires time information upon channel change, and a light receiver 6 which receives an optical signal from the remote control unit 5 operated by a viewer (user) for the channel change.

The controller 7 includes a channel controller 25, a viewing history information acquiring block 71, a program information acquiring block 78, a storage controller 79, and a search block 72. The storage 8 includes a viewing history temporary storage memory 26, a viewing history storage nonvolatile memory 29, and a program information storage 81.

The program information storage 81 stores therein scheduled broadcast program information acquired by the program information acquiring block 78. The viewing history temporary storage memory 26 temporarily stores viewing history information. The viewing history storage nonvolatile memory 29 can permanently hold the viewing history information. The storage controller 79 manages a viewing history for each area (a term "area" is a time area which will be described later) using the viewing history temporary storage memory 26, and further controls the viewing history storage nonvolatile memory to store viewing history information including a channel viewed by the user and a viewing time for the channel in the area.

The search block 72 determines a user's favorite program on the basis of a result of comparison between the program time and the channel information included in the scheduled broadcast program information and the viewing channel and the viewing time stored in the storage.

The recommended program search device 9 includes the broadcast receiver unit 2, the controller 7, the storage 8, and the timer 24. The program information acquiring block 78 acquires the scheduled broadcast program information including the program time information for calculating a program start time and a program broadcast time for a scheduled broadcast program and also including channel information of the scheduled broadcast program. The program information acquiring block 78 acquires program information from the received broadcast signal, but may acquire the scheduled broadcast program information as a signal different from the broadcast signal, for example, by acquiring the scheduled broadcast program information via the Internet.

The program information of scheduled broadcast programs stored in the storage 8 includes information about a broadcast channel, a program name, a broadcast start time, a broadcast continuation time (or a broadcast end time), etc. for each program. The broadcast continuation time refers to a time duration from the broadcast start time to the broadcast end time. In some case, the program information includes the broadcast start time and the broadcast continuation time, and does not include the broadcast end time. In this case, the broadcast end time is calculated by adding the broadcast continuation time to the broadcast start time.

The controller 7 acquires time information from the time information acquiring means (timer) 24. Although the controller 7 acquires time information from the timer 24, it may acquire the time information from a built-in timer (not shown in the figure). The timer may be arranged by mounting a component having a timer function itself or may be arranged in the form of a counter. In the case of the built-in timer in the form of a counter, if the time information is included in a digital television broadcast signal received by the broadcast receiver unit 2, the time information is separated by the program information acquiring block 78 and is used to correct the counter. As a result, such a counter as synchronized with the time information separated by the program information acquiring block 78 can be formed and can function as a timer.

The controller 7 includes the viewing history information acquiring block 71 which acquires the viewing history information and stores it in the storage 8, and also includes the search block 72 for searching for a recommended program which can be determined as a user's favorite program from the scheduled broadcast programs. The viewing history information acquiring block 71 acquires a viewing channel viewed by the user and its viewing time for each area having a certain length of time, and stores viewing history information having the viewing channel and the viewing time associated therewith for each area in the storage 8. The search block 72, on the basis of a result of comparison between the program time and the channel information included in the scheduled broadcast program information and the viewing channel and the viewing time stored in the storage 8, searches the scheduled broadcast program information for a recommended program which can be determined as a user's favorite program. In the first embodiment, the search block 72 determines, as a user's favorite program, one of the scheduled broadcast programs to be broadcast on the same viewing channel as included in the viewing history information, which is broadcasting or starts its broadcasting during a time period from the area start time to the area end time.

Figure 3B:
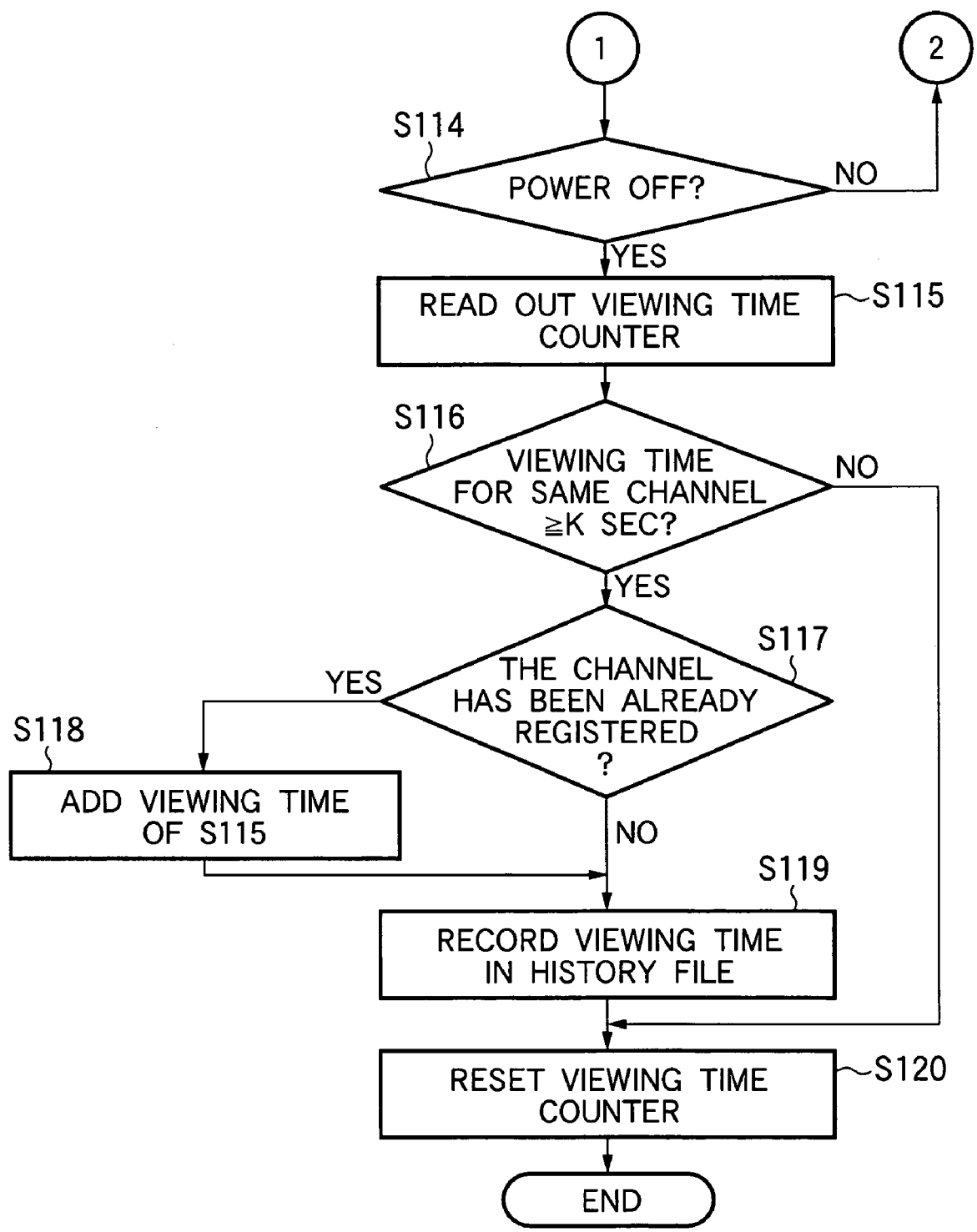

FIGS. 3A and 3B are flowcharts showing a method of storing user's viewing history information in the recommended program search device 9 according to the first embodiment. Process shown in FIGS. 3A and 3B is executed by the viewing history information acquiring block 71 of the controller 7 under control of program software. The program software is called under control of the controller 7 when the power of the television receiver set 10 is turned on, and is activated during the power-on time of the controller.

In the recommended program search device 9 according to the first embodiment, not the view start time but the viewing channel and the channel view continuation time (viewing time) are registered in a history file. Therefore, the recommended program search device 9 can resolve the problem of the related art, that upon the power turn-on or channel change, it is rare to find a coincidence in view start time between last week and this week and thus the viewing history information cannot be desirably stored.

Explanation will next be made as to how to solve the problem in the related art that a user's favorite channel can be identified but a user's favorite program cannot be identified.

As shown in FIGS. 3A and 3B, when the power of the television receiver set 10 is turned on, the recommended program search device 9 according to the first embodiment acquires a current time Tn from a timer 24 (or a built-in timer, not shown in the figure) (step S101), and identifies (calculates) an area (step S102). The term "area" refers to a time range of, for example, each of divisions of one day by a time interval (area division time D). More specifically, when a single area refers to a time range of fifteen minutes, one day is made up of ninety-six areas, which is calculated by the following equation:

24 hours/15 minutes=1440 minutes/15 minutes=96

However, the length and number of such areas are not limited to the values in the above case.

The recommended program search device 9 then determines whether or not a history file having viewing history information about the area identified in the step S102 is stored in the storage 8 (step S103). In the presence of the history file (when the determination of the step S103 is YES), the process proceeds to a step S105. In the absence of such a history file (when the determination of step S103 is NO), the device creates a history file and the process proceeds to a step S104.

In the step S105, the device starts a viewing time counter 73 for counting a viewing time about a channel being selected.

In a next step S106, the recommended program search device 9 determines whether the channel was changed by an input from the remote control unit 5 or whether the area was changed. In the case of no channel change and no area change (when the determination of the step S106 is NO), the process proceeds to a step S114. When the power is turned off, the device starts its terminating process. The process of the step S114 and subsequent steps will be described later. When the device determines the channel change or the area change in the step S106 (when the determination of the step S106 is YES), the process proceeds to a step S107.

In the step S107, the device reads the value of the viewing time counter 73 started in the step S105, and measures the viewing time of the channel so far viewed until the channel change. Thereafter, the process proceeds to a step S108 and the device determines whether or not the viewing time is not smaller than k seconds as its threshold. When the viewing time is smaller than k seconds (when the determination of the step S108 is NO), the process proceeds to a step S112. When the viewing time is not smaller than k seconds (when the determination of the step S108 is YES), the process proceeds to a step S109. The determination of the step S108 is used to determine whether or not the program was viewed with user's interest.

In the step S109, the device determines whether or not the channel viewed by the user is already registered in the history file read out in the step S103 or in the history file created in the step S104. When the channel is already registered (when the determination of the step S109 is YES), the process proceeds to a step S110, and the device adds the viewing time read out in the step S107 to a viewing time about the viewing channel already registered in the history file, and registers the addition in the history file in a step S111. When the channel is not registered in the history file (when the determination of the step S109 is NO), the device registers the channel viewed in the past and the viewing time read out in the step S107 in the history file in the step S111, and stores the history file in the storage 8.

In the step S111, the device registers the viewed channel and the viewing time in the history file. Thereafter, in the step S112, the device sets the viewing time counter 73 to '0', and the process proceeds to a step S113. In the step S113, the device determines its return destination on the basis of the determination of the step S106. When the device determines the channel change in the step S113 (when the determination of the step S113 is YES), the area is not changed. Thus, in order to measure a viewing time after the channel selection, the process returns to the step S105 and starts the viewing time counter 73. Meanwhile, when the device determines the area change (when the determination of the step S113 is NO), the device stores viewing history information on the next area in time series. Thus, the process returns to the step S101, and the device acquires the current time Tn.

When the device determines no channel change and no area change in the step S106 (when the determination of the step S106 is NO), on the other hand, the process proceeds to the step S114 and the device determines whether or not the input from the remote control unit 5 indicates the power-off. When the input from the remote control unit 5 indicates an operation other than the power-off such as volume button depression (when the determination of the step S114 is NO), the process returns to the step S106. When the input from the remote control unit 5 indicates the power-off operation (when the determination of the step S114 is YES), the process proceeds to a step S115 and the device executes its terminating process.

In the step S115, the device performs operation similar to the above operation of the step S107, and then proceeds to a step S116. In the step S116, the device performs operation similar to the above operation of the step S108 in the step S116. When the viewing time is smaller than k seconds (when the determination of the step S116 is NO), the process proceeds to a step S120. When the viewing time is equal to or more than k seconds (when the determination of the step S116 is YES), the process proceeds to a step S117.

In the step S117, the device performs determining operation similarly to the above step S109. When the channel is already registered (when the determination of the step S117 is YES), the process proceeds to a step S118. In the step S118, the device performs operation similar to the operation of the above step S110, and proceeds to a step S119. When the device determines that the channel is not registered in the step S117 (when the determination of the step S117 is NO), the process proceeds to the step S119. In the step S119, the device performs operation similar to the operation of the above step S111.

In the step S120, the device performs operation similar to the operation of the above step S112, and then terminates the program software.

In the first embodiment, when a plurality of channels are detected in the same area, all the detected channels are registered in the viewing history information.

The history file may be configured to register a history about a single area, to register a history about a plurality of areas, or to register a history about all the areas.

The device now finds the number of bits necessary to express the viewing channel and viewing time to be registered in the history file. With regard to the viewing channel, first, assuming that the number of existing viewing channels is 4000, then the number of bits necessary to register the viewing channels is 12, because 4000 is smaller than $2^{12}$ (=4096). With regard to the viewing time, next, assuming that the area division time D is 15 minutes, then the number of bits necessary to register the area division time D is 4, because 15 is smaller than $2^4$ (=16). That is, the number of bits necessary to register a set of the viewing channel and the viewing time is 16 (=12 bits+4 bits). Thus the number of bits necessary for the history file can be the same as in the aforementioned related art (refer to Patent Document 1).

Figure 4:
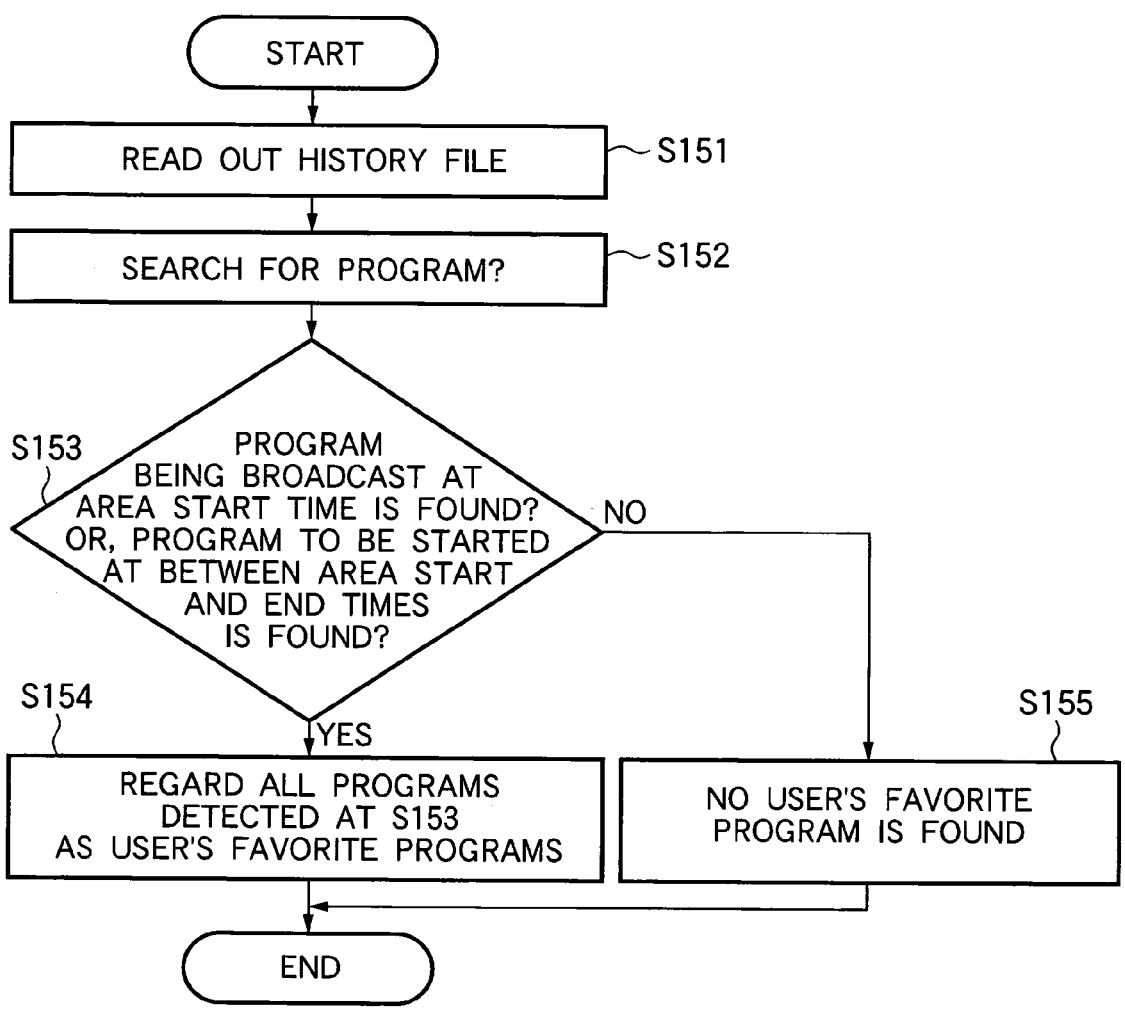
FIG. 4 is a flowchart showing a method of identifying user's favorite program in the recommended program search device according to the first embodiment.
Figure 5:
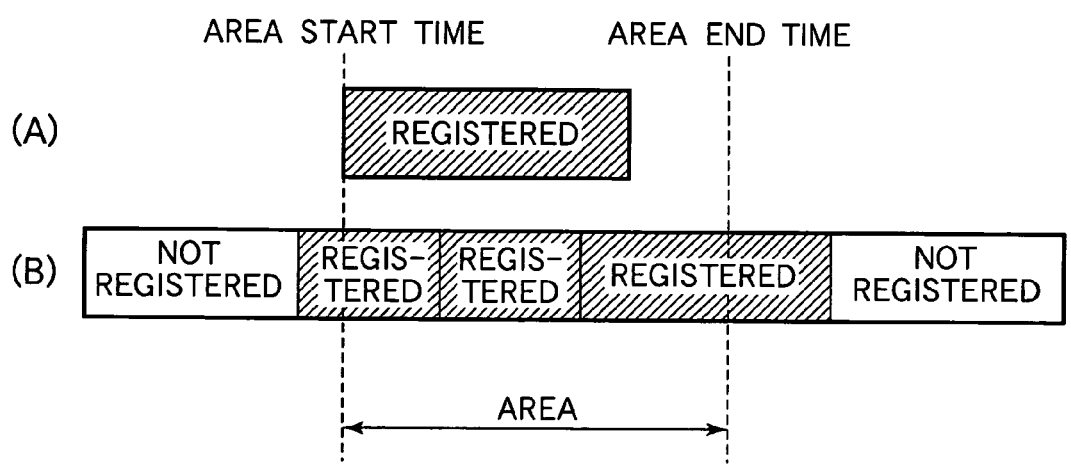
FIG. 5 is a diagram showing specific examples of the user's favorite programs detected in the recommended program search device according to the first embodiment.

Explanation will then be made as to a method of identifying a user's favorite program from viewing channels and viewing times registered in the history file. FIG. 4 is a flowchart showing a method of identifying a user's favorite program in the recommended program search device 9 according to the first embodiment. Further, FIG. 5 is a diagram showing a specific example of a user's favorite program detected in the recommended program search device 9 according to the first embodiment.

An area to be searched for in areas registered in the history file is referred to as a "search target area". In the first embodiment, the device searches for a user's favorite program in all the channels registered in the search target area.

In a step S151, the device reads out the registered history file including a search target area to be read out, from the storage 8. In a next step S152, the device reads out scheduled broadcast program information stored in the storage 8 to identify the user's favorite program on the basis of the contents read out from the history file. In a step S153, the device searches for a program to be broadcast on the read-out channel at a start time (referred to as an "area start time") of an area specified in the read-out history file and at an end time (referred to as an "area end time") thereof. When finding a program to be broadcast between the area start time and the area end time (when the determination of the step S153 is YES), the device determines in a step S154 that all the programs are user's favorite programs and registers them. When the device fails to find a program to be broadcast between the area start time and the area end time (when the determination of the step S153 is NO), this means that a program to be broadcast is absent. Thus, the device determines the absence of the user's favorite program, in a step S155.

The determination of the step S153 will be additionally described. The device first compares the broadcast start times, broadcast continuation times (how to convert the broadcast continuation time to the broadcast end time being as mentioned above), area start times, and area end times associated with programs included in the scheduled broadcast program information read out from the storage 8.

How to detect a program being broadcast at the area start time will be described. The device searches for first one of scheduled broadcast programs of channels registered in the history file which has the broadcast end time larger than the area start time (which means that the numeric value of the broadcast end time when one day is expressed in the form of 24 hours is increased, that is, the broadcast end time is delayed). The search block 72 of the controller 7 determines that the program is being broadcast at the area start time and is user's favorite program. When the device detects a program having the area start time equal to the broadcast end time, the device determines that the program is not user's favorite program.

Explanation will then be made as to how to detect a program to be started during a time period from the area start time to the area end time. The device searches programs to be scheduled to be broadcast on channels registered in the history file for a program which has the broadcast start time larger than or equal to the area start time and also smaller than the area end time. The program that has been searched for, is a program to be started and broadcast during a time period from the area start time to the area end time. The search block 72 of the controller 7 determines that the program that has been searched for, is a user's favorite program.

When a history file stored in the storage 8 but not read out yet is present, the process returns to the step S151, and the device reads out a next history file, and detects a user's favorite program.

A user's favorite program can be identified from the history file according to the aforementioned algorithm.

FIG. 5 is a diagram showing details of how to extract a user's favorite program from scheduled broadcast programs on channels registered in the history file according to the flowchart of FIG. 4.

In FIG. 5, programs corresponding to hatched areas are extracted as user's favorite programs. More specifically, a program having the broadcast start time coinciding with the area start time as shown by (A) in FIG. 5, a program being broadcast at the area start time, a program whose broadcast is started after the area start time and is terminated before the area end time, and further a program being broadcast at the area end time as shown by (B) in FIG. 5, are determined and registered as user's favorite programs.

The comparison by the search block 72 between the program time included in the scheduled broadcast program information and a viewing time stored in the storage 8 and the comparison by the search block 72 between the channel information included in the scheduled broadcast program information and a viewing channel stored in the storage 8 are considered when the comparison is made in the same time band (for example, with respect to the previous day) or in the same time band on the same day of the week as the day by one week. That is, when the comparison of a program is made in the same time band but on a different day of the week, the comparison may be made so that the program is identified as in another area.

The recommended program search device 9 according to the first embodiment has been arranged so that, with respect to an area having a history file present therein, the device searches for user's favorite programs in all the channels registered in the history file. However, the device may also be arranged to detect a channel which has a viewing time registered in the history file and exceeding a predetermined constant time, and to determine a program to be broadcast on the detected channel as the user's favorite program.

When information on a plurality of channels is registered in the history file, the device may determine all programs to be broadcast on the registered channels as user's favorite programs. The device may also compare the magnitudes of viewing times of the respective channels, determine that the user viewed the channel having a large viewing time for a long time, and determine the program to be broadcast on the determined channel as a user's favorite program.

Although the area division time D has been set to fifteen minutes in the embodiment of the present invention, the present invention is not limited to the specific value. For example, the area division time D may be set to a time shorter than fifteen minutes, such as ten minutes, five minutes, or one minute; or at a time longer than fifteen minutes, such as thirty minutes, one hour, one day, or one week.

As has been described above, the recommended program search device 9 according to the first embodiment can identify a user's favorite program while the used amount of memory in the storage is kept to be the same as in the aforementioned related art. Further, even when the view start time in the viewing history information does not coincide with the broadcast start time in the scheduled broadcast program information, this will not involve a problem that the history file is not stored as desired. Accordingly, since user's viewing history information is managed in areas and user's viewing channels and viewing times are registered, the viewing history information can be reliably stored.

Upon acquisition of the viewing history information, only the viewing channels and viewing times associated with respective areas are stored. Thus the used amount of memory in the storage 8 can be reduced and therefore a program to be expected as a user's favorite program can be acquired without any missing.

Second Embodiment

Figure 6:
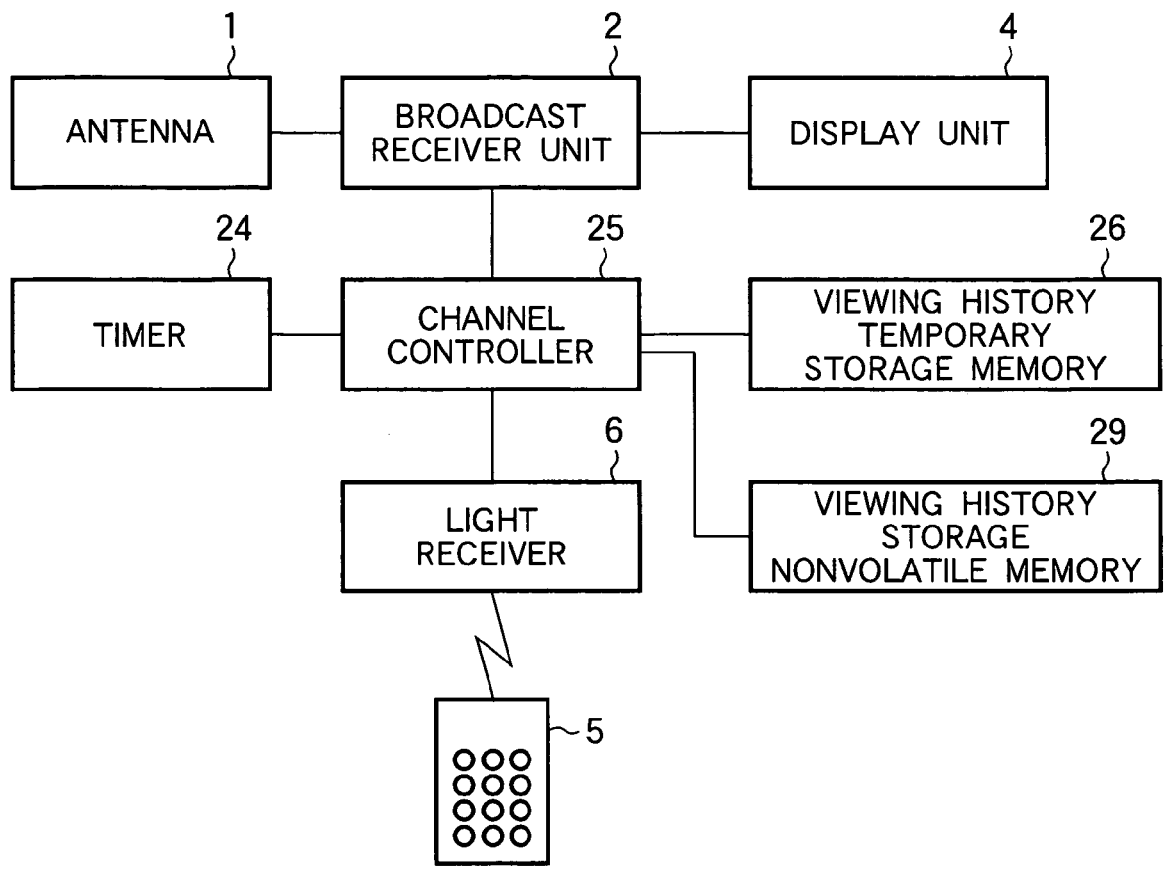
FIG. 6 is a block diagram showing a configuration of a digital broadcast receiver set including a viewing history storage device in a second embodiment of the present invention.

FIG. 6 is a block diagram showing a configuration of a digital broadcast receiver set including a viewing history storage device according to the second embodiment of the present invention. The viewing history storage device according to the second embodiment is arranged to perform the same viewing history storing process as that of the recommended program extracting device in the first embodiment. Accordingly, FIG. 6 corresponds to an extracted part of FIG. 1.

As shown in FIG. 6, the broadcast receiver set includes an antenna 1 which receives a broadcast signal, a broadcast receiver unit 2 which converts a broadcast signal corresponding to a selected channel in the broadcast signal received by the antenna 1 into video and audio signals, and a display unit 4. The broadcast receiver set also includes a timer (time information acquiring means) 24 which outputs time information (date, day of the week, and time), and a channel controller (controller or viewing history information generating means) 25 which controls the entire broadcast receiver set and generates a user's viewing history. The broadcast receiver set further includes a viewing history temporary storage memory (storage means) 26 which temporarily stores the viewing history, a viewing history storage nonvolatile memory 29 which can permanently stores the viewing history, a remote control unit (an operating unit or operating means) 5 which is used for changing the channel by a user, and a light receiver 6 which receives an infrared ray signal output from the remote control unit 5.

When the user presses a power button on the remote control unit 5, a power-on instruction is transmitted to the channel controller 25 via the light receiver 6. When receiving the power-on instruction, the channel controller 25 turns on the power of the broadcast receiver unit 2 to enable the operation of the broadcast receiver unit. When the user presses a broadcast channel switchover button on the remote control unit 5, a receive channel instruction command is transmitted to the broadcast receiver unit 2 via the light receiver 6 and the channel controller 25. The broadcast receiver unit 2 sets the receive channel according to the receive channel instruction command and receives a broadcast wave signal from the antenna 1. The broadcast receiver unit 2 further converts the received broadcast wave signal to a video signal and an audio signal, and then outputs the converted signals to the display unit 4. The channel controller 25 refers to the time information acquiring means 24 each time the digital broadcast receiver set receives the receive channel instruction command, and acquires data about a date, a day of the week, and a time when the receive channel is changed. The channel controller 25 stores a user's viewing history in the viewing history temporary storage memory 26 by process which will be described below.

Figure 7:
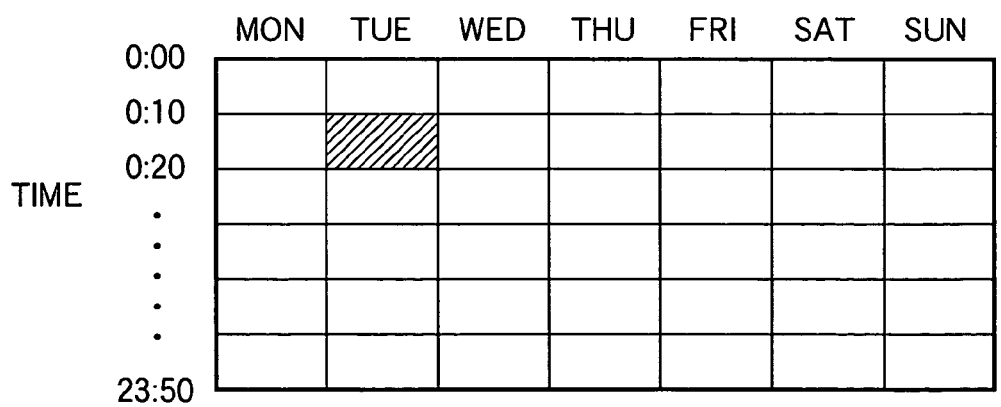
FIG. 7 is a diagram showing a viewing history managed for each area in the second embodiment.

The channel controller 25, as shown in FIG. 7, manages the viewing history on the basis of time frames of a predetermined time zone corresponding to time divisions of each day of the week. More specifically, with regard to each day of Monday to Sunday in one week as shown by an abscissa, time frames (areas) obtained by dividing one day (24 hours), for example, by ten minutes are set as shown by an ordinate. The channel controller 25 determines which time frame and day of the week include a view start time. When it is now, for example, at 0:12 (hour: minute) on Tuesday, in a row of "TUE" of a table shown in FIG. 7, a time frame (also referred to as an "area") from 0:10 to 0:20 including the current time is selected. Thereafter, each time frame is subjected to process which will be described.

Figure 8:
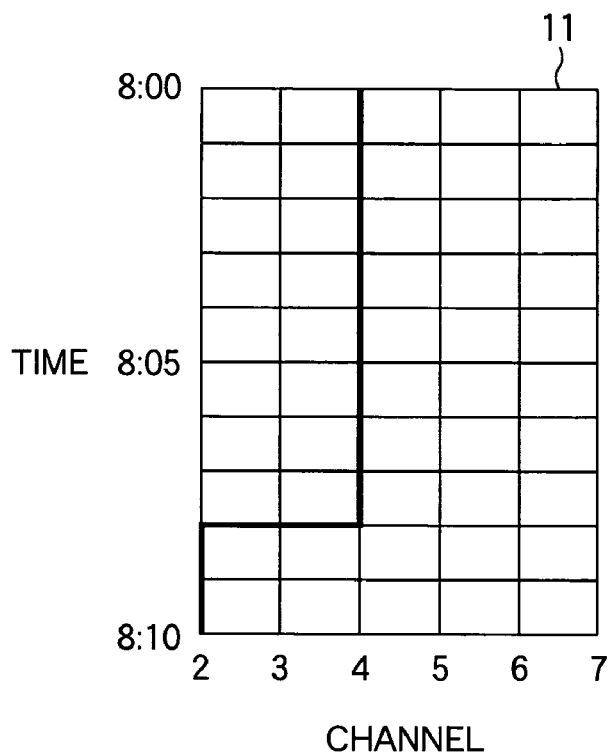
FIG. 8 is a diagram showing an example of the viewing history in the second embodiment.

FIG. 8 is a diagram showing a viewing history 11 when the user selects two channels in a time frame from 8:00 to 8:10 on a certain day of the week. The viewing history 11 indicates that Channel '4' is selected during a time period from 8:00 to 8:08 and Channel '2' is selected during a time period from 8:08 to 8:10.

Figure 9:
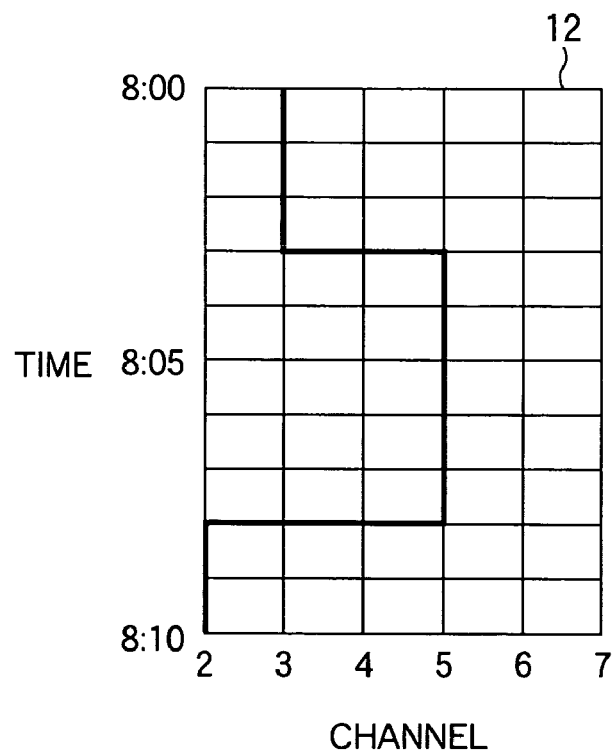
FIG. 9 is a diagram showing another example of the viewing history in the second embodiment.

FIG. 9 is a diagram showing a viewing history 12 when the user selects three channels in a time frame from 8:00 to 8:10 on a certain day of the week. The viewing history 12 indicates that Channel '3' is selected during a time period from 8:00 to 8:03, Channel '5' is selected during a time period from 8:03 to 8:08, and Channel '2' is selected during a time period from 8:08 to 8:10.

When such a viewing history as shown in FIG. 8 or FIG. 9 is stored in the form of start times and channel numbers, this disadvantageously causes the used amount of memory in the storage to be increased. To avoid this, the digital broadcast receiver set calculates which channel is viewed for what minutes in each time frame, and stores the calculated information. For example, the viewing history 11 of FIG. 8 is stored in the form of information indicative of "eight minutes on Channel '4', and two minutes on Channel '2'". The viewing history 12 of FIG. 9 is stored in the form of information indicative of "three minutes on Channel '3', five minutes on Channel '5', and two minutes on Channel '2'".

In digital broadcasting, generally speaking, in order to identify the type of broadcast such as BS broadcast, 110- degree CS digital broadcast, or digital terrestrial broadcast, a network ID is provided. Further, in order to identify service, a service ID is provided. In order to identify the selected channel, the present embodiment stores a channel list having such a data structure as shown in FIG. 10.

In such a channel list as shown in FIG. 10, logic Channels '1', '2', '3', . . . , and '299' are allocated to sets of 2-byte network IDs and 2-byte service IDs. In an initial state where any program is not viewed yet, the channel list has no data. For example, after Channel '41' (service ID '41') of the digital terrestrial broadcast and Channel '103' (service ID '103') of the BS broadcast are viewed, such a data as shown in FIG. 10 is stored in the channel list. In this case, logic Channel '1' is allocated to service ID '41' of the digital terrestrial broadcast (TR), and logic Channel '2' is allocated to service ID '103' of the BS broadcast. The number of the logic channel allocated in this way is referred to as channel ID.

Such a channel list as having the channel ID, the network ID, and the service ID associated with each other is stored in a nonvolatile memory (for example, in another memory area provided in the same nonvolatile RAM as the viewing history storage nonvolatile memory 29). Upon storage of the viewing history, use of the logic channel (channel ID) determined in the channel list enables the used amount of memory to be reduced.

The viewing history storage nonvolatile memory 29 stores an accumulated value of viewing times of each channel ID corresponding to past seven weeks for each of the time frames of FIG. 7, as shown in FIG. 11. When 4-bit data is provided for a single time frame, a maximum of ten minutes can be provided for one channel. Thus, even when it is desired to store seven-week data, it is only required to provide 28 bits (3 byte) (=4 bits×7) per channel. As a result, for the purpose of realizing automatic determination of a user's favorite program, past viewing history information can be stored with a less memory capacity. In this way, a list of accumulated values of the viewing times is referred to as a view list.

The view list having an exemplary data structure exemplified in FIG. 11 is created one for each of the time frames of FIG. 7, but is not created for a time frame of no view. Assuming that each time frame has ten minutes, then one day corresponds to 144 frames. When the 144 frames are stored for each day of a week (refer to FIG. 7), a maximum of 1008 frames (=144 frames×7) are required.

The channel controller 25 first creates detail data about the time frame of ten minutes as exemplified in FIG. 8 and FIG. 9, on the viewing history temporary storage memory 26. At a time point when the time frame in question is shifted to the next time frame, accumulated value of the viewing times for each channel in the time frame in question is stored in the viewing history storage nonvolatile memory 29.

With such a configuration as mentioned above, it is only required to leave only the detail data of ten minutes in the viewing history temporary storage memory 26. After the detail data is left in the memory and the accumulated value of the viewing times for each channel is written in the viewing history storage nonvolatile memory 29, the areas of the viewing history temporary storage memory 26 is opened to store detail data for the next time frame. As a result, the respective use capacities of the viewing history temporary storage memory 26 and the viewing history storage nonvolatile memory 29 can be reduced.

FIG. 12 to FIG. 15 are flowcharts showing viewing history storing process to be executed by the program software operated under control of the channel controller 25.

Figure 12:
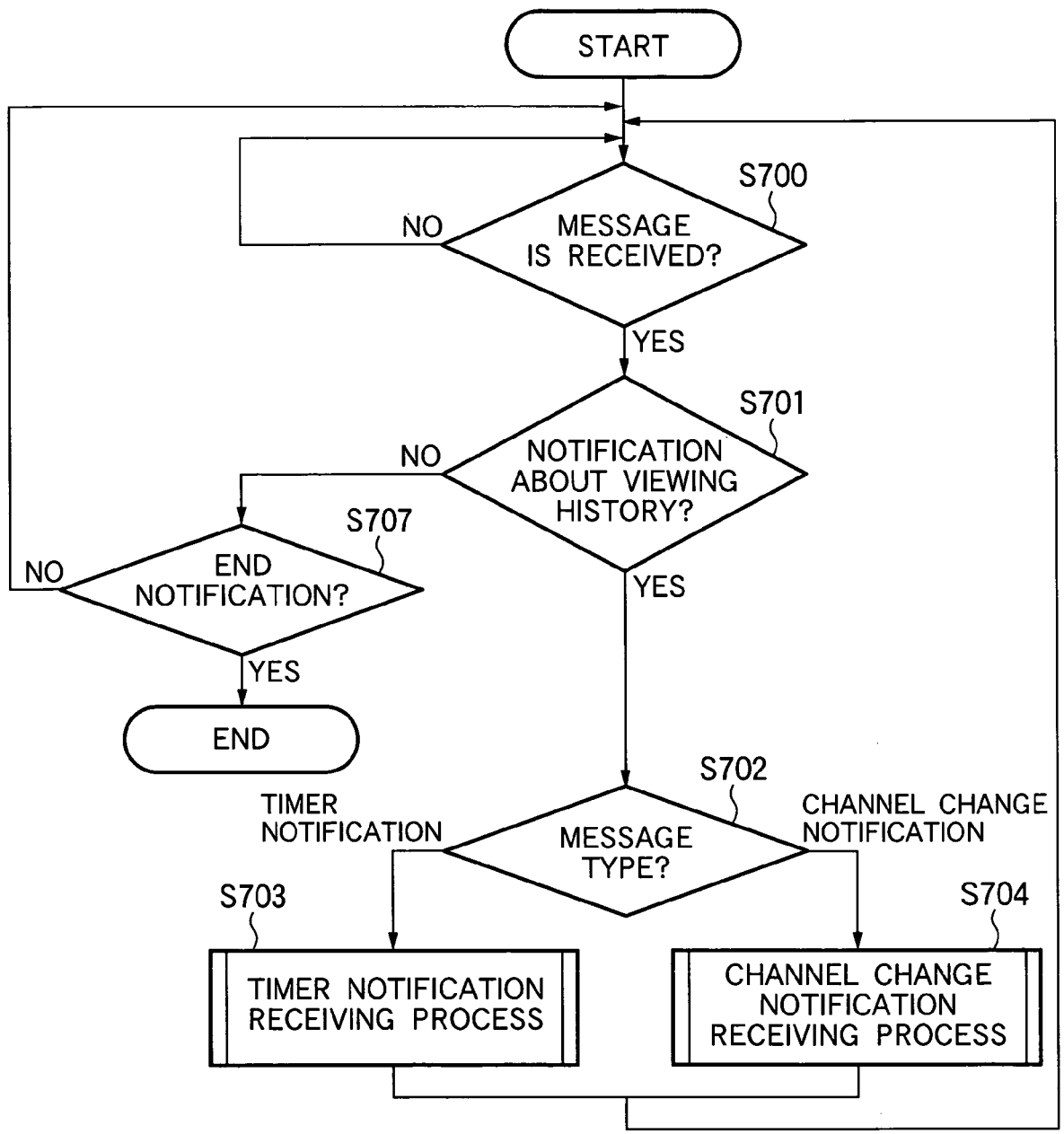
FIG. 12 is a flowchart showing an entire viewing history storing process in the second embodiment.

FIG. 12 is a flowchart showing the entire viewing history storing process under control of the channel controller 25. The viewing history storing process includes two tasks of timer notification receiving process (step S703) and channel change notification receiving process (step S704). The tasks are executed when the channel controller receives an instruction from the remote control unit 5 or a notification from the timer 24 each in the form of a message.

The channel controller 25 first waits for a message, that is, an instruction from the remote control unit 5 or a notification from the timer 24 (step S700). When receiving the message, the channel controller determines whether or not the message relates to the viewing history (step S701). When the message relates to the viewing history, the channel controller determines the type of the message, that is, whether the message indicates the channel change notification or the timer notification (step S702).

The "timer notification" means a message transmitted from the timer 24 at intervals of ten minutes. The "channel change notification" means a message transmitted when the user operates the channel switchover button on the remote control unit 5. When the message is the timer notification, the channel controller executes the timer notification receiving process to shift to the next time frame (step S703). When the message is the channel change notification, the channel controller executes channel change notification receiving process (to be described later) (step S704).

After the execution of the step S703 or S704, the channel controller returns to the step S700 and waits for the next message. When the message received at the step S700 is an end notification output by operating the power-off button of the remote control unit (step S707), the channel controller terminates the viewing history storing process.

Figure 13:
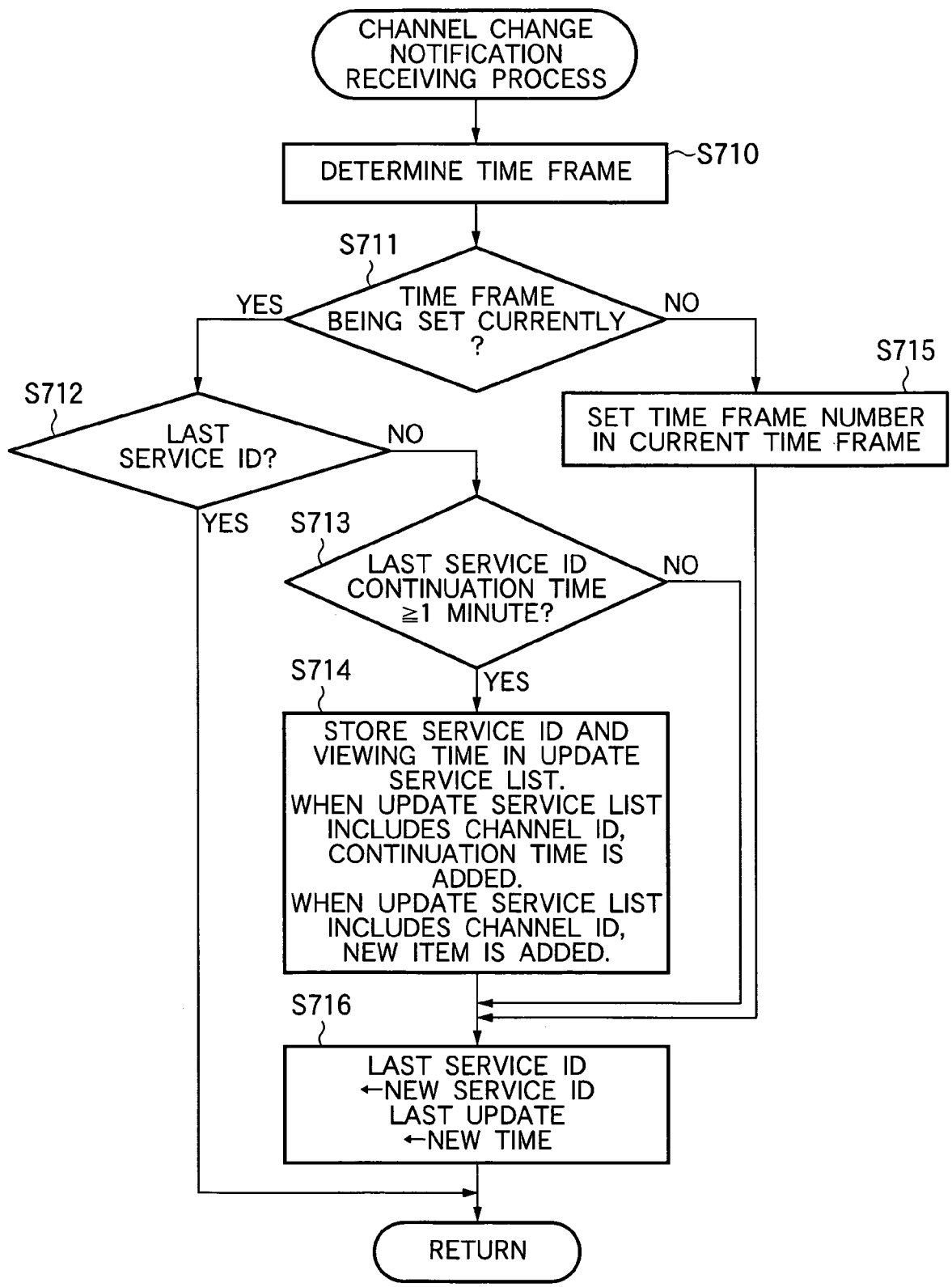
FIG. 13 is a flowchart showing a channel change notification receiving process in the second embodiment.

FIG. 13 is a flowchart showing details of the channel change notification receiving process (step S704 in FIG. 12). In the channel change notification receiving process, the channel controller calculates the time frame received with the channel change notification by referring to the timer 24 (step S710), and determines whether or not the time frame is the currently-set time frame (step S711). In the case of the currently-set time frame, the channel controller determines the service ID announced by the channel change notification is the same as the service ID (last service ID) of the channel so far viewed (step S712). When the service ID announced by the channel change notification is the same as the last service ID, the channel controller determines no channel change, and waits for the next message without executing steps step S713 to S716 (step S700). When the service ID announced by the channel change notification is different from the last service ID, the channel controller determines that the channel was changed, and determines whether or not a time (last service continuation time) so far viewed is equal to or less than one minute (step S713). When the last service continuation time is equal to or less than one minute, the channel controller executes updating process (step S714).

In the updating process (step S714), the channel controller stores the service ID and its viewing time in an "update service list" for holding a channel change history corresponding to ten minutes. When the service ID is already present in the update service list, the channel controller adds the last service continuation time to a viewing time (duration) held in the update service list. When the service ID is not present in the update service list, the channel controller adds an item to the update service list, holds the above last service ID as a service ID therein, and holds the above last service continuation time as a viewing time (duration).

The updating process will be described by referring to specific examples of FIGS. 16A to 16E. Assume as shown in FIG. 16A that the channel controller receives Channel '103' (service ID '103') of the BS broadcast during a time period from 8:00 to 8:03, receives Channel '80' (service ID '80') of the CS broadcast during a time period from 8:03 to 8:06, receives Channel '41' (service ID '41') of the terrestrial broadcast during a time period from 8:06 to 8:08, and changes the channel at 8:08. Assume also that it is now at 8:08. Then in the updating process upon the channel change, an item about a service ID '41' (network ID 'TR') is added in such an update service list as shown in FIG. 16B. Although the network ID is denoted by BS, CS or TR for simplicity of explanation herein, it is noted actually by a numeric value such as 4, 6, or 7FFF.

Assume as shown in FIG. 16C that the channel controller receives Channel '103' of the BS broadcast during a time period from 8:00 to 8:03, receives a channel '80' of the CS broadcast during a time period from 8:03 to 8:06, again receives Channel '103' of the BS broadcast during a time period from 8:06 to 8:08, and further that the channel was changed at 8:08. Assume also that it is now at 8:08. Then in the updating process upon the channel change, two minutes as the last service continuation time is added to the viewing time (three minutes) of the service ID '103' as shown by FIG. 16D.

When the channel controller determines in the step S713 of FIG. 13 that the last service continuation time is smaller than one minute, the channel controller determines that the user is changing the channel at a high speed to search for a desired program (which is called so-called zapping), and shifts to the operation of the step S716 without executing the updating process (step S714).

In the step S716, the channel controller changes the value of the service ID (last service ID) of the channel so far viewed to the service ID (new service ID) announced by the channel change notification. The channel controller further changes the previous channel change time (last update time) to the current time (new time) when the channel was changed. For example, when the channel change is made at 8:08 in FIG. 16A, the channel controller changes the value of the last service ID from '41' to '151', and also changes the last update as the last update time from 8:06 to 8:08.

When the time frame when the channel change notification is received is different from the currently-set time frame in the step S711, the channel controller sets a calculated value as a time frame number for the time frame when the channel change notification is received (step S715), and then process proceeds to the step S716. As mentioned above, the time frame corresponds to a 10-minute time division, one day corresponds to 144 time frames, for which respectively independent or unique numbers (time frame numbers) are set. The step S716 is normally executed. However, when the time frame number is not set yet as when the channel controller executes the viewing history storing process or the like, the channel controller calculates and sets such a time frame number in the step S716. Even when a system timer became out of order for some reason, the execution of the step S716 enables prevention of generation of a fault in the subsequent operations.

Figure 14:
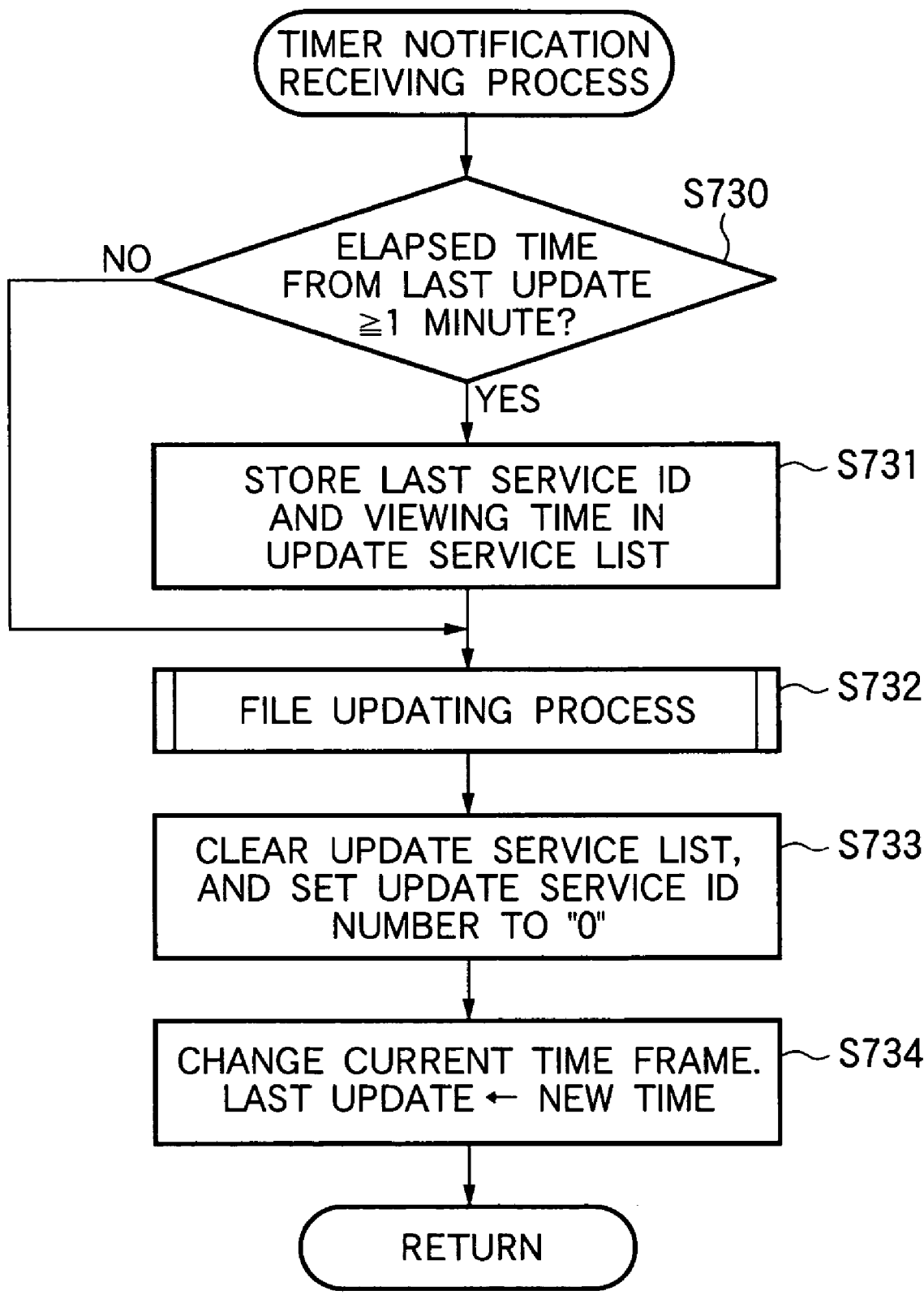
FIG. 14 is a flowchart showing a timer notification receiving process in the second embodiment.

FIG. 14 is a flowchart showing details of the timer notification receiving process (of the step S703 in FIG. 12) when the channel controller receives a timer notification message at intervals of ten minutes. In the timer notification receiving process, the channel controller first determines whether or not a time elapsed from the last update time is equal to or less than one minute (step S730). When the elapsed time is equal to or less than one minute, the channel controller writes the last service ID of the channel so far viewed from the previous channel controller and its viewing time in the update service list (step S731). At the time of a timer notification of 8:10, as shown in FIG. 16E, the channel controller adds an item of the service ID '151' to the update service list, and registers the last service continuation time (two minutes) in the viewing time (duration) column. When the service ID '151' is already present in the update service list, however, the channel controller adds the continuation time.

Next, in order to write the update service list (for example, FIG. 16E) for the so-far time frames in the viewing history storage nonvolatile memory 29, the channel controller executes file updating process (to be described later) (step S732). In order to shift the operation of the next time frame, further, the channel controller sets the update service ID number to '0' and clears the update service list (step S733). The channel controller next changes the value of the last update as the last update time to the current time (new time) (step S734). At the time of the timer notification of 8:10 in FIG. 16C, the channel controller sets the last update time to 8:10. After the step S734, the channel controller returns to the step S700 of FIG. 12 and waits for a message.

Figure 15:
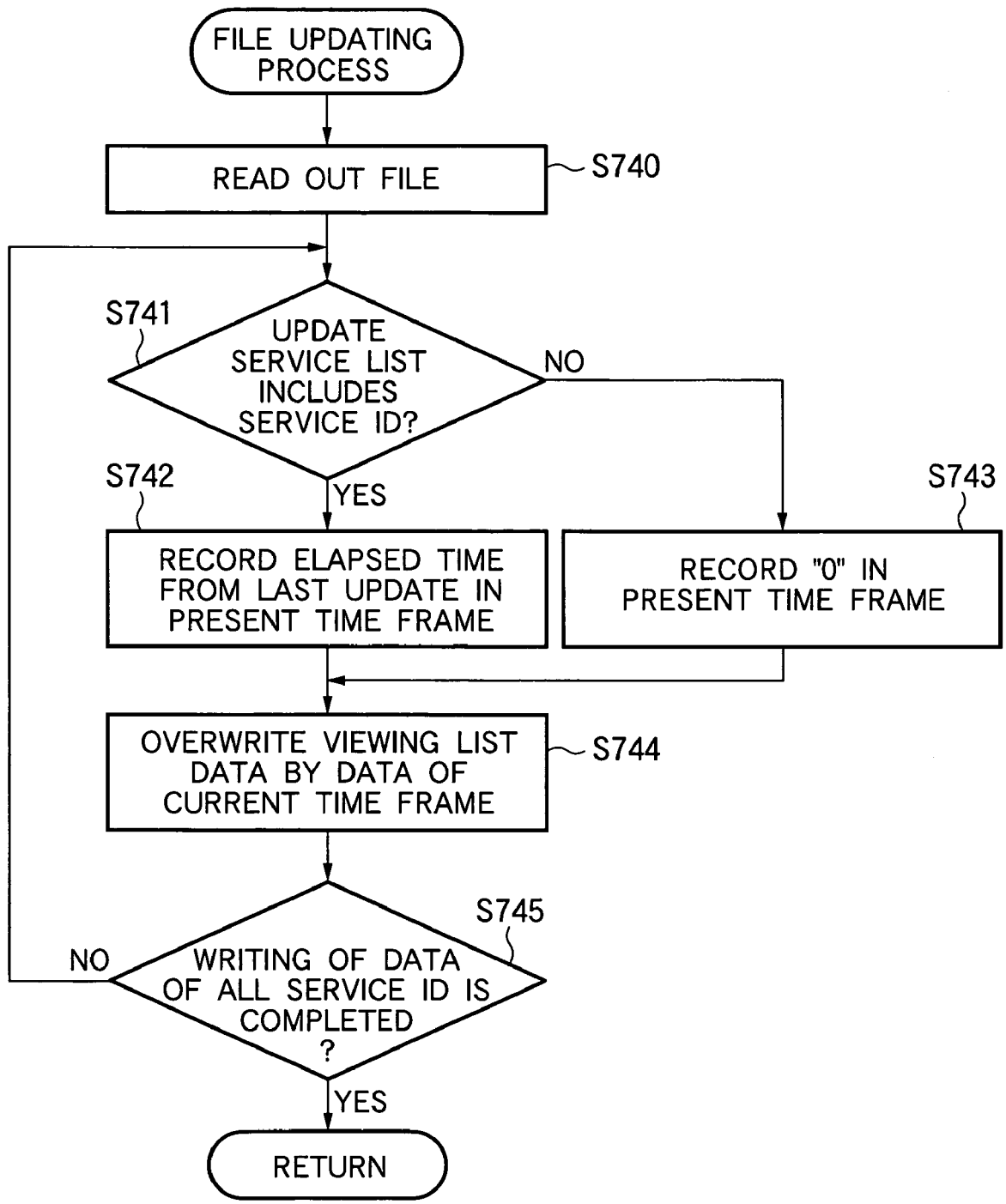
FIG. 15 is a flowchart showing a file updating process in the second embodiment.

FIG. 15 is a flowchart showing details of the file updating process (step S732 of FIG. 14). In the file updating process, the channel controller processes data on the update service list (for example, FIG. 16E), and writes the processed data in the "one week ago" column of the view list (FIG. 11) stored in the viewing history storage nonvolatile memory 29.

The channel controller 25 first reads a file of the update service list into a temporary memory (such as another memory area provided on the same RAM as the viewing history temporary storage memory 26) (step S740). The channel controller then determines whether or not the service ID corresponding to each channel ID is included in the update service list by referring to the channel list (FIG. 10) (step S741). When the service ID corresponding to the channel ID is not included in the update service list, the channel controller determines that the corresponding channel ID was not viewed, and writes zero minutes in the current time frame corresponding to the corresponding channel ID (step S743) When the service ID corresponding to the channel ID is present in the update service-list, the channel controller writes the viewing time of the service ID in the current time frame corresponding to the channel ID (step S742).

The update service list of FIG. 16E will be described as an example. It will be seen from the channel list of FIG. 10 that the service ID '41' corresponds to the channel ID '1' and the service ID '103' corresponds to the channel ID '2'. In the update service list of FIG. 16E, the service ID '41' is not present, but the service ID '103' is present and its viewing time is five minutes. In this case, the channel controller writes '0' in the current time frame of the channel ID '1', and also writes '5' in the current time frame.

Thereafter, the channel controller 25 writes the data (i.e., the latest viewing history information) of the current time frame corresponding to each channel ID in the table (FIG. 11) of the view list stored in the viewing history storage nonvolatile memory 29 (step S744). At this time, the channel controller erases the oldest "seven weeks ago" viewing history information among the so-far viewing history information of "one week ago" to "seven weeks ago" shown in FIG. 11, shifts the respective viewing history information of "one week ago" to "six weeks ago" to right by an amount corresponding to one week, and writes the data about the current time frame as the viewing history information of "one week ago". Finally the channel controller determines whether or not the number of files already read or written coincides with the number of files to be processed (step S745). If failing to find a coincidence therebetween, the channel controller reads a next file. If not, the channel controller terminates its file updating process.

Figure 17:
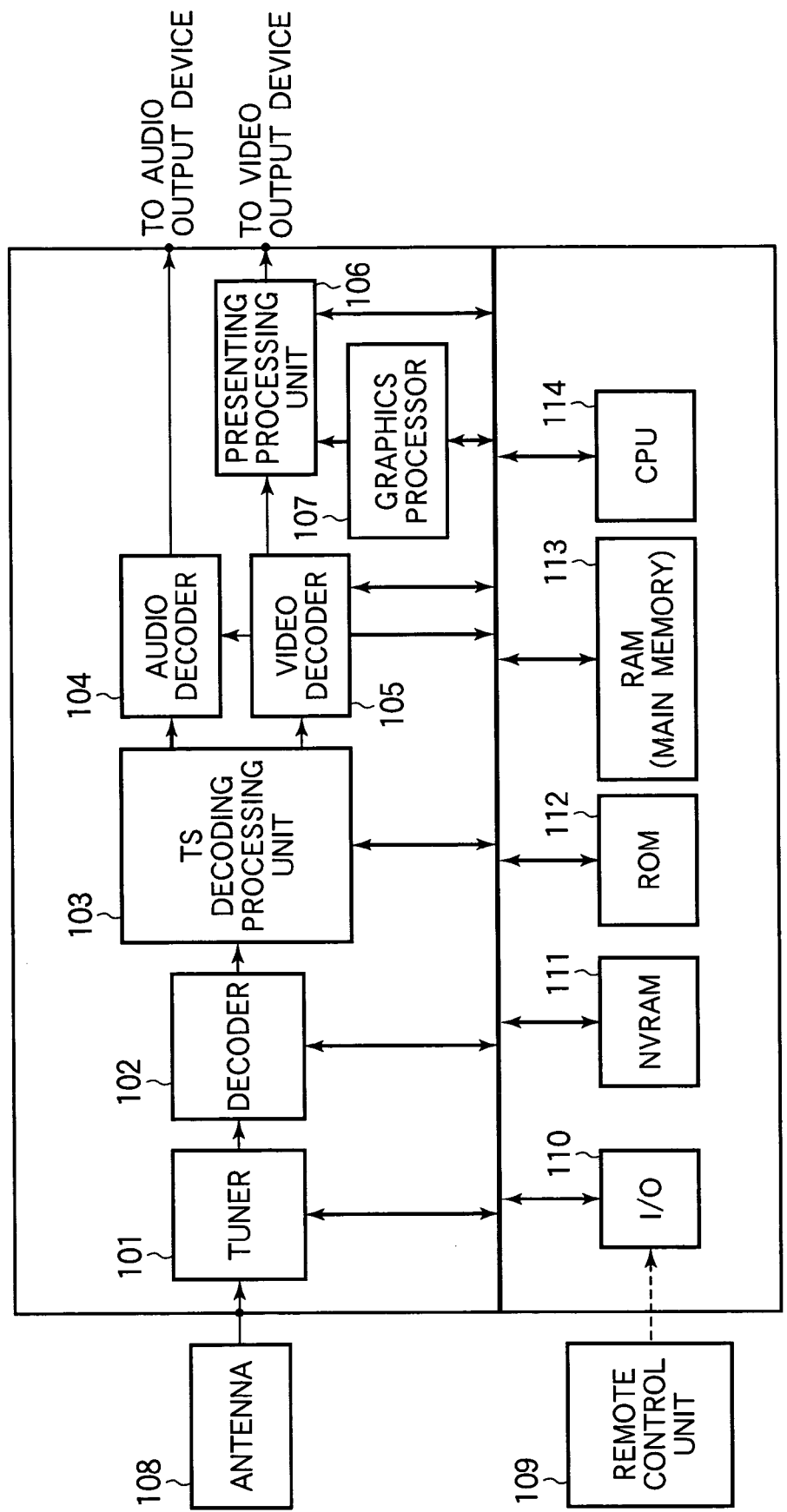
FIG. 17 is a diagram showing an example of a hardware configuration of a viewing history storage device in the second embodiment.

FIG. 17 is a block diagram showing an exemplary hardware configuration of a broadcast receiver set including a viewing history storage device according to the second embodiment. Explanation has been made in connection with the case where the broadcast receiver set including the viewing history storage device according to the second embodiment is divided into functional blocks in FIG. 1. However, explanation will be described as to a specific hardware configuration herein.

As shown in FIG. 17, the broadcast receiver set including the viewing history storage device according to the second embodiment includes a remote control unit 109, an input/output (I/O) unit 110, a nonvolatile RAM (NVRAM) 111, a ROM 112, a RAM (main memory) 113, a CPU 114, an antenna 108, an audio decoder 104, a video decoder 105, a graphics processor 107, and a presenting processing unit 106.

In FIG. 17, an input received by the I/O unit 110 from the remote control unit 109 is transmitted to the CPU 114 via a bus. The CPU 114 analyzes the received input. When a channel button on the remote control unit 109 is pressed, a channel controller instruction is transmitted to the tuner 101 from the CPU 114. The tuner 201 in turn switches the received wave so as to receive the specified channel. The broadcast wave received by the antenna 108 is demodulated by a demodulator 202, and then divided by a TS decoder 203 into an audio signal and a video signal. The separated signals are decoded by the audio decoder 104 and the video decoder 105 respectively. The audio signal is output to an audio output device, whereas the video signal is overlapped in the presenting unit 106 with a graphics output from the graphics processor 107 and then output to a video output device.

Concurrently with the aforementioned broadcast wave receiving operation and output operation, the CPU 114 stores a channel before channel change and a view continuation time for the channel in the RAM 113. The CPU 114 includes an internal timer, which outputs a timer notification at intervals of ten minutes. Each time the timer notification is output, the CPU 114 writes the channel and view continuation time stored in the RAM 113 into the nonvolatile RAM 111.

As has been described above, the second embodiment is arranged so as to manage the viewing history on the basis of the time frame (area), and to store the viewing history information including the channel viewed by the user in each time frame and including the viewing time of the corresponding channel in the viewing history storage nonvolatile memory 29. Therefore, even when the view start time in last week fails to coincide with the view start time in this week, the embodiment can suitably store the viewing history information.

In the second embodiment, since the viewing history for each day of a week is divided by a constant time to be managed on the basis of the time divisions, the embodiment can obtain user's favorite broadcast program according to day of the week and time.

In the second embodiment, further, the time frame is time measured in units of a further-divided time duration, and the viewing times for the same channel are accumulated. Thus the second embodiment can reduce the used amount of the viewing history storage nonvolatile memory 29.

In the second embodiment, in addition, the channel list having the network IDs, the service IDs, and the logic channels associated therewith is used. As a result, the second embodiment can eliminate the need for storing the network ID and the service ID in the viewing history storage nonvolatile memory, and thus can further reduce the capacity of the viewing history storage nonvolatile memory. Since the viewing history information for a plurality of weeks for each logic channel is stored, furthermore, the second embodiment can reliably obtain user's favorite program.

In the second embodiment, when the latest viewing history information is written in the viewing history storage nonvolatile memory, the oldest ("seven weeks ago") viewing history information is erased and the other viewing history information are shifted to right by an amount corresponding to one week. Thus the second embodiment can store the viewing history information for a plurality of weeks while avoiding increase of the used amount of the viewing history storage nonvolatile memory 29.

Further, since the second embodiment writes the viewing history in the viewing history storage nonvolatile memory 29 each time the second embodiment receives a timer notification, the second embodiment can suitably clear the viewing history temporary storage memory 26 to get ready for storage of the next viewing history, and can reduce the used amount of the viewing history temporary storage memory 26.

Third Embodiment

The third embodiment is a modified example of the second embodiment. In the third embodiment, information other than viewing channels, for example, information relating to viewing programs is stored as viewing history information. In this way, in addition to the viewing channel history, a history of the information relating to view programs is stored. Thus the third embodiment can search for a desired program meeting user's preference at a higher level.

The view program information (abbreviated to the program information) includes various sorts of information including program genre, title, performer, program contents, copy control information, stream type, information indicative of whether a program is one of programs broadcast in series or a special program, and information indicative of whether the program is a rebroadcast program, a new program, or a final program. Explanation will be made herein in connection with a case where program genre information as the program information is stored. The program genre information is acquired by genre specification in a content descriptor of the broadcast program layout information. Information obtained by the genre specification will be referred to as the genre code, hereinafter.

Figure 18:
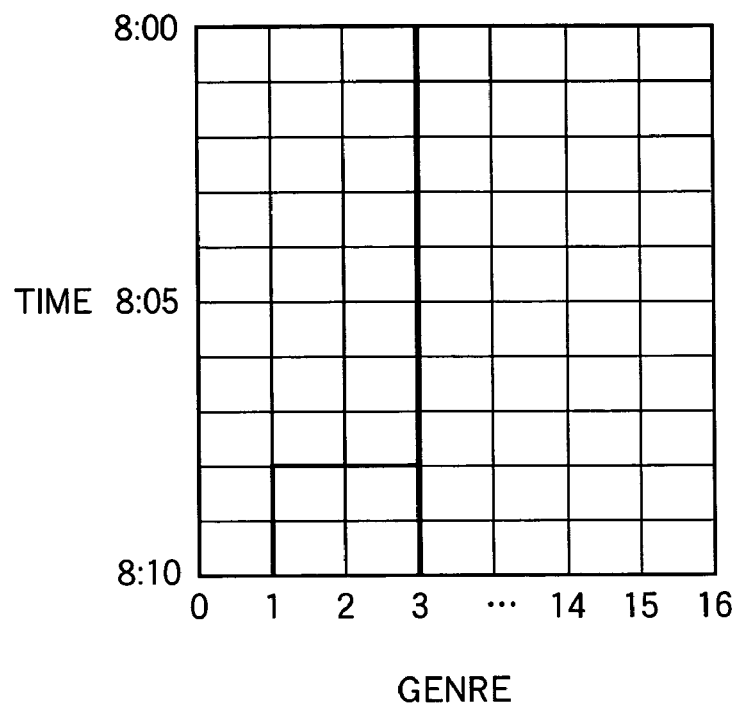
FIG. 18 is a diagram showing an example of a genre viewing history in a third embodiment of the present invention.

FIG. 18 is a graph showing when the user views two programs of different genres in a time frame (i.e., area) from 8:00 to 8:10 on a day of the week. Switchover of a program being viewed is made when the user changes the channel using a remote control unit or the like or when the program is changed during continuous view of the same channel. In an example shown in FIG. 18, the user views a program of a genre code '3' during a time period from 8:00 to 8:08, the user changes the program to a program of a genre code '1' at 8:08, and the user views the program of the genre code '1' continuously till 8:10.

Figure 19:
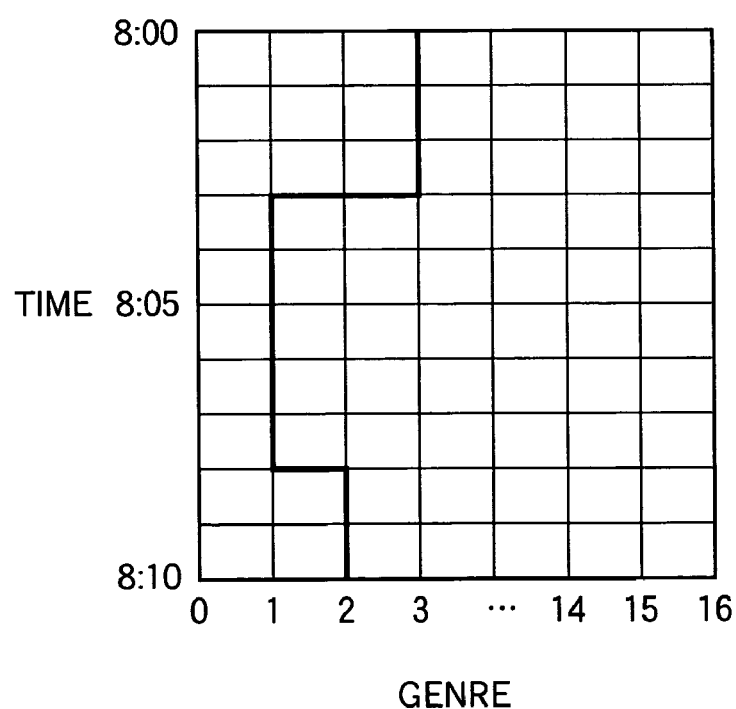
FIG. 19 is a diagram showing another example of the genre viewing history in the third embodiment.

FIG. 19 is a graph showing when the user views three programs of different genres in a time frame from 8:00 to 8:10 on a day of the week. In an example shown in FIG. 19, the user views a program of a genre code '3' in a time period from 8:00 to 8:03, changes the program to a program of a genre code '1' at 8:03, changes the program to a program of a genre code '2' at 8:08, and views the program of the genre code '2' continuously until 8:10.

Figures 20, 21:
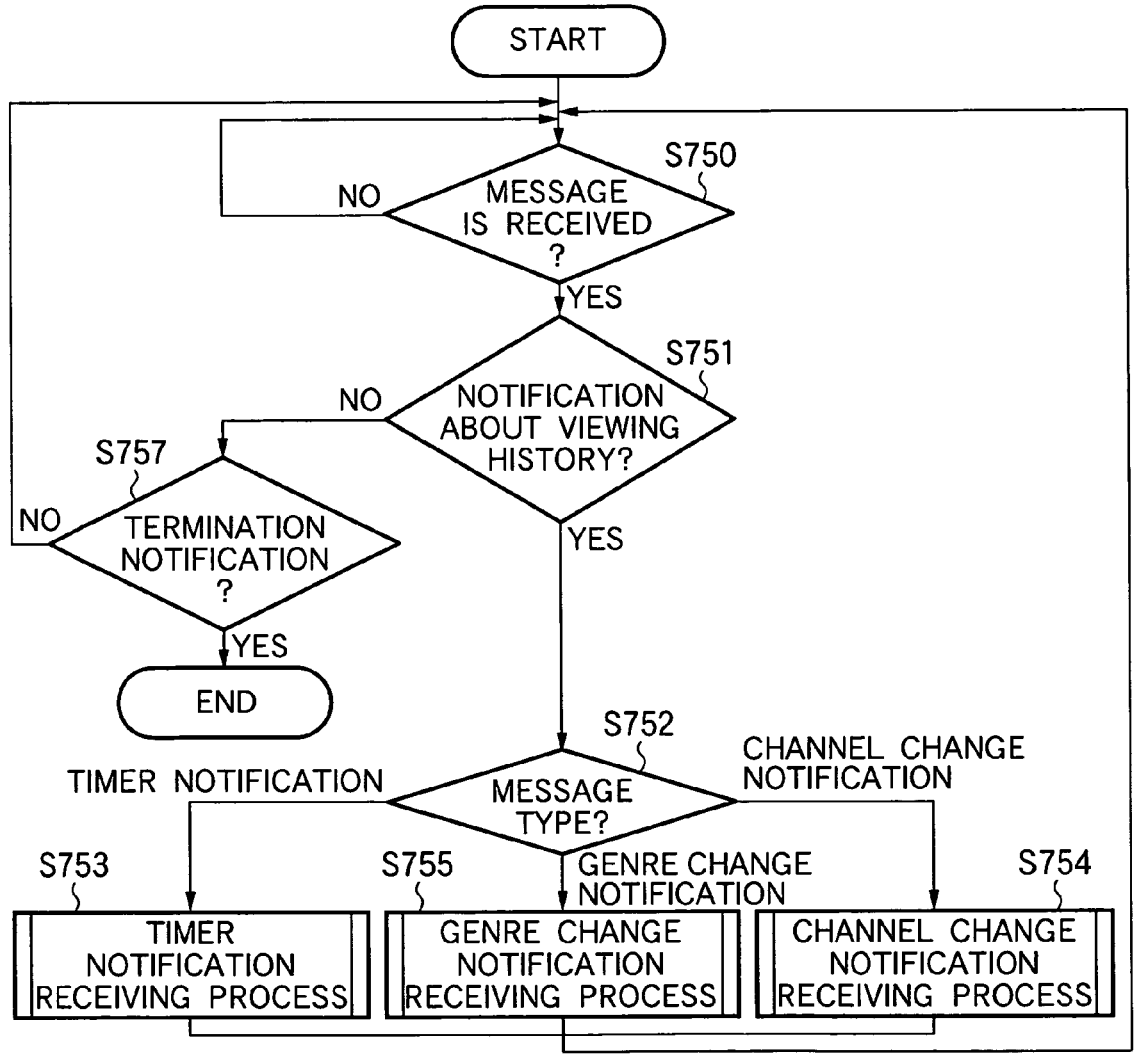
FIG. 20 is a diagram showing an example of a data structure of the genre viewing history in the third embodiment.
FIG. 21 is a flowchart showing a viewing history storing process in the third embodiment.

FIG. 20 is a diagram showing a data structure when a genre code is stored as viewing history information. As shown in FIG. 20, data indicative of an accumulated time of viewing times of programs of each genre code is registered in time frame columns of "one week ago" to "seven weeks ago".

In the data structure of FIG. 20, the genre code is made to coincide with the row number of an array having the genre code registered therein. With such a configuration, since it is only required to register viewing times corresponding to seven weeks, the amount of data can be reduced. As in the viewing history shown in FIG. 11, a maximum of ten minutes per genre can be expressed when 4-bit data is provided for one time frame. Thus even when data corresponding to seven weeks is stored, 28 bits (3 byte) (=4 bits×7) per genre is only required.

The view genre list exemplified in FIG. 20 is created one for each area described by referring to FIG. 7, but no view list is created for no view area.

Figure 22:
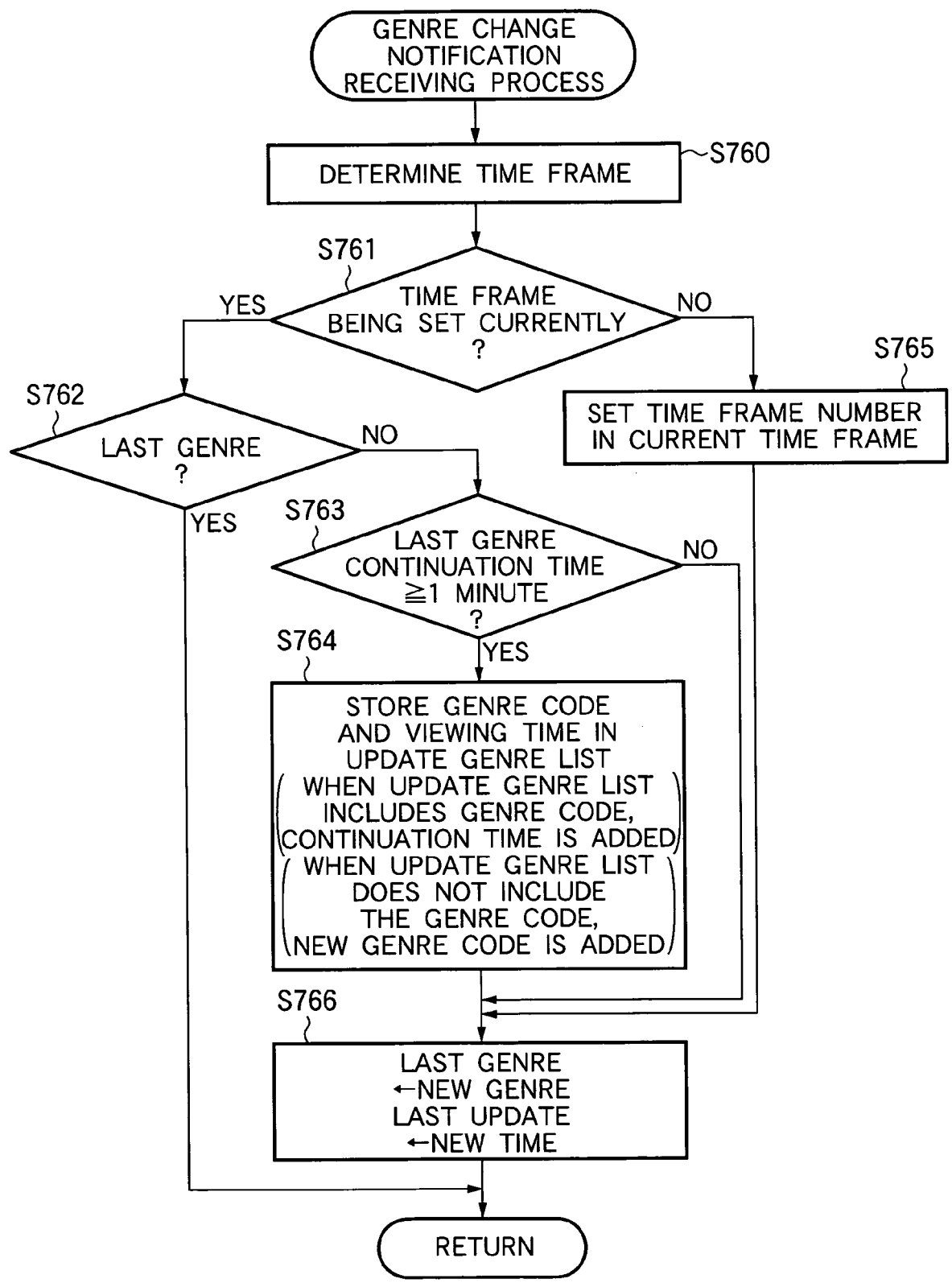
FIG. 22 is a flowchart showing a genre change notification receiving process in the third embodiment.

FIG. 21 and FIG. 22 are flowcharts showing viewing history storing process executed by the program software under control of the channel controller 25 (FIG. 12) of the third embodiment.

FIG. 21 is a diagram showing the entire viewing history storing process of the third embodiment. As shown in FIG. 21, the viewing history storing process in the third embodiment includes 3 tasks of timer notification receiving process (step S753), channel change notification receiving process (step S754), and genre change notification receiving process (step S755). The channel controller receives an instruction from the remote control unit 5 in the form of a message and executes the task.

In the viewing history storing process in the third embodiment, the channel controller first waits for a message, i.e., an instruction from the remote control unit, a notification from the timer 24, or a genre change notification (step S750). When receiving the message, the channel controller determines whether or not the message relates to the viewing history (step S751). When the message relates to the viewing history, the channel controller determines that the message indicates the channel change notification, the timer notification, or the genre change notification (step S752).

The "genre change notification" refers to a message output when the user changes the channel to change the viewing program or when the program is changed and its genre is changed during continuous view of the same channel.

When the message is the genre change notification, the channel controller executes genre change notification receiving process (step S755) which will be described below. When the message is the channel change notification, the channel controller executes the channel change notification receiving process (step S754) described in the second embodiment. When the message is the timer notification, the channel controller executes the timer notification receiving process (step S753) described in the second embodiment.

After executing the step S753, S754 or S755, the channel controller returns to the message reception waiting operation (step S750) to wait for the next message. When the message received at the step S750 is an end notification output from the remote control unit through the power turning-off operation or the like (step S757), the channel controller terminates the viewing history storing process.

Explanation has been made as to the contents of the channel change notification receiving process and the timer notification receiving process in the second embodiment. Thus the contents of the genre change notification receiving process (step S755) will now be made.

FIG. 22 is a flowchart showing details of the genre change notification receiving process (step S755 in FIG. 21). When determining that the genre was changed, the channel controller 25 first calculates a time frame for the changed genre (step S760), and determines whether or not the calculated time frame is the currently-set time frame (step S761). When the calculated time frame is the currently-set time frame, the channel controller determines whether or not the genre announced by the genre change notification is the genre code (last genre) so far viewed (step S762). When the genre code announced by the genre change notification is the same as the last genre, the channel controller determines that no genre change was made, and waits for the next message without executing the steps S763 to S766 (step S750 in FIG. 21). When the genre code announced by the genre change notification is different from the last genre, the channel controller determines that genre change was made, and determines whether or not a time period (last genre continuation time) during which the user has been viewed the genre before the change is equal to or less than one minute (step S763). When the last genre continuation time is equal to or less than one minute, the channel controller executes updating process (step S764) which follows.

In the updating process (step S764), the channel controller registers the genre code (last genre) of the program so far viewed and its viewing time (last genre continuation time) in the "update genre list" for registering a genre change history of ten minutes. When the genre code (last genre) to be added is already present in the update genre list, the channel controller adds the last genre continuation time to a continuation time (duration) already written in the update genre list. When the genre code to be added is not present in the update genre list, the channel controller creates a new genre item in the update genre list, and registers the genre code and the last genre continuation time in the new item.

In the step S763, when the channel controller determines that the last genre continuation time is smaller than one minute, the channel controller determines that the user is changing the channel at high speed to search for a program (or is so-called zapping), and the process proceeds to the step S766 without executing the updating process (step S764).

In the step S766, the channel controller the value of the last genre as the genre code of the so-far-viewed program. The channel controller further changes a time (last genre update time or last update) at the time of the previous genre change to the current time point (new time point) when the genre code was made.

In the step S761, when the current time frame is different from the time frame so far processed, the channel controller sets the calculated value as a time frame number to be set in the current time frame (step S765), and shifts to the step S766. As already described even in the second embodiment (step S715 in FIG. 13), there occurs a situation that a time frame number is not present yet. Thus the channel controller performs the time frame number setting operation in the step S765. Even when the system timer becomes out of order for some reason, the invention can prevent generation of an error in the subsequent operations by executing the operation of the step S765.

A set of the genre code and the viewing time stored in the viewing history temporary storage memory 26 through the genre change notification receiving process shown in FIG. 22 is stored in the viewing history storage nonvolatile memory 29 as genre history information through timer receiving operation similar to the second embodiment described by referring to FIG. 14 and FIG. 15. After the genre history information is stored in the viewing history storage nonvolatile memory, the viewing history temporary storage memory 26 is cleared to reserve an area for storing the genre history of the next time frame.

As has been described above, since program information such as genre and its viewing time are stored in addition to the viewed-channel history, the third embodiment can perform program searching operation or the like to find a user's favorite program meeting her or his preference.

Since the third embodiment further measures time in units of a time interval corresponding to each of time divisions of a time frame and stores an accumulation of viewing times corresponding to the same program information (genre, etc.), the third embodiment can reduce the used amount of the viewing history storage nonvolatile memory 29.

Fourth Embodiment

The fourth embodiment corresponds to a modified example of the first embodiment. In the recommended program search device according to the first embodiment, since it is only the viewing time corresponding to last week that is registered in the history file, user's view tend cannot be sufficiently reflected sometimes. In a recommended program search device according to the fourth embodiment of the present invention, explanation will be made as to a method of solving the problem in the aforementioned related art that it is difficult to reflect user's view tendency more accurately and to quickly cope with a change in user's view program. The fourth embodiment will be described by referring also to FIG. 2.

The recommended program search device according to the fourth embodiment stores user's viewing history information through the operations of FIGS. 3A and 3B. More specifically, the device processes channels so far viewed corresponding to a plurality of past weeks and a viewing time thereof, and stores them as user's viewing history information. The recommended program search device according to the fourth embodiment stores a viewing time corresponding to, for example, past three weeks. Assume further that the area division time D is fifteen minutes as in the first embodiment. FIG. 23 is a diagram showing an example of a history file when a view file for an area is seen. In FIG. 23, more specifically, with regard to an area, the user viewed Channel '2' for zero minutes in past one week, for ten minutes in past two weeks, and for fifteen minutes in past three weeks. And the user viewed Channel '5' for fifteen minutes in past one week, for five minutes in past two weeks, and for zero minutes in past three weeks.

A point for a channel is calculated by multiplying viewing times (in minutes) by different coefficients Pn (n is a positive integer) for different past weeks and adding the multiplied results of the coefficients and the viewing times. More in detail, a point for Channel '2' is $(0 \times P1) + (10 \times P2) + (15 \times P3)$.

A point for Channel '5' is $(15 \times P1) + (5 \times P2) + (0 \times P3)$.

In this connection, the coefficients P1, P2, and P3 may be the same numeric value. However, a change in user's viewing program can be expressed by setting the coefficient for the viewing time closer to the current time point to have a higher value and setting the coefficient for the viewing time farther than the current time point to have a lower value. For example, when the coefficients $\{P1, P2, P3\} = \{3, 2, 1\}$, Channel '2' has a point of $35 (= (0 \times 3) + (10 \times 2) + (15 \times 1))$, and Channel '5' has a point of $55 (= (15 \times 3) + (5 \times 2) + (0 \times 1))$.

It is assumed in the fourth embodiment of the present invention that a threshold is provided for such a calculated point and the embodiment performs user's favorite program searching operation only for a channel having a point not higher than the provided threshold. For example, when the threshold of 50 points is set, Channel '2' is excluded from the viewing history information of FIG. 23 in the user's favorite program searching operation; whereas, the user's favorite program searching operation is carried out for Channel '5'. The user's favorite program searching operation can be implemented by such a flowchart as shown in FIG. 8.

In the fourth embodiment, viewing times corresponding to past three weeks are stored. However, the present invention is not limited to this example. For example, a period for storage of the viewing times may be reduced to past two weeks, be increased to past five weeks, or data corresponding to past ten weeks may be stored.

In the fourth embodiment, it is necessary for the number of weeks in the viewing time storage period to coincide with the number of coefficients.

In the fourth embodiment, the coefficients $\{P1, P2, P3\}$ has been set to $\{3, 2, 1\}$. However, the present invention is not limited to the above values. For example, the coefficients may be set to a constant value (as when $\{P1, P2, P3\} = \{1, 1, 1\}$), or may be set to cause a large change (as when $\{P1, P2, P3\} = \{10, 5, 1\}$). However, it is desirable that the coefficient P1 be larger than or equal to the coefficient P2 and the coefficient P2 be larger than or equal to P3.

In the fourth embodiment, the threshold for selection of target channels for the user's favorite program searching operation has been set to 50 points. However, the threshold is not limited to this value, but may be set to 30 points or 10 points. Or the threshold may be set to be higher than 50 points, for example, to 80 points or 100 points.

As has been described above, in the recommended program search device according to the fourth embodiment, only a channel based on the viewing history information closer to the current time point is used as a search target channel. Thus the fourth embodiment can solve the problem in the related art that the storage of the viewing channels and viewing times corresponding to past one weeks or a plurality of past weeks causes a large number of viewing times, so that, even when the channel frequently viewed by the user is changed, for example, after program organization timing, the related art cannot cope with it in a short time.

The fourth embodiment can reflect user's preference more accurately by providing various values to the coefficients.

The configuration of the fourth embodiment is the same as those of the first to third embodiments, except for the above respects.

Fifth Embodiment

The fifth embodiment corresponds to a modified example of the first embodiment. The recommended program search device according to the first embodiment determines all the scheduled programs broadcast in the search target area as user's favorite programs and thus detect a plurality of programs as recommended programs. In order to more suitably detect user's favorite programs, the recommended program search device according to the fifth embodiment of the present invention determines, especially when a single or a plurality of programs which start broadcasting or terminate broadcasting in an area are present in the area, whether to include any of such programs in user's favorite programs. In the fifth embodiment, explanation will be made as to how to solve the problem in the related art that the prior art can identify a user's favorite channel but cannot identify a user's favorite program. The fifth embodiment will be described by referring also to FIG. 2. In the fifth embodiment, explanation will be made in connection with a case where there are present two programs which start broadcasting and terminate broadcasting in an area.

Figure 25:
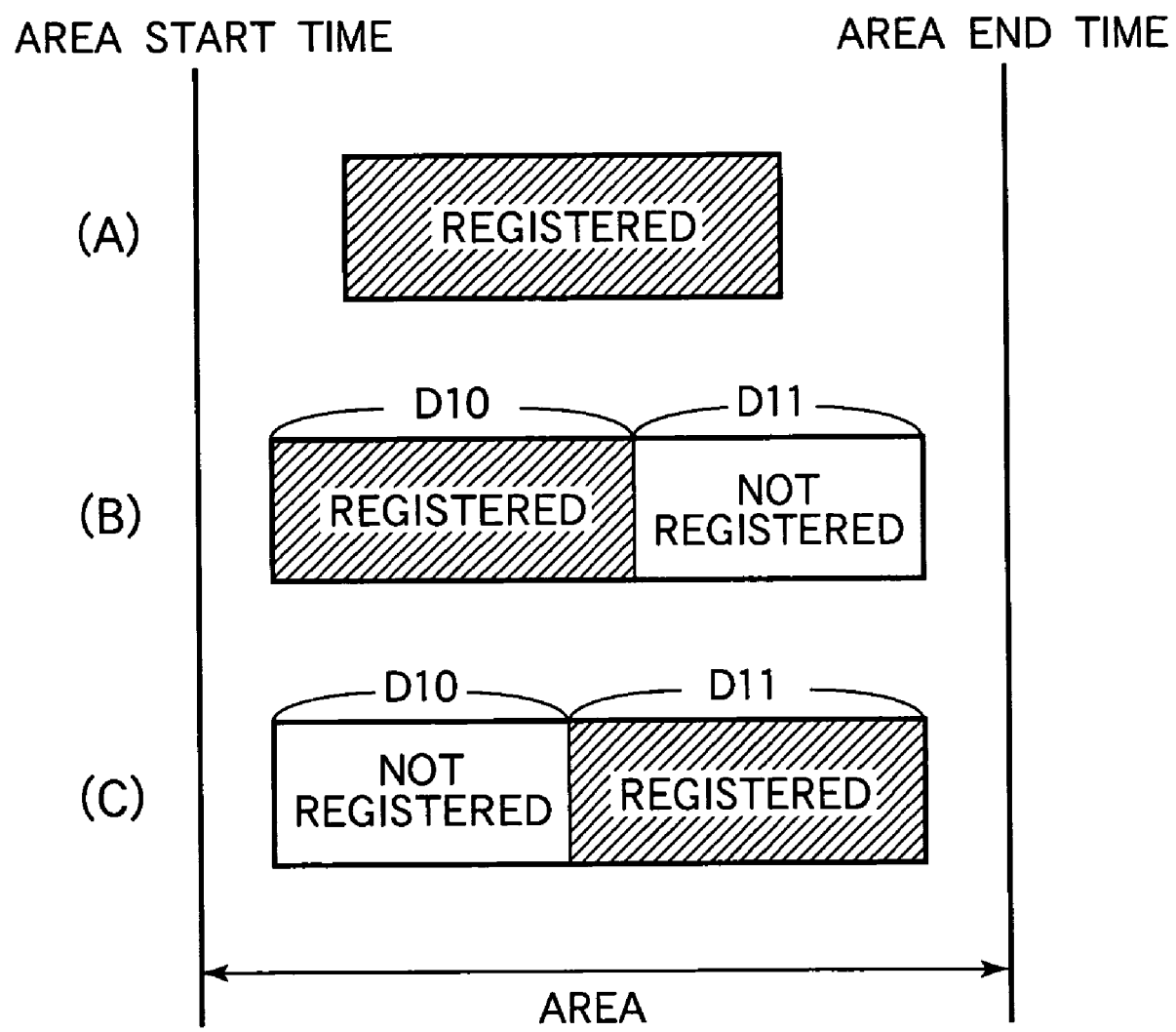
FIG. 25 is a diagram showing a specific example of a user's favorite program detected in the fifth embodiment.

In the fifth embodiment, when a single program which starts broadcasting in the search target area and terminates broadcasting in the area is present in scheduled broadcast programs broadcast on the same channel as the viewing channel included in the viewing history information, the search block 72 determines the program as a user's favorite program (the program being shown by (A) in FIG. 25 to be described later). When a plurality of programs which starts broadcasting in the search target area and terminates broadcasting in the area are detected, the search block determines one of the programs which has the longest broadcast continuation time as a user's favorite program (as shown by (B) and (C) in FIG. 25 to be described later).

Figure 24:
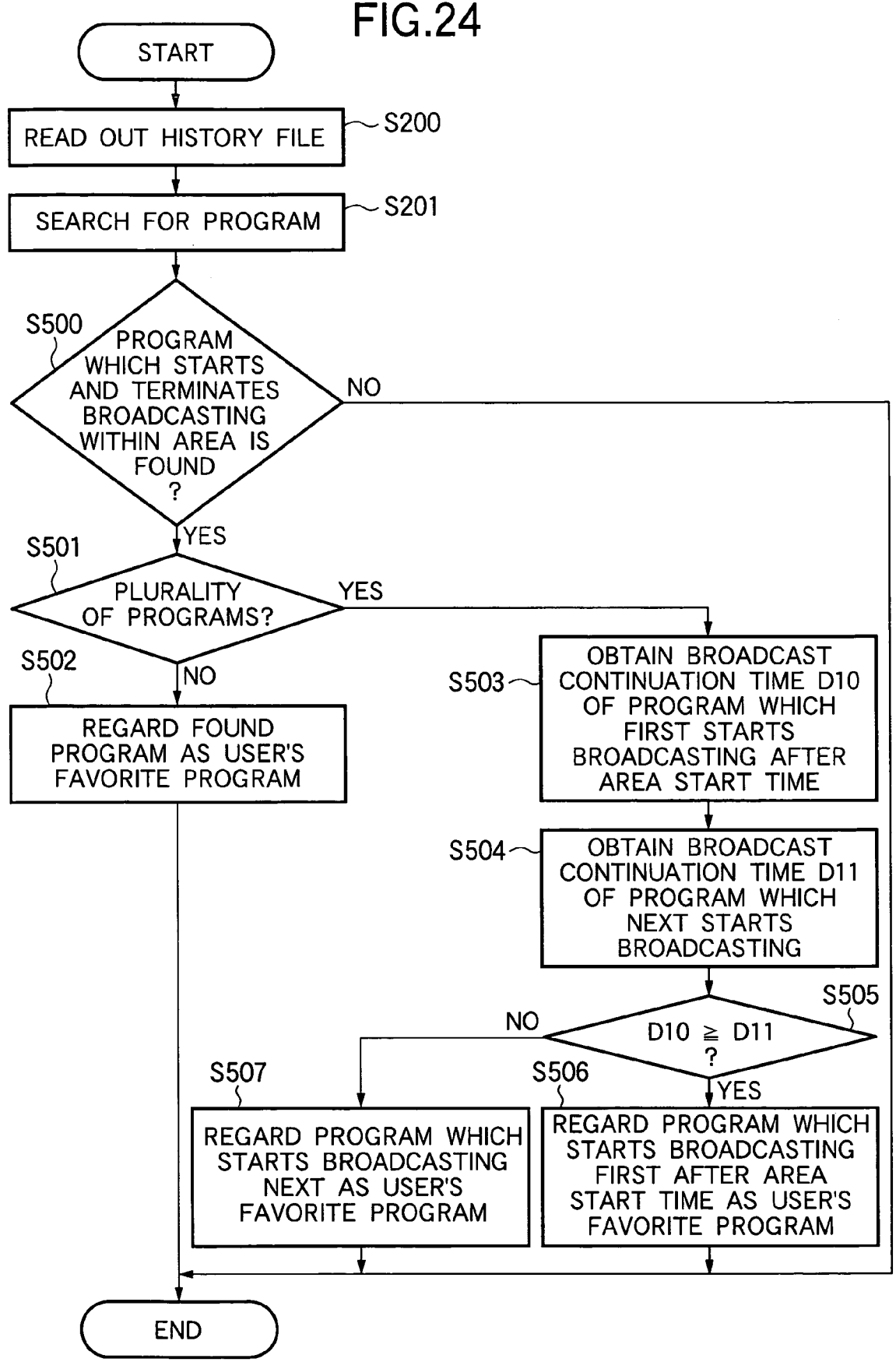
FIG. 24 is a flowchart showing a method of storing user's viewing history information in a fifth embodiment of the present invention.

FIG. 24 is a flowchart showing how to identify a user's favorite program in the recommended program search device according to the fifth embodiment. FIG. 25 is a diagram showing a specific example of the user's favorite program detected in the recommended program search device according to the fifth embodiment.

The flowchart of FIG. 24 is a diagram showing operations when there is or are present a single or a plurality of programs which start(s) broadcasting on and after an area start time (that is, at the same time as the area start time or after the area start time) and terminate(s) broadcasting before an area end time (that is, at the same time as the area end time or before the area end time). In view of the fact that, when the user views the program, the rate of the broadcast continuation time occupied in the area is also higher, the user's favorite program is determined.

As shown in FIG. 24, in the recommended program search device according to the fifth embodiment, the device reads out at a step S200 a history file in a desired area from the storage 8, and examines whether or not there is a channel to be searched for in the history file. In the presence of a search target channel, in order to identify a user's favorite program on the basis of the contents read out from the history file, the device reads out, at a step S201, scheduled broadcast program information stored in the storage 8, and searches for a scheduled broadcast program on the search target channel.

At the next step S500, the device searches for a program which starts broadcasting in the area and terminates broadcasting in the area. In the presence of such a program (when the determination of the step S500 is YES), the process proceeds to the step S501. In the absence of such a program (when the determination of the step S500 is NO), the device determines that there is no scheduled broadcast program in the search target area and terminates the program software.

At the step S501, the device determines whether there is a single or a plurality of programs which start(s) broadcasting in the area and terminate(s) broadcasting in the area. When there is only a single program which starts broadcasting in the area and terminates broadcasting in the area (when the determination of the step S501 is NO), the process proceeds to a step S502, and the device registers the program (shown by (A) in FIG. 25) starts broadcasting in the search target area and terminates broadcasting in the area as a user's favorite program (shown by (A) in FIG. 25), and terminates the program.

When there are a plurality of programs which start broadcasting in the area and terminate broadcasting in the area (when the determination of the step S502 is YES), the process proceeds to a step S503.

At the step S503, the device reads out the broadcast continuation time of the program which first starts broadcasting after the area start time (including the area start time, which will be applied even to the later description) from program information stored in the storage 8. The value of the read broadcast continuation time will be referred to as the broadcast continuation time D10 hereinafter.

At a step S504, the device acquires the broadcast continuation time of the program to be broadcast after the program which starts broadcasting first after the area start time. The value of the acquired broadcast continuation time will be referred to as the broadcast continuation time D11, hereinafter.

At a step S505, the device compares the broadcast continuation time D10 with the broadcast continuation time D11. When the broadcast continuation time D10 is larger than or equal to the broadcast continuation time D11 (when the determination of the step S505 is YES), the process proceeds to a step S506, and the device registers the program which starts broadcasting first after the area start time as a user's favorite program (shown by (B) in FIG. 25) and terminates the program software. When the broadcast continuation time D10 is smaller than the broadcast continuation time D11 (when the determination of the step S505 is NO), the process proceeds to a step S507, and the device registers the program to be broadcast next to the program which starts broadcasting first after the area start time as a user's favorite program (shown by (C) in FIG. 25) and terminates the program software.

The recommended program search device according to the fifth embodiment has been arranged so that, when the broadcast continuation time D10 is equal to the broadcast continuation time D11, the process proceeds to the step S506 at the step S505 in the flowchart of FIG. 24. However, such a configuration may be possible that, when the broadcast continuation time D10 is equal to the broadcast continuation time D11, the process proceeds to the step S507. In addition, the device may also be arranged so as to determine both the program which starts broadcasting first after the area start time and the program to be broadcast next to the first program as user's favorite programs.

The above explanation has been made in connection with the case where there are two programs which start broadcast in the area and terminate broadcasting in the area at the steps S503 to S507 in FIG. 24. However, when there are three or more programs which start broadcasting in the area and terminate broadcasting, the device is only required to determine one of the three or more programs which has the longest broadcast continuation time as a user's favorite program.

As has been described above, when determining the program as the user's favorite program, the recommended program search device according to the fifth embodiment determines it on the basis of the additional broadcast continuation time and thus can more accurately determine the user's favorite program meeting the user's preference.

In accordance with the recommended program search device according to the fifth embodiment, the user can easily select his favorite program by reducing the number of candidates of user's favorite programs.

The fifth embodiment is the same as the aforementioned first to fourth embodiments, except for the above respects.

Sixth Embodiment

The sixth embodiment corresponds to a modified example of the first embodiment. In the recommended program search device according to the first embodiment, all scheduled programs broadcast in the search target area have been determined as the user's favorite programs. That is, a plurality of programs have been detected. In the recommended program search device according to the sixth embodiment of the present invention, on the other hand, in order to suitably detect a user's favorite program, the device determines whether or not to include the program, in particular, being broadcast at the area start time in the user's favorite programs. Explanation will be made as to how to solve the problem in the related art that user's favorite program-cannot be identified though the user's favorite channel can be identified. The sixth embodiment will be described by referring also to FIG. 2.

In the recommended program search device according to the sixth embodiment, the search block 72 determines, as a user's favorite program, one of scheduled broadcast programs broadcast on the same channel as the viewing channel included in the viewing history information, which starts broadcasting at the area start time. When failing to detect a program which starts broadcasting at the area start time, the search block 72 determines, as the user's favorite program, the program which starts broadcasting first in the area after the area start time. When failing to detect a program which starts broadcasting at the area start time and a program which starts broadcasting first in the area after the area start time, the search block 72 determines the program being broadcast at the area start time as a user's favorite program.

Figure 26:
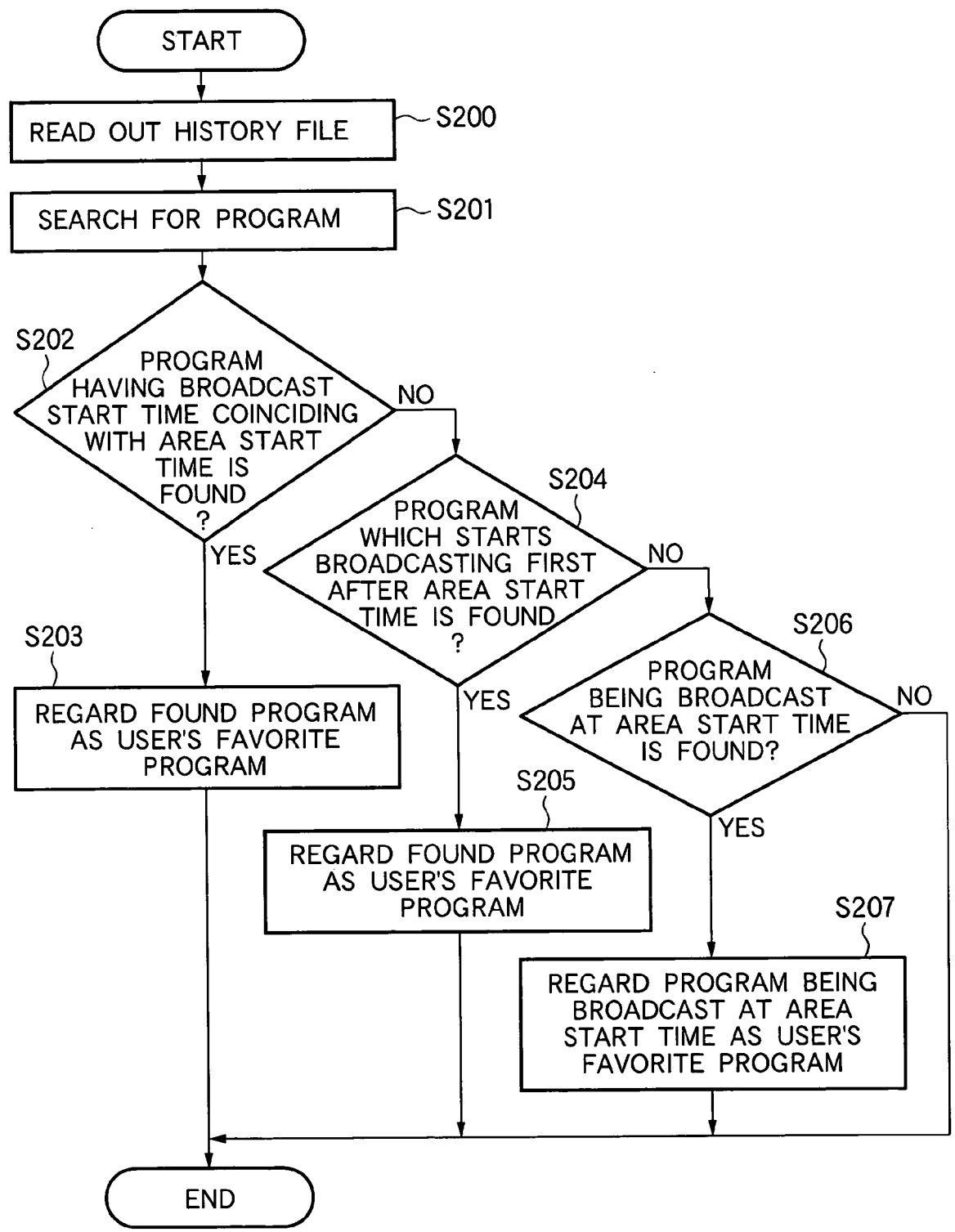
FIG. 26 is a flowchart showing a method of identifying a user's favorite program in a recommended program search device according to a sixth embodiment of the present invention.
Figure 27:
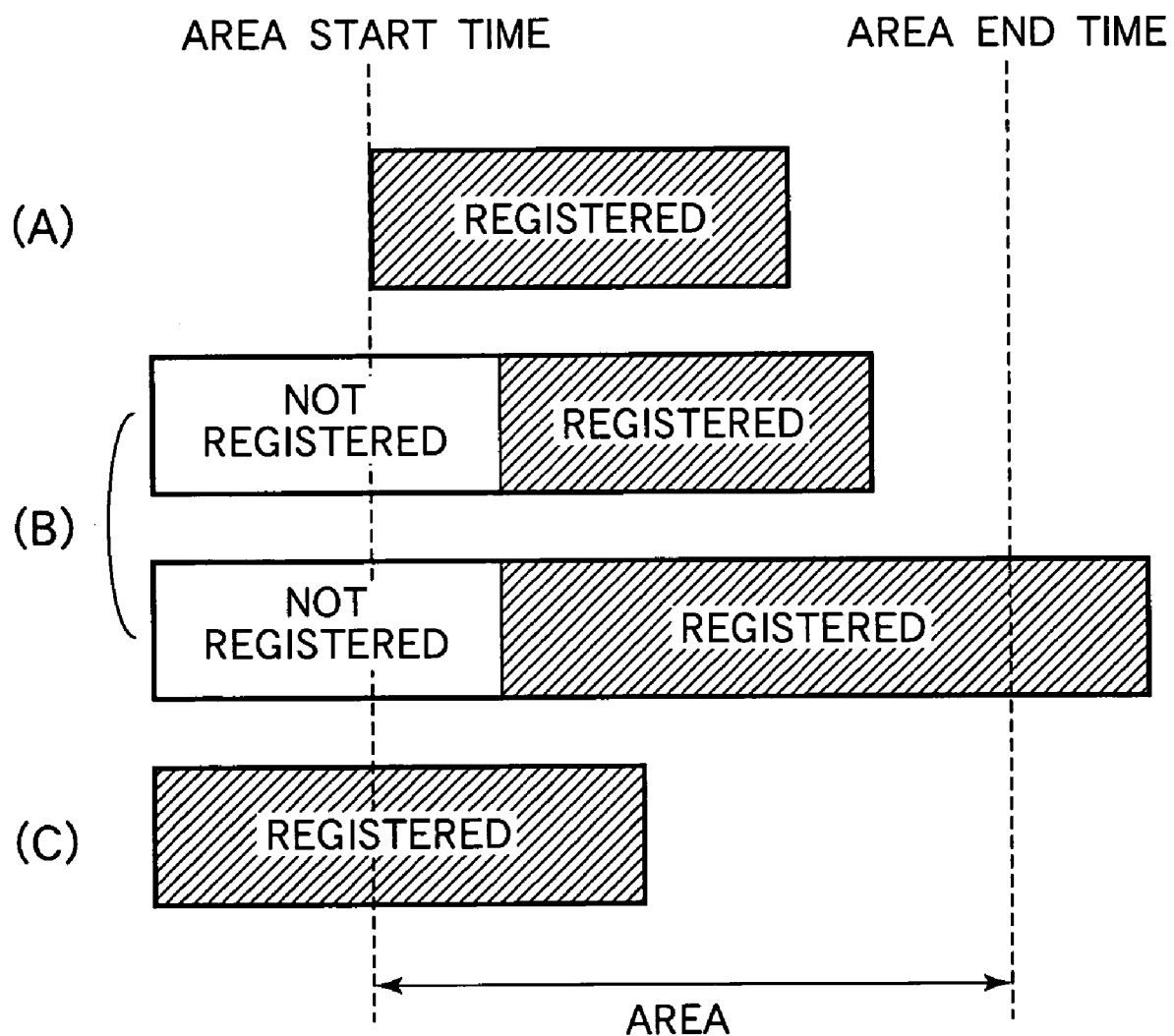
FIG. 27 is a diagram showing a specific example of a user's favorite program detected in the recommended program search device in the sixth embodiment.

FIG. 26 is a flowchart showing how to identify a user's favorite program in the recommended program search device according to the sixth embodiment. FIG. 27 is a diagram showing a specific example of programs detected in the recommended program search device according to the sixth embodiment.

The recommended program search device according to the sixth embodiment determines a user's favorite program on the basis of the fact that, when a user views a program, the user selects a channel to want to view before the broadcasting of the desired program starts.

At the step S200, the device reads out a history file having the read target area registered therein from the storage 8 and examines whether or not a channel to be searched for is present. When the search target channel is present, in order to identify the user's favorite program on the basis of contents read out from the history file at the step S201, the device reads out scheduled broadcast program information stored in the storage 8 therefrom, and searches for a scheduled broadcast program on the search target channel.

After completing to search for the program associated with the search target area, the device calls a history file having information relating to the next area registered therein, and repeats the operations of the step S201 and subsequent steps.

At the step S202, the device searches for a program having the area start time coinciding with the program broadcast start time. When finding a program having the same area start time coinciding with the program broadcast start time (when the determination of the step S202 is YES), the process proceeds to a step S203, and the device stores the found program in the storage 8 as a user's favorite program (shown by (A) in FIG. 27). When failing to find a program having the area start time coinciding with the program broadcast start time (when the determination of the step S203 is NO), the process proceeds to a step S204.

At the step S204, the device searches for a program which starts broadcasting first after the area start time. When finding a program which starts broadcasting first after the area start time (when the determination of the step S204 is YES), the process proceeds to a step S205, and the device registers the program that has been searched for, as a user's favorite program (shown by (B) in FIG. 27) and terminates the program software.

When failing to find a program which starts broadcasting first after the area start time (when the determination of the step S204 is NO), the process proceeds to a step S206, and the device determines whether or not there is a program being broadcast at the area start time. When there is a program being broadcast at the area start time (when the determination of the step S206 is YES), the device registers the program being broadcast at the area start time as a user's favorite program (shown by (C) in FIG. 27) at a step S207, and terminates the program software. When a program being broadcast at the area start time is absent (when the determination of the step S206 is NO), the device determines the absence of a user's favorite program, and terminates the program software.

In the flowchart of FIG. 26, no consideration is paid to a program which starts broadcasting after the area start time and terminates broadcasting before the area end time. However, since such a program starts broadcasting and terminates broadcasting in the area, the program is registered as a user's favorite program.

In order to pay consideration to the fact that the user changes the channel after the desired view program already started, the recommended program search device according to the sixth embodiment can also have the same configuration as a modified example which follows. The search block 72 regards, as a user's favorite program, one of scheduled broadcast programs on the same channel as the viewing channel included in the viewing history information which starts broadcasting at the area start time. When failing to detect a program which starts broadcasting at the area start time, the device determines the program being broadcast at the area start time as the user's favorite program. When failing to detect a program which starts broadcasting at the area start time and a program being broadcast at the area start time, the device determines the program which starts broadcasting first in the area after the area start time as the user's favorite program.

Figure 28:
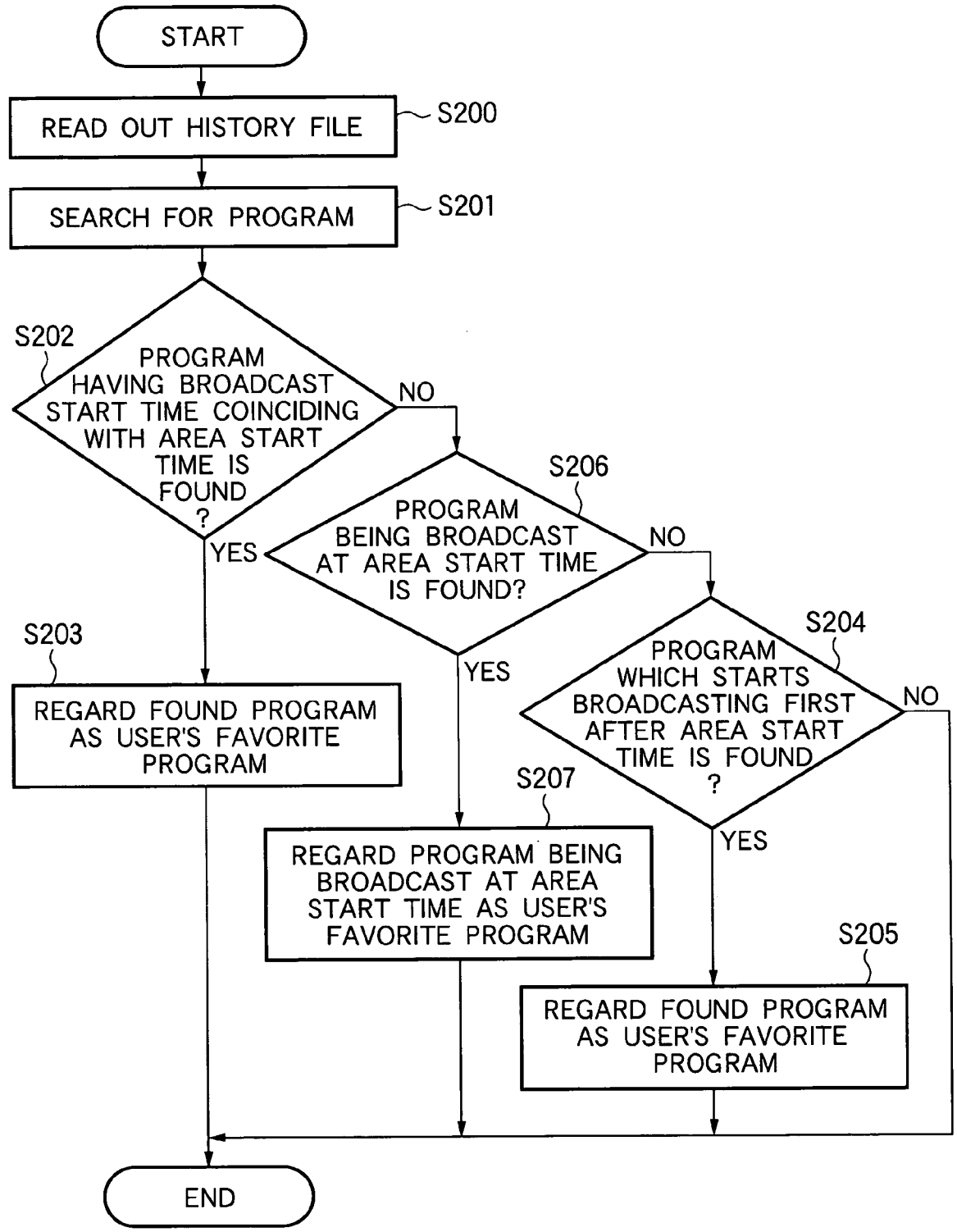
FIG. 28 is a flowchart showing a method of identifying a user's favorite program in a modified example of the recommended program search device according to the sixth embodiment.
Figure 29:
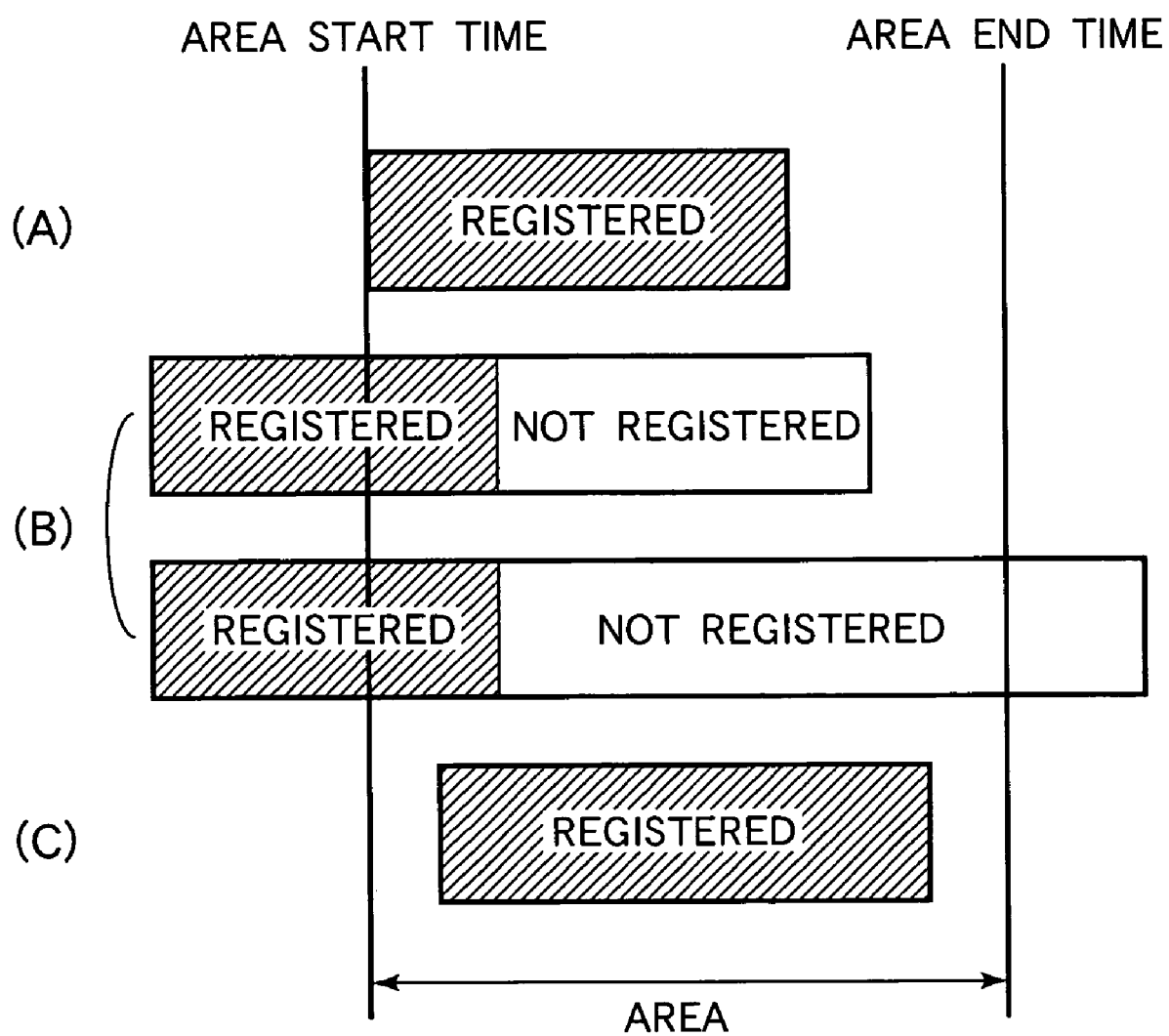
FIG. 29 is a diagram showing a specific example of the user's favorite program detected in the modified example of the recommended program search device according to the sixth embodiment.

FIG. 28 is a flowchart showing how to identify a user's favorite program in the recommended program search device according to the sixth embodiment. FIG. 29 is a diagram showing a specific example of user's favorite programs detected in a modified example of the recommended program search device according to the sixth embodiment. In the flowchart of FIG. 26, on the basis of the determination of the step S204, the program broadcast first after the area start time is registered as the user's favorite program. However, as shown in FIG. 28, such a configuration may also be possible that, when failing to find a program having the broadcast start time coinciding with the area start time (when the determination of the step S202 is NO), the process proceeds to the step S206, and the device registers the program being broadcast at the area start time as a user's favorite program (shown by (B) in FIG. 29); whereas, in the absence of the program being broadcast, the device registers the next program as a user's favorite program (shown by (C) in FIG. 29).

In the flowchart of FIG. 28, no consideration is paid to a program which starts broadcasting after the area start time and terminates broadcasting before the area end time. However, since such a program starts and terminates broadcasting in the area, the program is registered as a user's favorite program.

As has been described above, the recommended program search device according to the sixth embodiment can facilitate searching for a user's favorite program and also can shorten a time necessary for the searching.

In accordance with the recommended program search device according to the sixth embodiment, the user can easily select a desired program by reducing the number of user's favorite program candidates.

The configuration of the sixth embodiment is the same as that of the foregoing first to fifth embodiments, except for the above respects.

Seventh Embodiment

The seventh embodiment corresponds to a modified example of the first embodiment. In the recommended program search device according to the first embodiment, all scheduled program broadcast in the search target area, that is, a plurality of programs are identified as user's favorite programs. In the seventh embodiment of the present invention, the user's favorite programs can be detected more suitably. Explanation will also be made herein as to how to solve the problem in the related art that the user's favorite channel can be identified but the user's favorite program cannot be identified. The explanation of the seventh embodiment will be made by referring also to FIG. 2.

In the seventh embodiment, the search block 72 determines, as a user's favorite program, one of scheduled broadcast programs broadcast on the same channel as the viewing channel included in the viewing history information, which starts broadcasting at the area start time. When failing to detect a program which starts broadcasting at the area start time and finding a program being broadcast at the area start time and a program being broadcast at the area end time, the search block 72 determines one of the programs being broadcast having a longer broadcast time in the area, as a user's favorite program.

Figure 30:
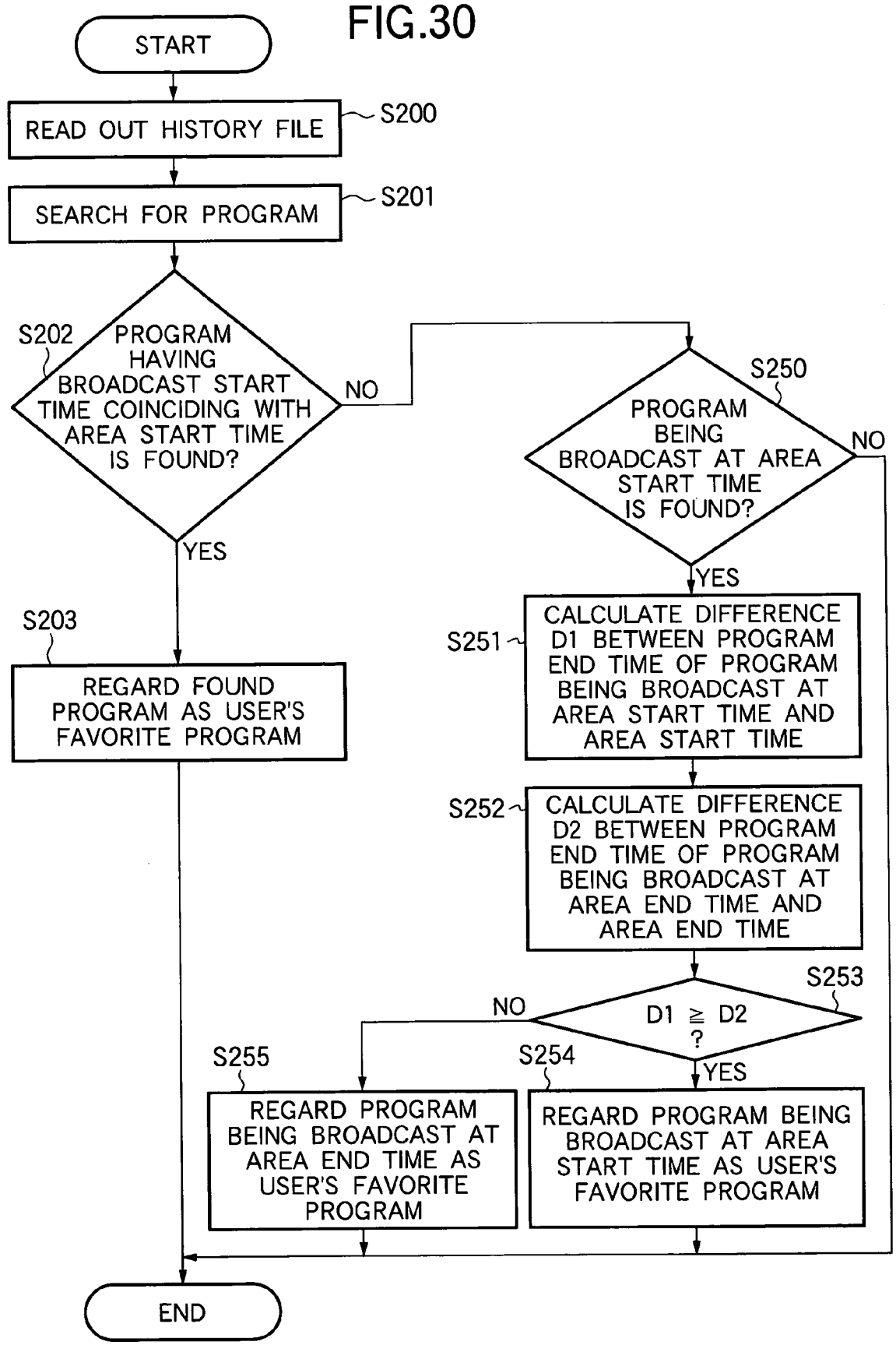
FIG. 30 is a flowchart showing a method of identifying a user's favorite program in the recommended program search device according to a seventh embodiment of the present invention.
Figure 31:
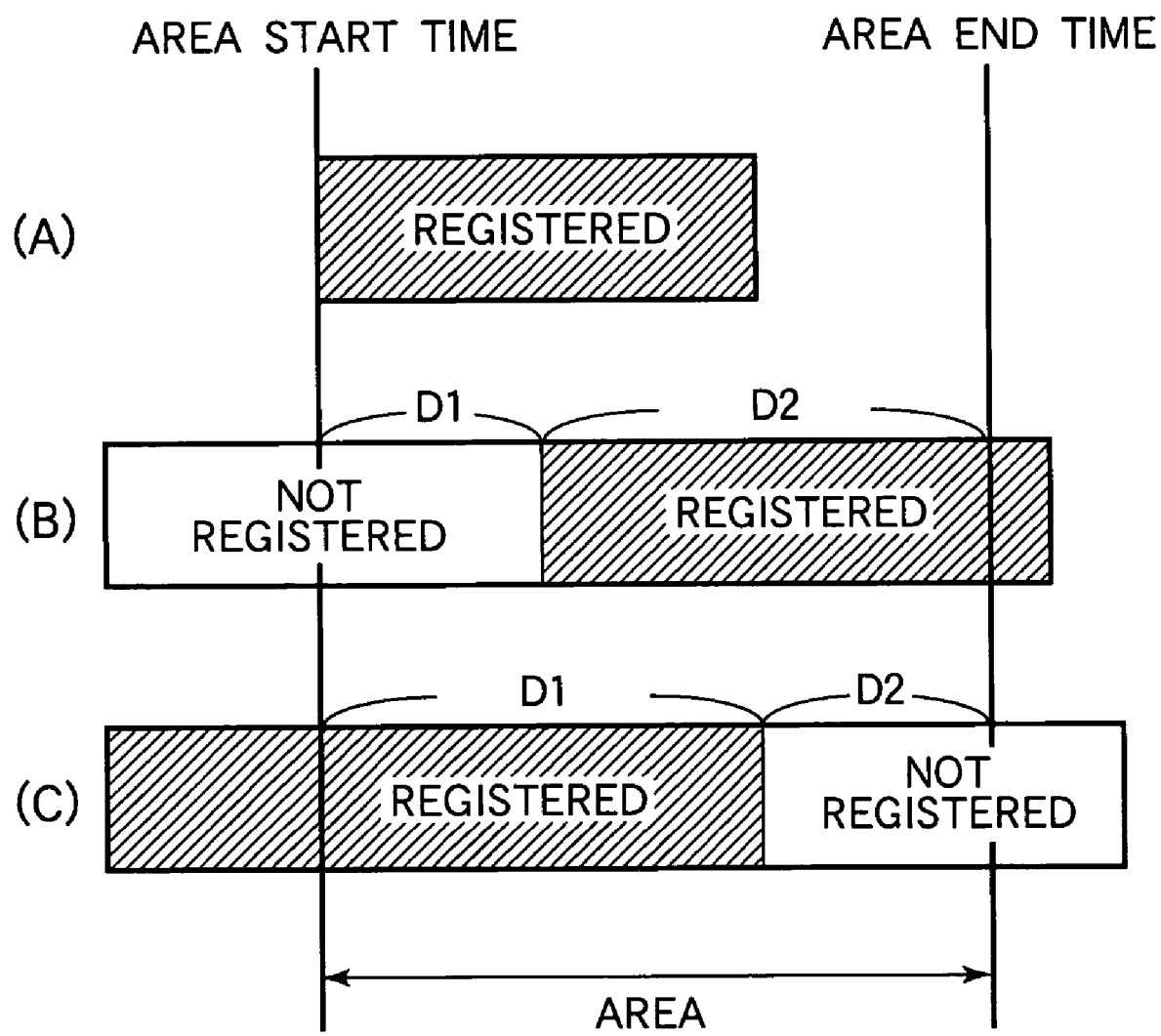
FIG. 31 is a diagram showing a specific example of the user's favorite program detected in the recommended program search device according to the seventh embodiment.

FIG. 30 is a flowchart showing how to identify a user's favorite program in the recommended program search device according to the seventh embodiment. FIG. 31 is a diagram showing a specific example of user's favorite programs detected in the recommended program search device according to the seventh embodiment. In FIG. 30, the same or corresponding steps as those shown in FIG. 26 are denoted by the same reference symbols.

The flowchart of FIG. 30 is a diagram showing operations when a program being broadcast at the area start time terminates broadcasting before the area end time and another program is being broadcast at the area end time. In view of the fact that, when the user views a program, the rate of time occupied in the area is also higher, the seventh embodiment is arranged to determine a user's favorite program.

In a step S250, when searching a program being broadcast at the area start time and finding the program being broadcast at the area start time (when the determination of the step S250 is YES), the process proceeds to a step S251. When failing to find the program being broadcast at the area start time (when the determination of the step S250 is NO), the device determines the absence of the scheduled broadcast program in the search target area and terminates the program software.

At the step S251, the device calculates a difference between the area start time and the broadcast end time of the program being broadcast at the area start time. In this case, the calculation by absolute value is carried out paying consideration to the fact that the difference has a negative value. The calculated value will be referred to as the difference time D1, hereinafter.

At a next step S252, the device calculates a difference between the area end time and the broadcast start time of the program being broadcast at the area end time. At this time, the calculation is carried out by absolute value paying consideration to the fact that the difference has a negative value. The calculated value will be referred to as the difference time D2, hereinafter.

At a step S253, comparison is made between the difference time D1 and the difference time D2. When the difference time D1 is larger than or equal to the difference time D2 as a result of comparison (when the determination of the step S253 is YES), the process proceeds to a step S254, and the device registers the program being broadcast at the area start time as a user's favorite program (shown by (C) in FIG. 31) and terminates the program software.

When the difference time D1 is smaller than the difference time D2 (when the determination of the step S253 is NO), the process proceeds to a step S255, and the device registers the program being broadcast at the area end time as a user's favorite program (shown by (B) in FIG. 31) and terminates the program software.

In the flowchart of FIG. 30, no consideration is paid to the program which starts broadcasting after the area start time and terminates broadcasting before the area end time. However, such a program, which starts and terminates broadcasting in the area, is registered as a user's favorite program.

In the step S253 of the flowchart of FIG. 30, when the difference time D1 is equal to the difference time D2, the recommended program search device according to the seventh embodiment proceeds to the step S254. However, in order to determine such a program as a user's favorite program when the difference time D1 is equal to the difference time D2, the device may be arranged so as to proceed to the step S255. Or when the area division time D1 is equal to the difference time D2, the device may be arranged so as to determine both the program being broadcast at the area start time and the program being broadcast at the area end time as user's favorite programs.

As has been described above, the recommended program search device according to the seventh embodiment can more accurately determine a user's favorite program meeting user's preference.

In accordance with the seventh embodiment, the user can easily select a program or programs by reducing the number of user's favorite program candidates.

The seventh embodiment has the same configuration as the first to sixth embodiments, except for the above respects.

Eighth Embodiment

The eighth embodiment corresponds to a modified example of the first embodiment. In the above sixth embodiment, the program being broadcast at the area start time is compared with the program being broadcast at the area end time. However, the eighth embodiment pays consideration to a case when one or a plurality of programs are present between the program being broadcast at the area start time and the program being broadcast at the area end time. The eighth embodiment will be described in connection with a case where a single program is present between the program being broadcast at the area start time and the program being broadcast at the area end time as an example.

In the eighth embodiment, the search block 72 determines, as a user's favorite program, one of scheduled broadcast programs broadcast on the same channel as a viewing channel included in viewing history information, which starts broadcasting at the area start time. When failing to detect a program which starts broadcasting at the area start time and finding a program being broadcast at the area start time, a program being broadcast at the area end time, and a single or a plurality of programs which start(s) broadcasting in the area and terminate(s) broadcasting in the area, the search block 72 determines one of the programs having a longer broadcast time in the area as a user's favorite program.

Figure 32:
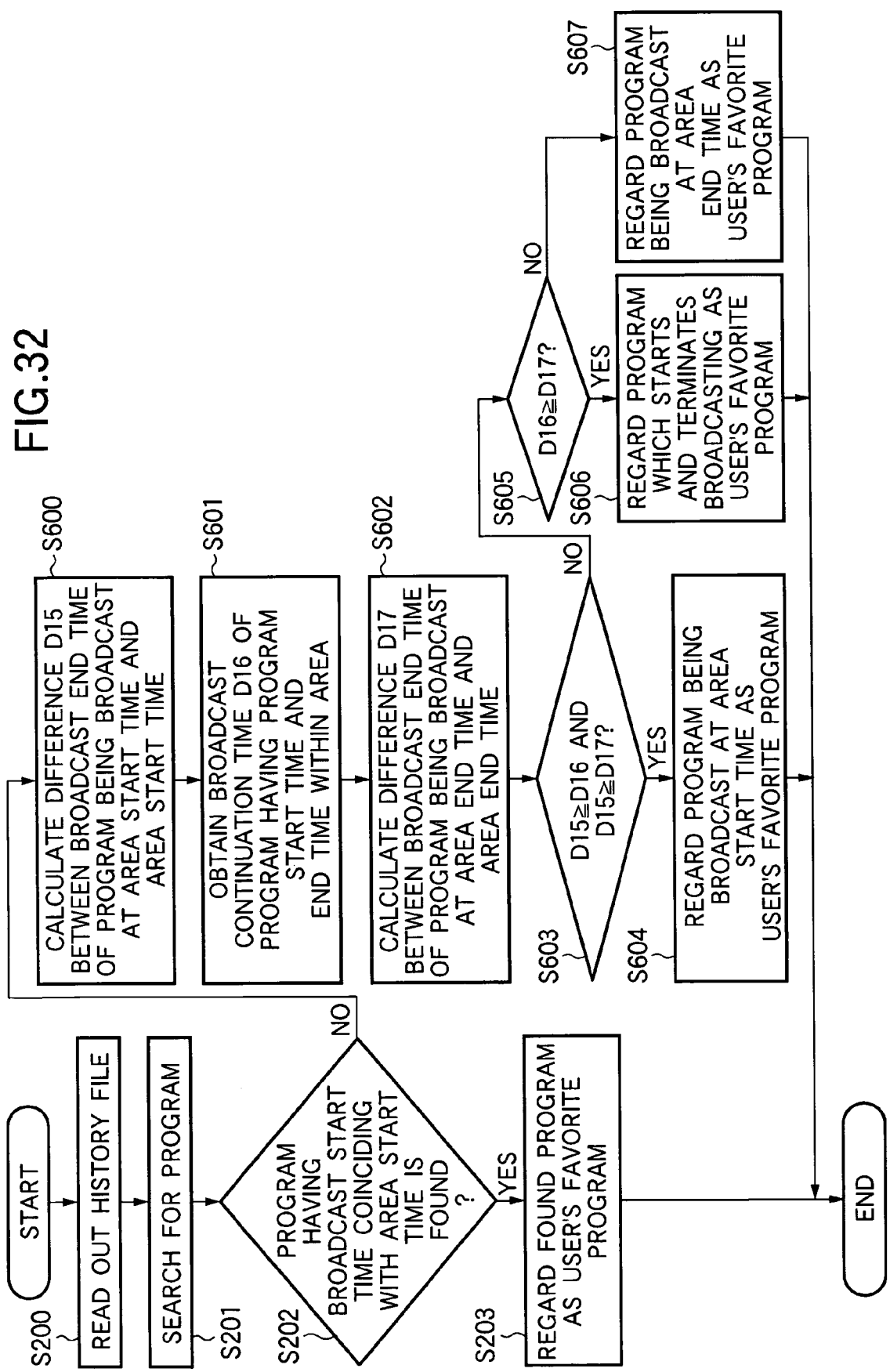
FIG. 32 is a flowchart showing a method of identifying a user's favorite program in a recommended program search device according to an eighth embodiment of the present invention.
Figure 33:
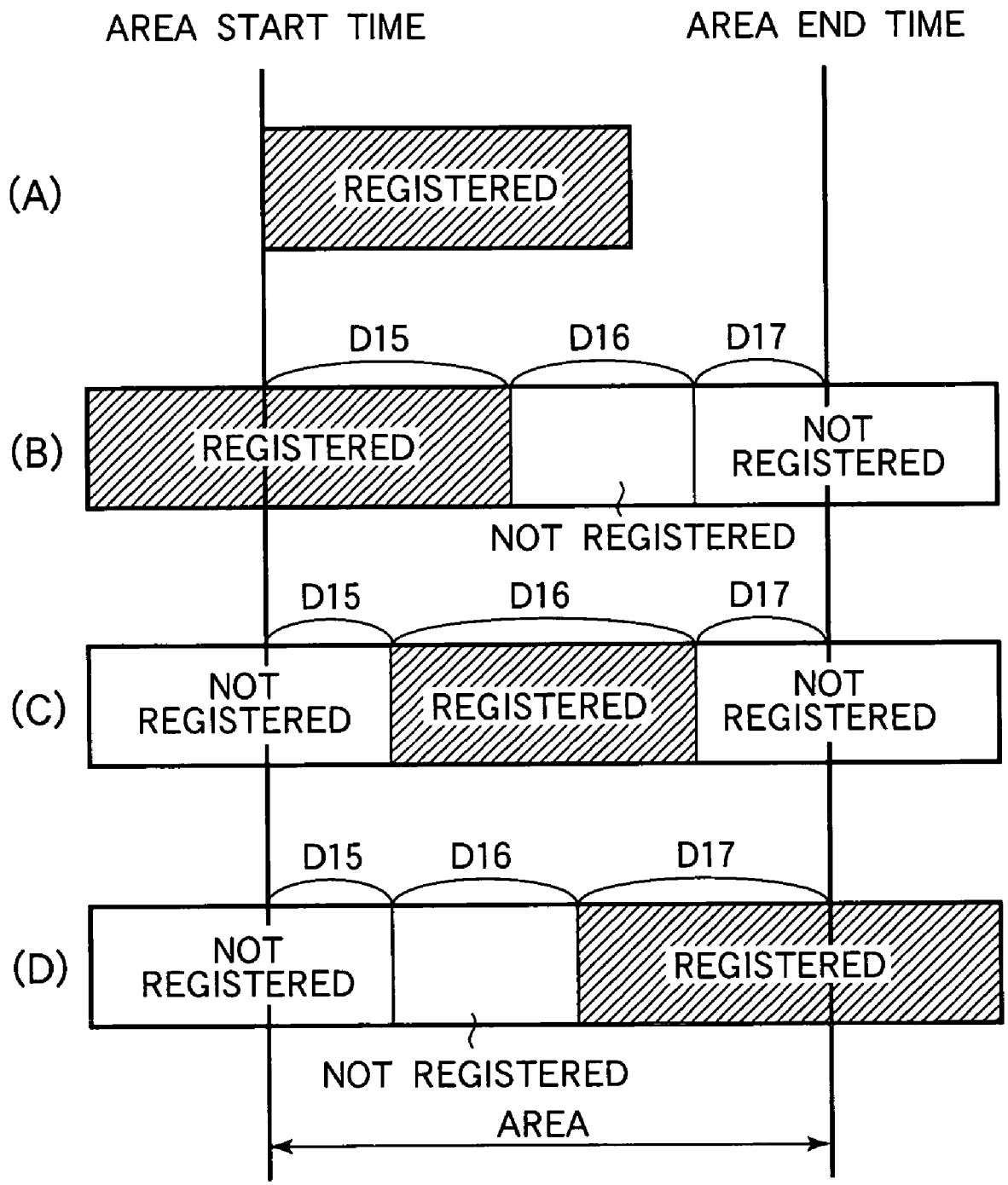
FIG. 33 is a diagram showing a specific example of the user's favorite program detected in the recommended program search device according to the eighth embodiment.

FIG. 32 is a flowchart showing how to identify a user's favorite program in the recommended program search device according to the eighth embodiment. FIG. 33 is a diagram showing a specific example of user's favorite programs detected in the recommended program search device according to the eighth embodiment. In FIG. 32, the same or corresponding steps as or to those shown in FIG. 24 are denoted by the same reference symbols.

The flowchart of FIG. 32 is a diagram showing operations when a program being broadcast at the area start time terminates broadcasting before the area end time, another program is broadcast at the area end time, during which yet another program is broadcast. The device determines a user's favorite program in view of the fact that, when the user views a program, the rate of time occupied in the area also becomes higher.

At a step S600, the device calculates a difference between the area start time and the broadcast end time of a program being broadcast at the area start time. At this time, the calculation is made by absolute value paying consideration to the fact that the difference has a negative value. The calculated value will be referred to as the difference time D15, hereinafter.

At a step S601, the device reads out the broadcast continuation time of a program which starts broadcasting in the area and terminates broadcasting in the area from program information stored in the storage 8. The read value will be referred to as the broadcast continuation time D16, hereinafter.

At a step S602, the device calculates a difference between the area end time and the broadcast start time of the program being broadcast at the area end time. The calculation is carried out by absolute value paying consideration to the fact that the difference has a negative value. The calculated value will be referred to as the difference time D17, hereinafter.

At a step S603, the device compares the magnitudes of the difference time D15, the broadcast continuation time D16, and the difference time D17. When $D15 \geq D16$ and $D15 \geq D17$ as the result of comparison between the difference time D15, the broadcast continuation time D16 and the difference time D17 (when the determination of the step S603 is YES), the process proceeds to a step S604, and the device registers the program being broadcast at the area start time as a user's favorite program (shown by (B) in FIG. 33) and terminates the program software.

When the relation of $D15 \geq D16$ and $D15 \geq D17$ is not satisfied (when the determination of the step S603 is NO), the process proceeds to a step S605. At the step S605, the device compares the broadcast continuation time D16 and the difference time D17. When the broadcast continuation time D16 is larger than or equal to the difference time D17 as the result of comparison, that is, when $D16 \geq D17$ (when the determination of the step S605 is YES), the process proceeds to a step S606, and the device registers the program which starts broadcasting and terminates broadcasting in the area as a user's favorite program (shown by (C) in FIG. 33) and termi-nates the program software. When the broadcast continuation time D16 is smaller than the difference time D17, that is, when $D16 < D17$ (when the determination of the step S605 is NO), the process proceeds to a step S607, and the device registers the program being broadcast at the area end time as a user's favorite program (shown by (D) in FIG. 33) and terminates the program software.

In the recommended program search device according to the eighth embodiment, when the difference time D15 is maximum in the step S603 of FIG. 32, the process proceeds to the step S604. However, the device may be arranged so that, when the broadcast continuation time D16 or the difference time D17 equal in magnitude to the difference time D15 is present, the device determines, as user's favorite programs, the program being broadcast in the area start time, the program being broadcast at the area end time having the broadcast continuation time D16 of the same magnitude as the difference time D15, and the program which starts broadcasting in the area having the difference time D17 of the same magnitude as the difference time D15 and terminates broadcasting in the area.

In the step S605, when the broadcast continuation time D16 is equal to the difference time D17, the process proceeds to the step S606. However, the device may be arranged so that, when the broadcast continuation time D16 is equal to the difference time D17, the process proceeds to the step S607. Or the device may be arranged so as to determined, as user's favorite programs, both the program which starts broadcasting in the area and terminates broadcasting in the area and the program being broadcast at the area end time. In the steps S600 to S607 of FIG. 32, explanation has been made in connection with the case where there is present a single program which starts broadcasting in the area and terminates broadcasting. However, the device may be arranged so that, when two or more programs which start broadcasting and terminate broadcasting in the area, the device determines as a user's favorite program, one of such two or more programs which has the longest broadcast continuation time as the broadcast continuation time D16.

As has been described above, since the recommended program search device according to the eighth embodiment determines user's favorite programs and additionally determines based on the broadcast continuation time, the device can determine user's favorite program or programs meeting user's preference more accurately.

In the recommended program search device according to the eighth embodiment, the user can easily select a program by reducing the number of user's favorite program candidates.

The configuration of the eighth embodiment is the same as that of the foregoing first to seventh embodiments, except for the above respects.

Ninth Embodiment

The ninth embodiment corresponds to a modified example of the first embodiment. In the recommended program search device according to the first embodiment, all the scheduled programs broadcast in the search target area are determined as user's favorite programs. In other words, the device detects a plurality of programs as user's favorite programs for one area. The recommended program search device according to the ninth embodiment of the present invention can suitably detect a user's favorite program. In the ninth embodiment, explanation is made as to how to solve the problem in the related art that a user's favorite channel can be identified but a user's favorite program cannot be identified. The ninth embodiment is described by referring also to FIG. 2.

In the recommended program search device according to the ninth embodiment, the search block 72 determines, as device user's favorite program, one of scheduled broadcast programs broadcast on the same channel as the viewing channel included in the viewing history information which starts broadcasting at the area start time. When the search block 72 fails to detect a program which starts broadcasting at the area start time and detects a program being broadcast at the area start time and when a time duration from the area start time to the broadcast end time of the program being broadcast at the area start time is not smaller than a time duration from the broadcast start time of the program being broadcast at the area start time in a time until the area start time to the area start time, the search block 72 determines the program being broadcast at the area start time as a user's favorite program. Further, when the search block 72 fails to the program which starts broadcasting at the area start time and the program having the time from the area start time to the broadcast end time of the program being broadcast at the area start time not smaller than the time from the broadcast start time of the program being broadcast at the area start time to the area start time, the search block 72 determines the program which starts broadcasting first in the area as a user's favorite program.

Figure 34:
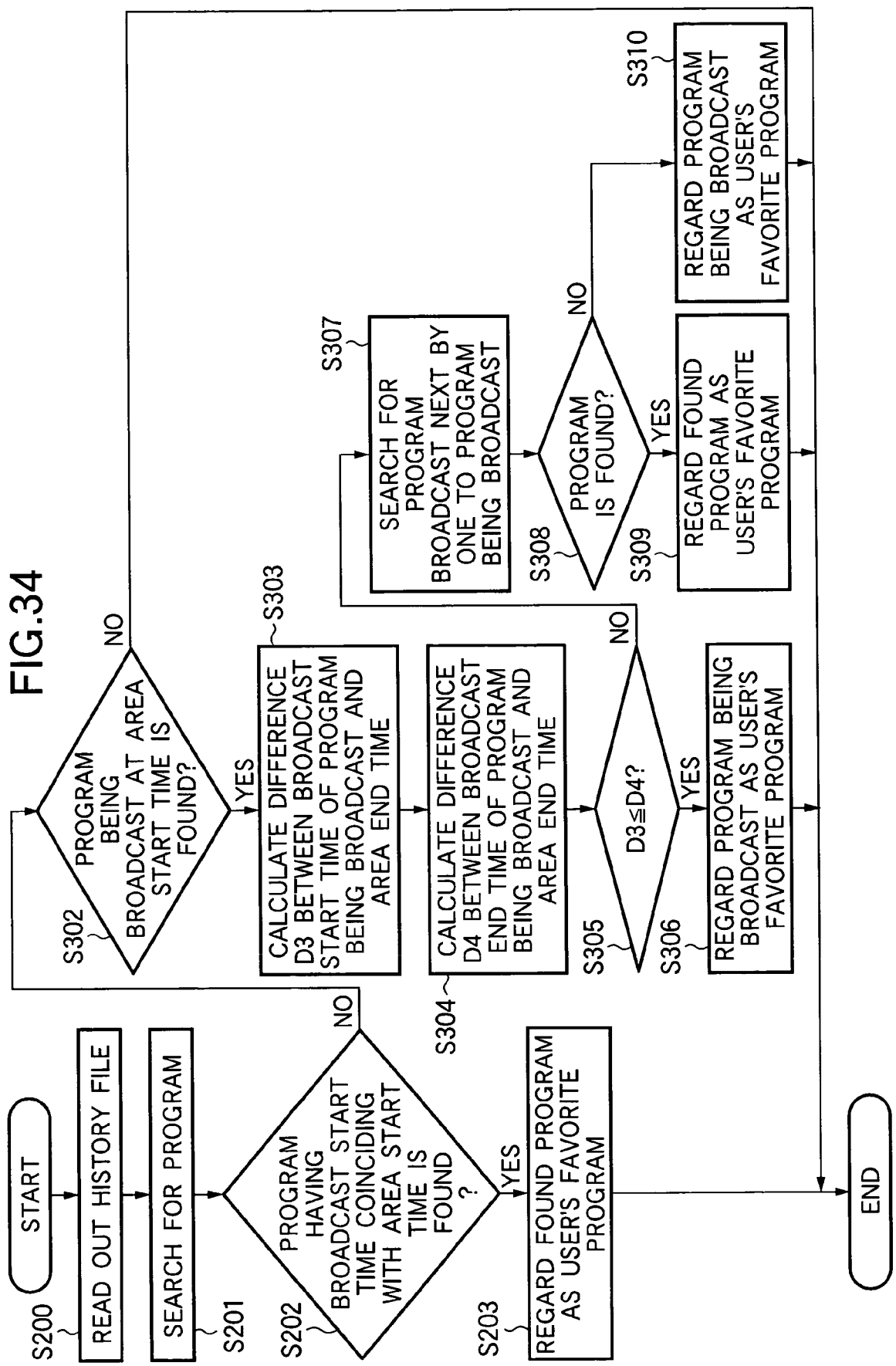
FIG. 34 is a flowchart showing a method of identifying a user's favorite program in a recommended program search device according to a ninth embodiment of the present invention.
Figure 35:
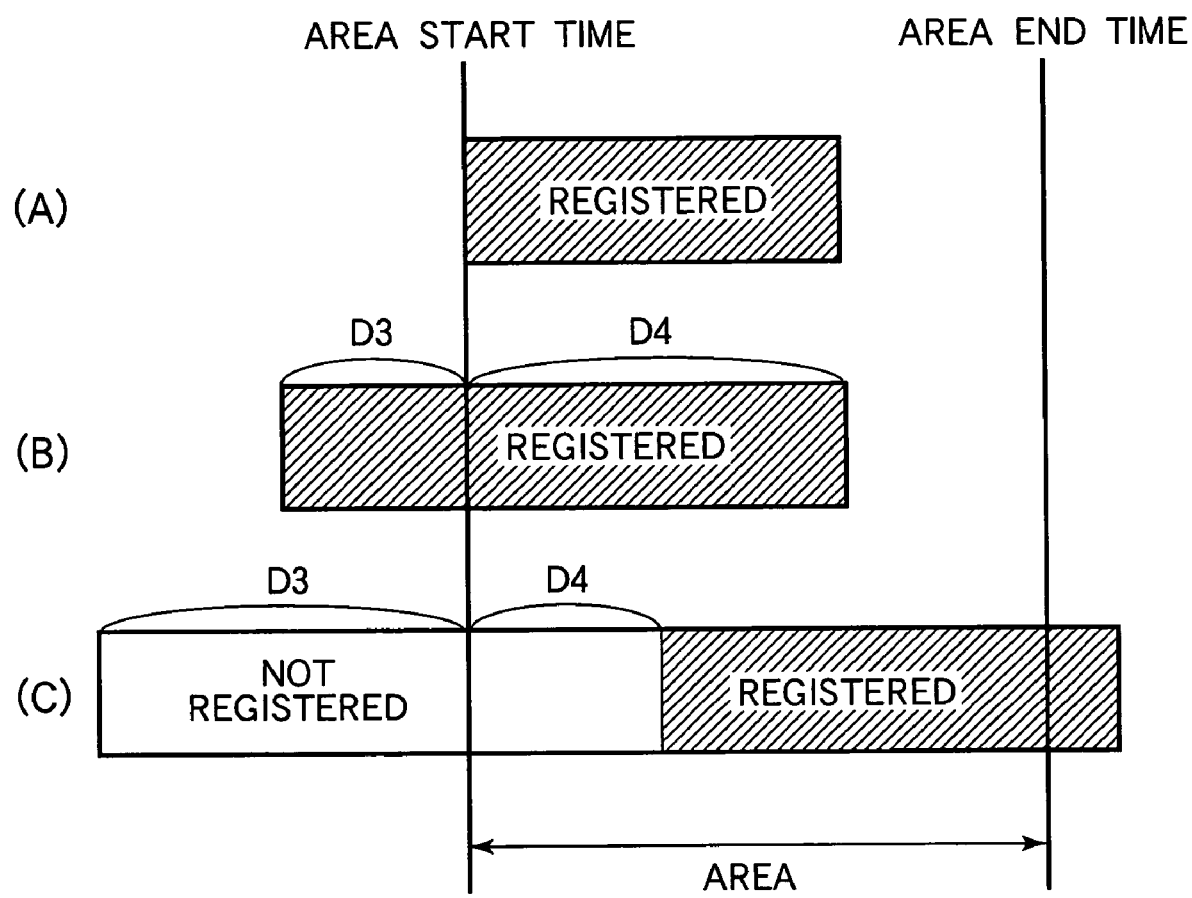
FIG. 35 is a diagram showing a specific example of the user's favorite program detected in the recommended program search device according to the ninth embodiment.

FIG. 34 is a flowchart showing how to identify a user's favorite program in the recommended program search device according to the ninth embodiment. FIG. 35 is a diagram showing a specific example of user's favorite programs detected in the recommended program search device according to the ninth embodiment. In FIG. 34, the same or corresponding steps as or to those shown in FIG. 26 are denoted by the same reference symbols.

In the operation shown by the flowchart of FIG. 34, the device determines whether or not to register the program as device user's favorite program on the basis of a relation between the area start time, the broadcast start and end times of the program being broadcast at the area start time.

When the device searches for a program being broadcast at the area start time in a step S302 and finds the program being broadcast at the area start time (when the determination of the step S302 is YES), the process proceeds to a step S303. When failing to find the program being broadcast at the area start time (when the determination of the step S302 is NO), the device determines the absence of a scheduled broadcast program in the search area, and terminates the program software.

At the step S303, the device calculates a difference between the area start time and the broadcast start time of the program being broadcast at the area start time. The calculation is carried out by absolute value paying consideration to the fact that the difference has a negative value. The calculated value will be referred to as the difference time D3, hereinafter.

At the next step S304, the device calculates a difference between the area start time and the area end time of the program being broadcast at the area start time. The calculation is carried out by absolute value paying consideration to the fact that the difference has a negative value. The calculated value will be referred to as the difference time D4, hereinafter.

At a step S305, the device compares the difference time D3 and the difference time D4. When the difference time D3 is smaller than the difference time D4 as the result of comparison (when the determination of the step S305 is YES), the process proceeds to a step S306, and the device registers the program being broadcast at the area start time as a user's favorite program (shown by (B) in FIG. 35) and terminates the program software. When the difference time D3 is larger than the difference time D4 (when the determination of the step S305 is NO), the process proceeds to a step S307, and the device searches for a program to be broadcast next by one to the program broadcast at the area start time.

When the next program is present as the searched result (when the determination of a step S308 is YES), the device registers the program searched in a step S309 as a user's favorite program (shown by (C) in FIG. 35). When failing to find the next program (when the determination of the step S308 is NO), the device registers the program broadcast at the area start time as a user's favorite program in a step S310, and terminates the program software.

In the flowchart shown in FIG. 34, the device determines whether or not the user's favorite program is registered on the basis of a relation between the broadcast start and end times of the program being broadcast in the area start time. However, the similar operation may be applied even to the area end time. The operation of this modified example will be described.

Figure 36:
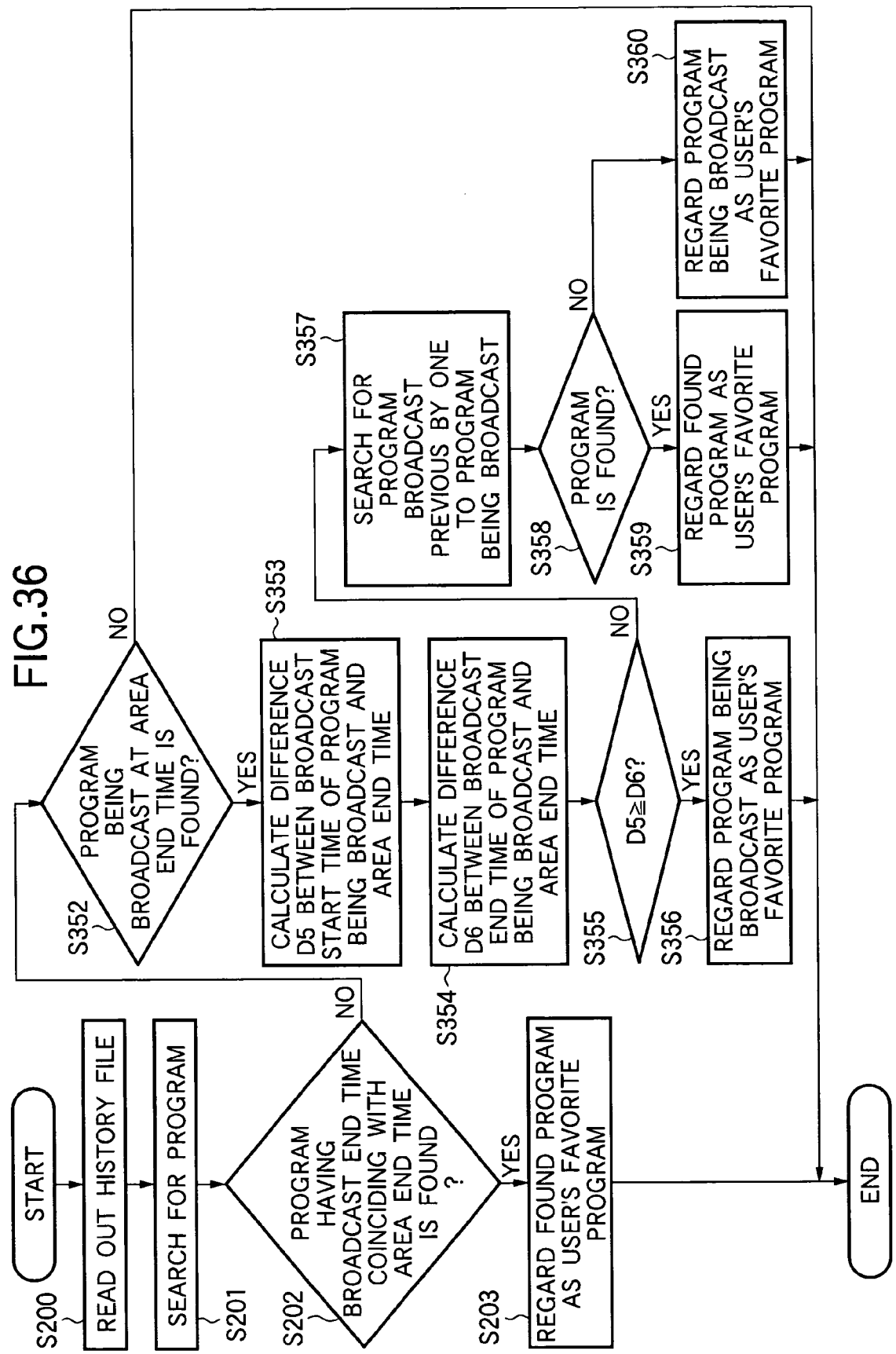
FIG. 36 is a diagram showing a specific example of a user's favorite program detected in a modified example of the recommended program search device according to the ninth embodiment.
Figure 37:
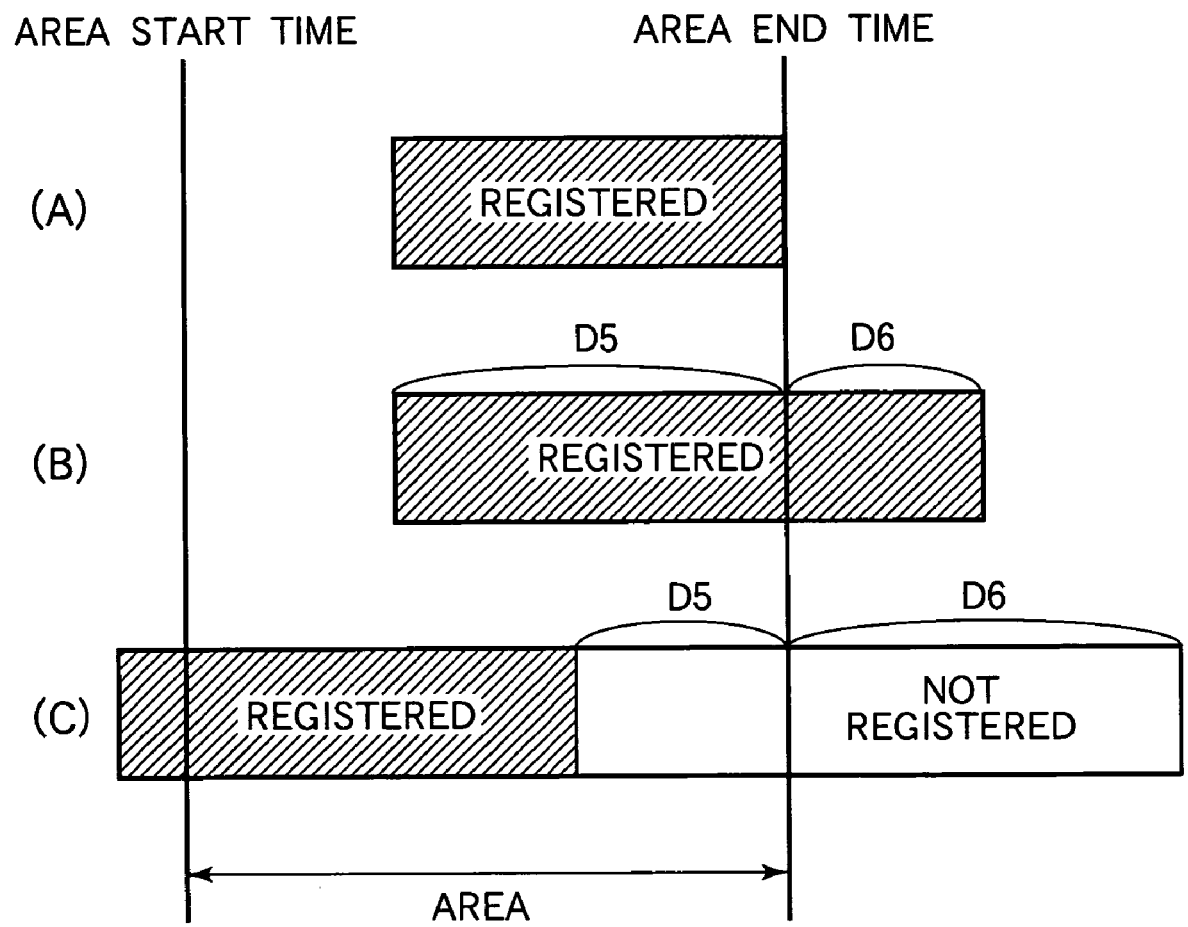
FIG. 37 is a diagram showing a specific example of the user's favorite program detected in the modified example of the recommended program search device according to the ninth embodiment.

FIG. 36 is a flowchart showing how to identify a user's favorite program in a modified example of the recommended program search device according to the ninth embodiment. FIG. 37 is a diagram showing a specific example of the user's favorite programs detected in the modified example of the recommended program search device according to the ninth embodiment.

The search block of the modified example determines, as a user's favorite program, one of scheduled broadcast programs broadcast on the same channel as the viewing channel included in the viewing history information, which terminates broadcasting at the area end time. When failing to detect a program which terminates broadcasting at the area end time and when a time duration from the broadcast start time of the program being broadcast at the area end time to the area start time thereof is not smaller than a time duration from the area end time to the broadcast end time of the program being broadcast at the area end time, the search block of the modified example determines the program being broadcast at the area end time as a user's favorite program. When failing to detect a program which terminates broadcasting at the area end time and a program having the time from the area end time to the broadcast end time of the program being broadcast at the area end time not smaller than the time from the broadcast start time of the program being broadcast at the area start time to the area end time thereof and when finding a program which terminates broadcasting first in the area, the search block determines the program which terminates broadcasting first in the area as a user's favorite program.

When searching for and finding a program being broadcast at the area end time in a step S352 (when the determination of the step S352 is YES), the process proceeds to a step S353. When failing to find a program being broadcast at the area end time (when the determination of the step S352 is NO), the device determines that the program already terminates broadcasting at the area end time, and terminates the program software.

At the step S353, the device calculates a difference between the area end time and the broadcast start time of the program being broadcast at the area end time. At this time, the calculation is carried out by absolute value paying consideration to the fact that the difference has a negative value. The calculated value will be referred to as the difference time D5, hereinafter.

At a next step S354, the device calculates a difference between the area end time and the broadcast end time of the program being broadcast at the area end time. At this time, the calculation is carried out by absolute value, paying consideration to the fact that the difference has a negative value. The calculated value will be referred to as the difference time D6, hereinafter.

At a step S355, the device compares the difference time D5 and the difference time D6. When the difference time D5 is larger than or equal to the difference time D6 as the result of comparison (when the determination of the step S355 is YES), the process proceeds to a step S356, and the device stores the program being broadcast at the area end time as a user's favorite program (shown by (B) in FIG. 37), and terminates the program software. When the difference time D5 is smaller than the difference time D6 (when the determination of the step S358 is NO), the process proceeds to a step S357, and the device searches for a program broadcast previous by one to the program broadcast at the area end time.

When there is such a previous program as the searched result (when the determination of the step S358 is YES), the device stores a program searched in a step S359 as a user's favorite program (shown by (C) in FIG. 37). When failing to find the previous program (when the determination of the step S358 is NO), the device stores a program being broadcast at the area end time at a step S360 as a user's favorite program, and terminates the program software.

In the recommended program search device according to the ninth embodiment, when the difference time D3 is equal to the difference time D4 in the step S305 of the flowchart of FIG. 34, the process proceeds to the step S306. However, the device may be arranged so that, when the difference time D3 is equal to the difference time D4, the process proceeds to the step S307 so as not to include the program being broadcast at the area start time in user's favorite programs.

In the ninth embodiment of the present invention, when the difference time D5 is equal to the difference time D6 in the step S355 of the flowchart of FIG. 36, the process proceeds to the step S356. However, the device may be arranged so that, when the difference time D5 is equal to the difference time D6, the process proceeds to the step S357 so as not to include the program being broadcast at the area end time in user's favorite programs.

As has been described above, the recommended program search device according to the ninth embodiment can more accurately determine a user's favorite program meeting user's preference.

The recommended program search device according to the ninth embodiment can easily select a user's favorite program by narrowing the number of user's favorite program candidates.

The configuration of the ninth embodiment is the same as that of the foregoing first to eighth embodiments, except for the above respects.

Tenth Embodiment

The tenth embodiment corresponds to a modified example of the first embodiment. In the recommended program search devices of the first to ninth embodiments, one of search target areas is taken, and a user's favorite program is identified on the basis of the area start time, the area end time, the program broadcast start time, and program broadcast end time. In the tenth embodiment of the present invention, when a program determined as a user's favorite program in such a manner as in the first to ninth embodiments is broadcast across a plurality of continuous areas, how to identify the program as a user's favorite program on the basis of a relation between the plurality of continuous areas, the program broadcast start and end times is described.

With respect to the determination of a user's favorite program, there can be provided a recommended program search device which more accurately determine a user's favorite program meeting user's preference by combining a plurality of the determinations in the first to ninth embodiments.

Figure 38:
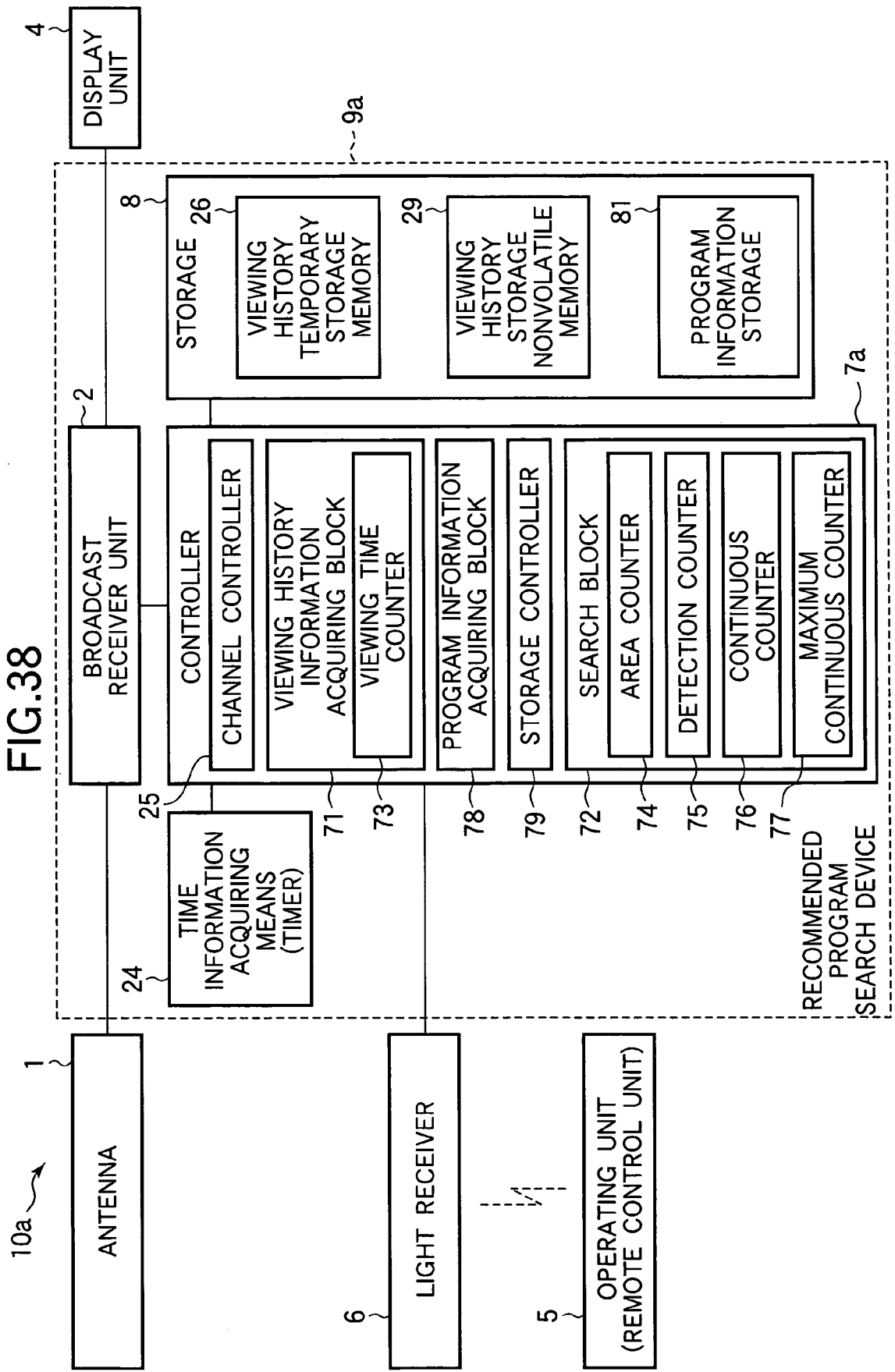
FIG. 38 is a block diagram showing a configuration of a television receiver set including a recommended program search device according to a tenth embodiment of the present invention.
Figure 39:
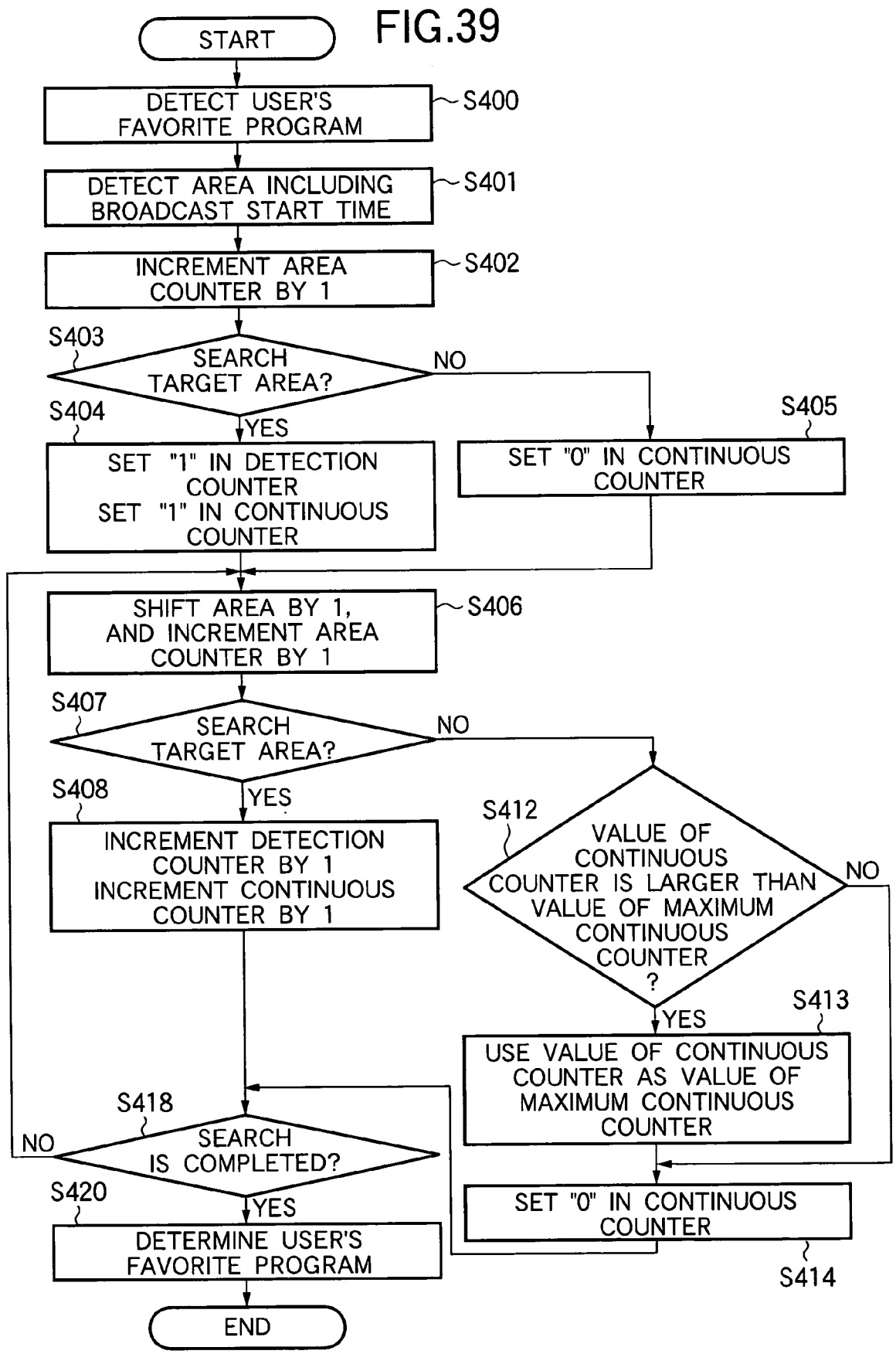
FIG. 39 is a flowchart showing a method of identifying a user's favorite program in the recommended program search device according to the tenth embodiment.

FIG. 38 is a block diagram showing a configuration of a television receiver set 10a including a recommended program search device 9a according to the tenth embodiment of the present invention. FIG. 39 is a flowchart showing how to identify a user's favorite program in the recommended program search device 9a according to the tenth embodiment of the present invention. In FIG. 38, the same or corresponding constituent components as or to those shown in FIG. 2 are denoted by the same reference numerals or symbols.

When the device detects a user's favorite program in a step S400, the device reads out program information about the detected program from the storage 8, and acquires a broadcast start time and a broadcast end time.

The device, at the step S401, reads out from the storage 8 a history file having area information including the broadcast start time registered therein, and sets '1' in an area counter 74. The "area counter" refers to a counter for detecting the number of areas across which the detected user's favorite program is broadcast.

When the device determines whether or not the area detected in the step S401 is a search target area at a step S403. When determining that the detected area is a search target area (when determination of the step S403 is YES), the process proceeds to a step S404, and the device sets '1' in a detection counter 75 and a continuous counter 76. The "detection counter" refers to a counter, when the program determined as the user's favorite program is broadcast across several areas, for detecting the number of search target areas in the area. The "continuous counter" refers to a counter for detecting the number of continuous search target areas.

When the device determines the absence of a search target area in the step S403 (when determination of the step S403 is NO), the process proceeds to a step S405, and the device sets '0' in the continuous counter.

In a step S406, when the device shifts the area by one in such a direction as closer to the broadcast end time and increments the area counter by '1'. In a step S407, the device determines whether or not the shifted area is a search target area. When the device determines that the shifted area is a search target area (when determination of the step S407 is YES), the device increments the value of the detection counter and the value of the continuous counter by '1'. When the device determines that the area is not a search target area (when determination of the step S407 is NO), the process proceeds to a step S412, and the device compares the value of the continuous counter with the value of a maximum continuous counter. The maximum continuous counter refers to a counter for detecting a maximum of the numbers of continuous search target areas.

When the value of the continuous counter is larger than the value of the maximum continuous counter (when the determination of the step S412 is YES), the process proceeds to a step S413, and the device uses the value of the continuous counter as the value of the maximum continuous counter, and then the process proceeds to a step S414. When the value of the continuous counter is smaller than the value of the maximum continuous counter, the device performs no operation, and then the process proceeds to the step S414. In the step S414, the device sets '0' as the value of the continuous counter.

In a step S418, the device determines whether or not examination has been made until the area including the broadcast end time of the program determined as a user's favorite program. If not (when the determination of the step S418 is NO), the process proceeds to the step S406, and the device examines the next area. When the device determines the completion of the examination (when the determination of the step S419 is YES), the process proceeds to a step S420, and the device determines the user's favorite program.

In the step S420, the device determines the user's favorite program by comparing the detected area counter, the detection counter, and the maximum continuous counter. The determination includes six cases (1) to (6) which follow.

(1) When all areas overlapped during the broadcast of the program are search target areas, the device determines the program as a user's favorite program.

(2) When at least one of search target areas is present in overlapped areas during broadcast of the program, the device determines the program as a user's favorite program.

(3) When at least two or more continuous search target areas are present in overlapped areas during broadcast of the program, the device determines the broadcast as a user's favorite program.

(4) When a ratio between the number of areas included during broadcast of the program and the number of the search target areas exceeds a constant value in overlapped areas during broadcast of the program, the device determines the broadcast as a user's favorite program.

(5) When a ratio between the number of continuous search target areas and the number of areas included during broadcast of the program exceeds a constant value in overlapped areas during broadcast of the program, the device determines the broadcast as a user's favorite program.

(6) When a ratio between the number of continuous search target areas and the number of search target areas included during broadcast of the program exceeds a constant value in overlapped areas during broadcast of the program, the device determines the program as a user's favorite program.

The determination conditions of the above items (1) to (6) can be expressed by expressions (1) to (6) which follow.

$$\text{(value of area counter)} = \text{(value of detection counter)} \quad (1)$$

$$\text{(value of detection counter)} \geq 1 \quad (2)$$

$$\text{(value of continuous counter)} \geq 2 \quad (3)$$

$$\text{(value of detection counter)}/\text{(value of area counter)} \geq \text{(threshold value)} \quad (4)$$

$$\text{(value of maximum continuous counter)}/\text{(value of area counter)} \geq \text{(threshold value)} \quad (5)$$

$$\text{(value of maximum continuous counter)}/\text{(value of detection counter)} \geq \text{(threshold value)} \quad (6)$$

When there is at least one search area in the condition (2), the device determines the broadcast as a user's favorite program. However, the present invention is not limited to this example, but when detecting n or more detection target areas, the device may determine the program as a user's favorite program.

When the value of the maximum continuous counter is two or more in the condition (3), the device determines the program as a user's favorite program. However, the present invention is not limited to this example, but when the value of the maximum continuous counter is m or more, the device may determine the program as a user's favorite program.

One of these conditions is set and only the program satisfying the set condition is registered as a user's favorite program.

As has been described above, when various conditions are provided, the recommended program search device 9a of the tenth embodiment can control an appearance frequency of the user's favorite program meeting user's preference, thus providing an environment for the user to easily select the user's favorite program.

The configuration of the tenth embodiment is the same as that of the foregoing first to seventh embodiments, except for the above respects.

In the first to eighth embodiments, explanation has been made in connection with the case where the recommended program search device is mounted in the television receiver set. However, the recommended program search device may also be mounted in another equipment such as a radio receiver set, a television receiver set having no display unit, a recording device having a tuner built therein.

Eleventh Embodiment

The eleventh embodiment corresponds to a modified example of the second embodiment.

Figure 40:
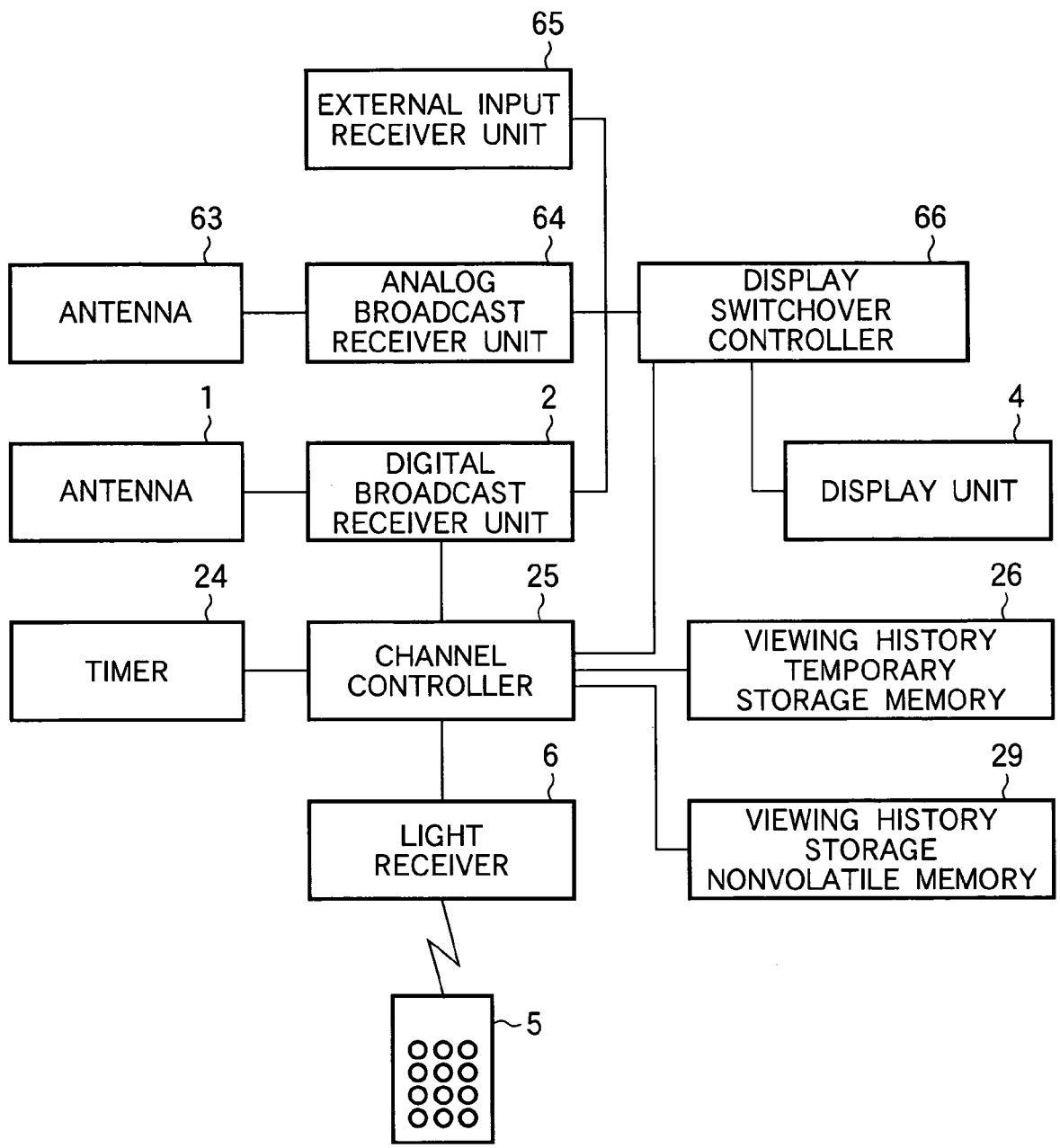
FIG. 40 is a block diagram showing a digital broadcast receiver set according to an eleventh embodiment of the present invention.

FIG. 40 is a block diagram showing a configuration of a broadcast receiver set including a viewing history storage device in the eleventh embodiment of the present invention. As shown in FIG. 40, the broadcast receiver set of the eleventh embodiment, in addition to the broadcast receiver set (FIG. 1) described in the second embodiment, comprises an antenna 63 which receives an analog broadcast signal, an analog broadcast receiver unit 64 which receives an analog broadcast wave and outputs it as a video signal and an audio signal, an external input receiver unit 65 which receives an external input and outputs a broadcast signal and an audio signal, a display switchover controller 66 for selecting any of the digital broadcast signal, the digital broadcast signal, and the external input and displaying the selected one on the display unit 4.

The display switchover controller 66, which is connected to the channel controller 25, transmits and receives a display switchover instruction and a display switchover notification to and from the channel controller 25.

When the user presses a power button on the remote control unit 5, this causes a power-on instruction to be transmitted to the channel controller 25 via the light receiver 6. The channel controller 25, when receiving the power-on instruction, causes the broadcast receiver unit 2, the analog broadcast receiver unit 64, and the external input receiver unit 65 to be turned on. When the user next presses a digital broadcast channel switchover button on the remote control unit 5, this causes a receive channel instruction command to be transmitted to the digital broadcast receiver unit 2 via the light receiver 6 and the channel controller 25. The digital broadcast receiver unit 2 sets the current channel at the receive channel, receives a digital broadcast wave from the antenna 1, converts the received broadcast wave into an audio signal and a video signal, and outputs these signals to the display unit 4. At this time, the channel controller 25 transmits an instruction command to the display switchover controller 66 to cause the controller 66 to output a digital broadcast video signal to the display unit 4. The channel controller 25 also stores the user's viewing history in the same manner as in the second embodiment.

When the user presses an analog broadcast channel button or an external input switchover button on the remote control unit 5, this causes a receive channel instruction command other than the digital broadcast to be transmitted to the channel controller 25 via the light receiver 6. The analog broadcast receiver unit 64, when receiving the receive channel instruction command of the analog broadcast via the channel controller 25, receives an analog broadcast wave signal from the antenna 63, converts the received signal into an audio signal and a video signal, and outputs these signals. The external input receiver unit 65, when receiving an external input receive channel instruction command via the channel controller 25, receives an external input signal, converts it to an audio signal and a video signal, and outputs these signals.

The channel controller 25 transmits an instruction command to the display switchover controller 66 to cause the controller 66 to output the audio signal and the video signal from the analog broadcast receiver unit 64 or the external input receiver unit 65 to the display unit 4. The display switchover controller 66 is switched in accordance with an instruction command from the channel controller 25 to cause the analog broadcast signal or the external input signal to be output to the display unit 4. The display switchover controller 66 also informs the channel controller 25 of the fact that the digital broadcast view was stopped.

When receiving a notification indicative of the stoppage of the digital broadcast output from the display switchover controller 66, the channel controller 25 stops storing the viewing history. When receiving a notification about the started digital broadcast from the display switchover controller 66, the channel controller 25 starts storing the viewing history.

FIG. 40 is a diagram showing an example of the configuration including both the analog broadcast receiver unit 64 and the external input receiver unit 65. However, such a configuration including only any one of such units may be possible. Even in this case, when receiving a notification about the stopped output of the digital broadcast, stops storing the viewing history; whereas, when receiving a notification indicative of the started digital broadcast view, starts storing the viewing history. The stop and start of the viewing history storing may be carried out on the basis of information (for example, whether or not to be during execution of digital broadcast view reservation, to be during the digital broadcast record, or to be during execution of the digital broadcast record reservation) other than information indicative of whether or not to be during the digital broadcast view.

Figure 41:
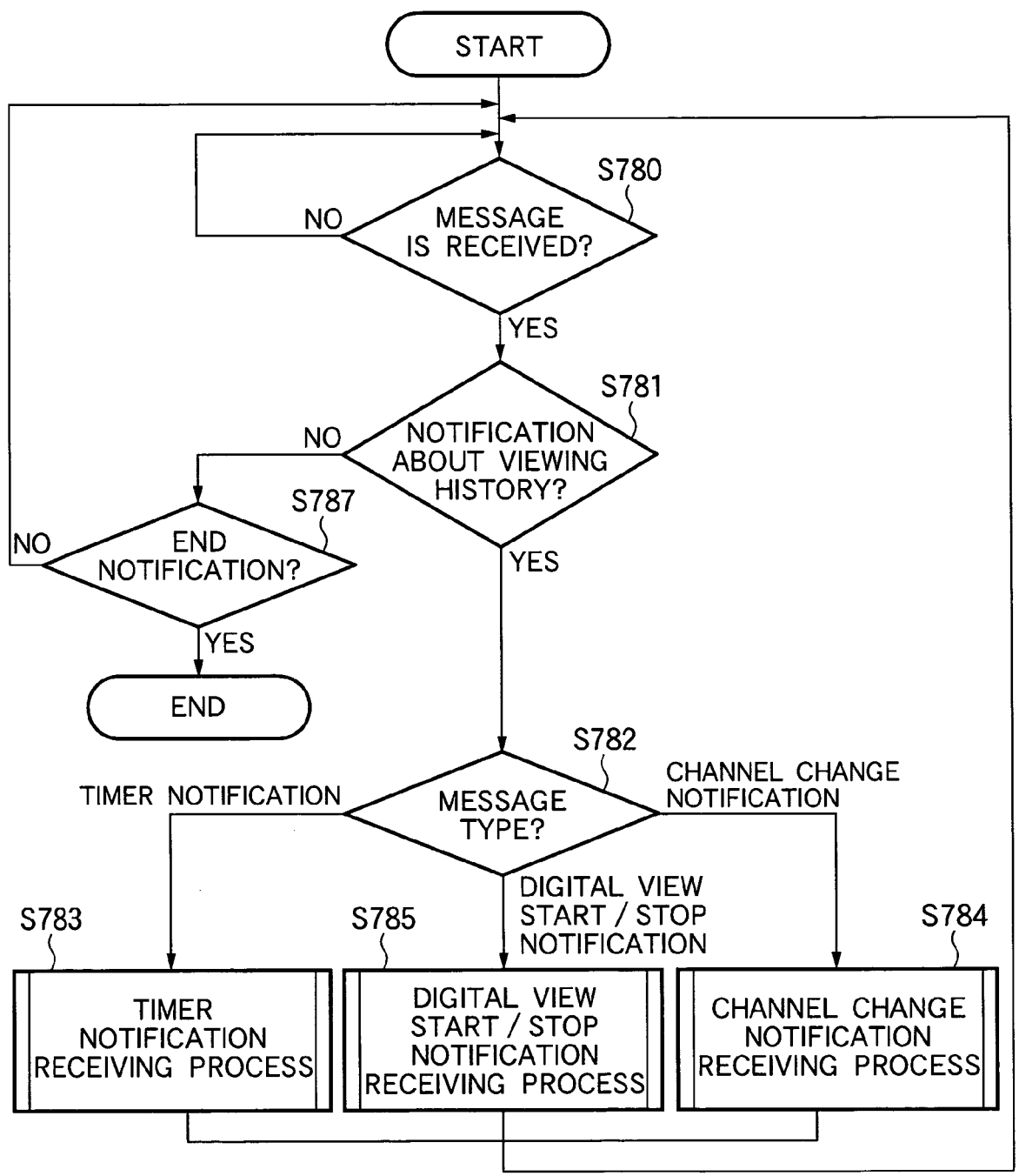
FIG. 41 is a flowchart showing an entire viewing history storing process in the eleventh embodiment.
Figure 42:
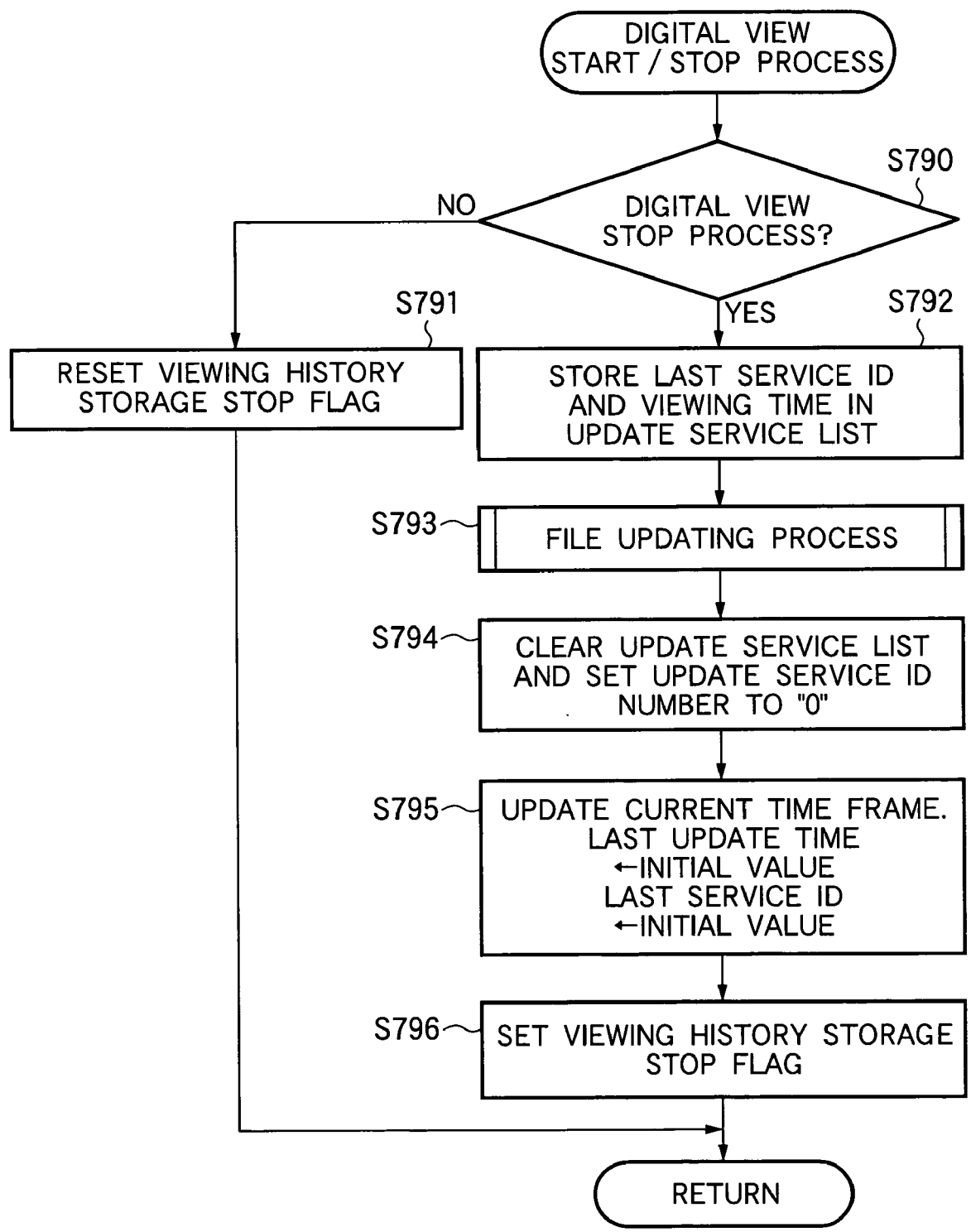
FIG. 42 is a flowchart showing a digital view starting/stopping process in the eleventh embodiment.

FIG. 41 and FIG. 42 are flowcharts showing viewing history storing process executed by the program software under control of the channel controller 25 (FIG. 12) in the eleventh embodiment.

FIG. 41 is a diagram showing the entire viewing history storing process in the eleventh embodiment. As shown in FIG. 41, the viewing history storing process includes 3 tasks of timer notification receiving process (step S783), channel change notification receiving process (step S784), and digital view start/stop notification receiving process (step S785). When the channel controller receives an instruction or the like in the form of a message from the remote control unit 5, the channel controller executes such a task.

In the viewing history storing process of the eleventh embodiment, the channel controller waits for a message, that is, an instruction from the remote control unit 5, a notification from the timer 24, or a digital view start/stop notification (step S780). When receiving such a message, the channel controller determines whether or not the message relates to the viewing history (step S781). When the message relates to the viewing history, the channel controller determines any of the channel change, the timer notification, and the digital view start/stop notification (step S782).

When the display status was changed from the digital broadcast to the analog broadcast or to the external input through user's operation of the remote control unit, the "digital view stop notification" is transmitted from the display switchover controller 66 to the channel controller 25. When the display status was changed from the analog broadcast or the external input to the digital broadcast through user's operation of the remote control unit, the "digital view start notification" is transmitted from the display switchover controller 66 to the channel controller 25. These digital view start/stop notifications are not limited to the display change of the above analog broadcast, the external input, etc. For example, such a notification may be transmitted at the time of power on/off from the remote control unit or execution of a reservation record.

When the message indicates the digital view start/stop notification, the channel controller executes digital view start/stop operation (step S785). When the message indicates the channel change notification, the channel controller executes the channel change notification receiving process (step S784) described in the second embodiment. When the message indicates the timer notification, executes the timer notification receiving process (step S783) described in the second embodiment.

After executing the step S783, S784, or S785, the channel controller returns to the message receiving operation (step S780), and waits for the next message. When the message received at the step S780 indicates an end notification output from the remote control unit through its power-off operation (step S787), the channel controller terminates the viewing history storing process.

FIG. 42 is a flowchart showing details of the digital view start/stop receiving process (step S785 in FIG. 41). In the digital view start/stop receiving process, the channel controller first determines whether the notification from the display switchover controller 66 indicates the digital view stop notification or the digital view stop notification (step S790). When the notification is the digital view stop notification, the channel controller resets a viewing history storage stop flag (step S791), the channel controller waits for the next message (step S780 in FIG. 41).

When the notification from the display switchover controller 66 is the digital view stop notification, the channel controller holds the last service ID of the channel being broadcast after the last change of the channel in the update service list (step S792). Subsequently, the channel controller executes the file updating process of writing the data of the update service list (for example, FIG. 16E) in the so-far time frame in the viewing history storage nonvolatile memory 29 as viewing history information (step S793). In order to shift to the operation of the next time frame, the channel controller further sets '0' as the number of update service Ids, and clears the update service list clears (step S794). The channel controller next sets an initial value for the last update indicative of the last update time, and also sets an initial value even for the last service ID indicative of the just-previous service ID (step S795). Thereafter, the channel controller sets a viewing history storage stop flag (step S796), and waits for the next message (step S797).

As has been described above, the eleventh embodiment can store a viewing history reflecting user's preference more accurately by stopping/starting storing the viewing history automatically on the basis of a preset condition (for example, whether or not to be during the digital broadcast view).

In the above description, the case where the channel controller 5 creates the viewing history of the user of the digital broadcast has been described. In this case, when the digital broadcasting is not selected by the display switchover controller 66, the storing of the viewing history information in the viewing history storage nonvolatile memory 9 is stopped, and when the digital broadcast is selected by the display switchover controller 66, the storing of the viewing history information in the viewing history storage nonvolatile memory 9 is started. Furthermore, in another case, the channel controller 5 may create the viewing history of the user of the analog broadcast. In this case, when the external input is selected by the display switchover controller 66, the storing of the viewing history information in the viewing history storage nonvolatile memory 9 is stopped, and when the analog broadcast is selected by the display switchover controller 66, the storing of the viewing history information in the viewing history storage nonvolatile memory 9 is started.

Twelfth Embodiment

The twelfth embodiment corresponds to a modified example of the second embodiment. A channel receivable in digital broadcasting is sometimes incremented or decremented by a change in the channel organization of a broadcast station. Further, since a receivable channel varies from location to location, the channel organization is sometimes changed by the location change. The twelfth embodiment is directed to updating a channel list in such a case.

Figure 43:
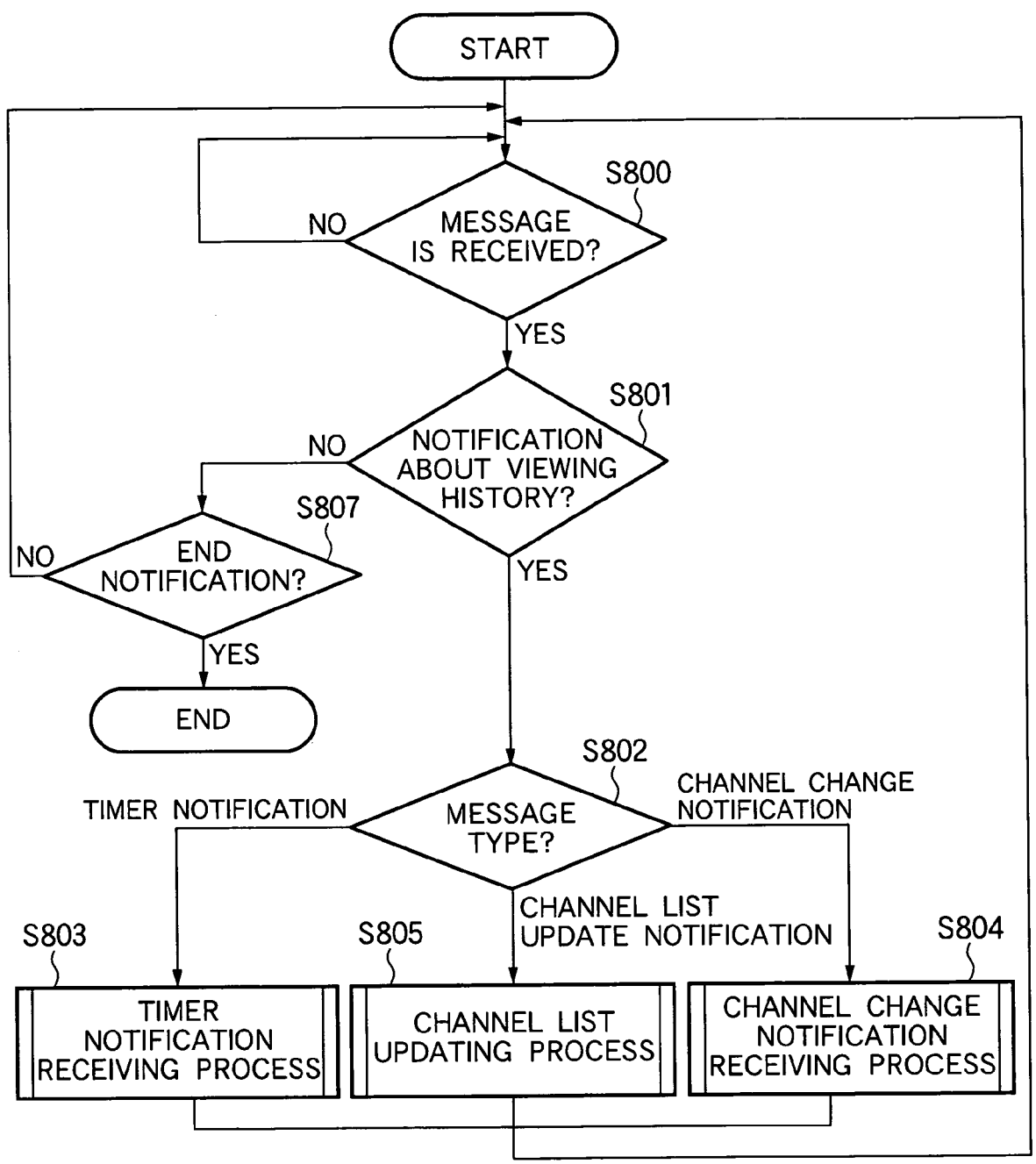
FIG. 43 is a flowchart showing an entire a viewing history storing process in a twelfth embodiment of the present invention.
Figure 44:
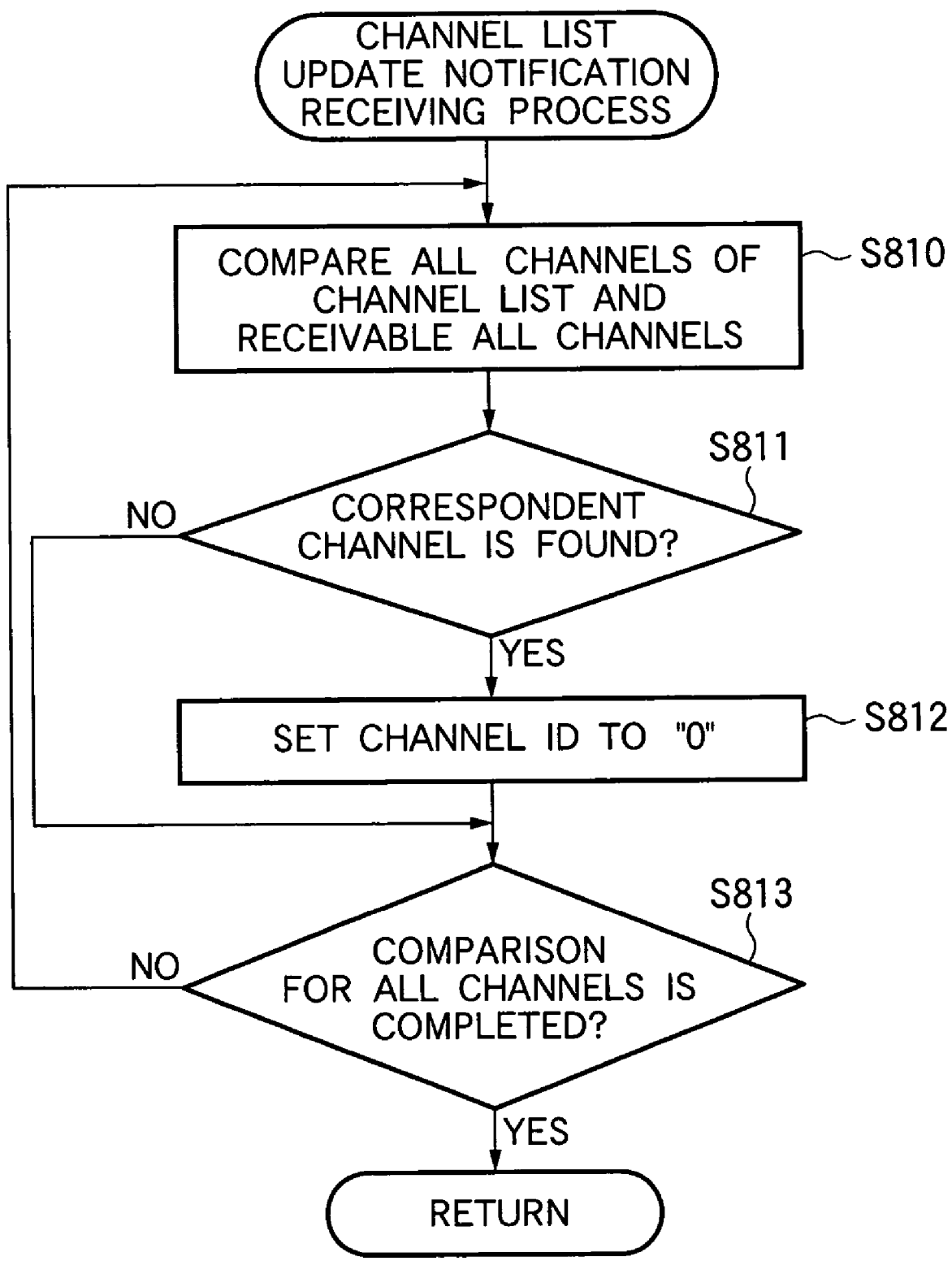
FIG. 44 is a flowchart showing a channel-list update notification receiving process in the twelfth embodiment.

FIG. 43 and FIG. 44 are flowcharts showing viewing history storing process executed by the program software under control of the channel controller 25 in the twelfth embodiment. FIG. 43 is a diagram showing the entire channel list updating process.

FIG. 43 is a diagram showing the entire viewing history storing process in the twelfth embodiment. The viewing history storing process in the twelfth embodiment includes three tasks of the timer notification receiving process (step S803), the channel change notification receiving process (step S804), and the channel list updating process (step S805). The channel controller receives an instruction from the remote control unit 5 or a notification from the timer 24 in the form of a message and executes the corresponding task.

As shown in FIG. 43, in the viewing history storing process, the channel controller waits for a message, that is, an instruction from the remote control unit 5 or a channel list update notification (step S800). When receiving a message, the channel controller determines whether or not the message relates to the viewing history (step S801). When the message relates to the viewing history, the channel controller determines any of the channel change notification, the timer notification, and the channel list update notification (step S802).

The "channel list update notification" is transmitted when a predetermined button is pressed on the remote control unit 5. When the message indicates the channel list update notification, the channel controller executes channel-list update notification receiving process (step S805) to be described later. When the message indicates the channel change notification, the channel controller executes the channel change notification receiving process (step S804) described in the second embodiment. When the message indicates the timer notification, the channel controller executes the timer notification receiving process (step S803) described in the second embodiment.

After executing the step S803, S804, or S805, the channel controller returns to the message reception waiting operation (step S800), and waits for the next message. When the message received at the step S800 indicates the end notification output from the remote control unit through its power-off operation or the like (step S807), the channel controller terminates the viewing history storing process.

FIG. 44 is a flowchart showing details of the channel-list update notification receiving process (step S805 in FIG. 43). In the channel list update notification receiving process, the channel controller 25 searches the memory area (not shown) having the channel organization of broadcast stations stored therein for all receivable channels (step S810), and compares the service ID and the network ID exemplified in FIG. 10 (step S810). When there is a channel not coinciding with any set of the receivable service ID and network ID in the channel list, the channel controller sets '0' for the channel information of the corresponding channel (steps S811, S812). When there is a channel which coincides with a set of the receivable service ID and network ID in the channel list, the channel controller holds the channel information for the channel as it is. The channel controller next determines whether or not the comparison of the service ID and network ID for all the channel IDs included in the channel list was completed (steps S811, S813), and waits for the next message (step S800 in FIG. 43).

By periodically executing such channel list updating process as mentioned above, the device can easily cope with the latest channel organization while eliminating the need for directly modifying the already stored viewing history, when the receivable service channel was changed as when the channel organization was changed or as when the channel so far receivable became unreceivable due to location shift.

FIGS. 45A to 45C are tables for describing an example of the channel list updating process in the twelfth embodiment. As has been described above, the receivable channel is sometimes incremented or decremented by a change in the channel organization of a broadcast station or the like. Even in the viewing history storing process of the second and third embodiments, when a new channel is viewed, a channel ID is added to the channel list, together with the service ID and network ID of the corresponding channel. However, in the twelfth embodiment, the channel ID corresponding to the old channel is set to '0'.

It is assumed in an example of FIG. 45A that there is no receivable channel which corresponds to a set of the service ID of '80' and the network ID of CS in receivable channels registered in the channel list. This occurs, for example, when channel '80' of the CS satellite broadcast disappears. In this case, as shown in FIG. 45B, the channel ID corresponding to the channel having the service ID of '80' and the network ID of CS is set to '0'.

In the case where there is a channel to be added to the channel list, if the size of the channel list is not larger than an allowable maximum value, then the channel controller adds '1' to the maximum value of the then channel ID to use it as a new channel ID, and allocates the new channel ID to the service ID and network ID of the channel to be added. Then the size of the channel list reaches the allowable maximum value, the channel controller searches the channel list for a channel having the channel ID of '0'. As shown in FIG. 45C, when there is a channel having the channel ID of '0', the channel controller uses a value corresponding to an addition of '1' to the maximum value of the then channel ID for the channel ID, and rewrites the service ID and the network ID to the service ID and the network ID of the channel to be added.

As has been described in the foregoing, by deleting and adding a channel from the channel list, the twelfth embodiment can effectively utilize the memory so far used for the channel disappeared by the channel organization or location shift, and can maintain a consistency with the viewing history created depending on the channel list without modifying the viewing history.

Thirteenth Embodiment

The thirteenth embodiment corresponds to a modified example of the second embodiment. In the foregoing respective embodiments, the viewing history is stored in the recommended program search device 9 for each time frame. However, when no updating of viewing history information was made for a duration exceeding one week (that is, when no digital broadcast program was not viewed for a duration exceeding one week), the device may treat view data of two weeks ago as data of 1 one week ago. In the thirteenth embodiment, when no updating of viewing history information was made for a duration exceeding one week, the device shifts data corresponding to a period exceeding the one week when newly updating the viewing history information or when reading out the viewing history information.

Figure 46:
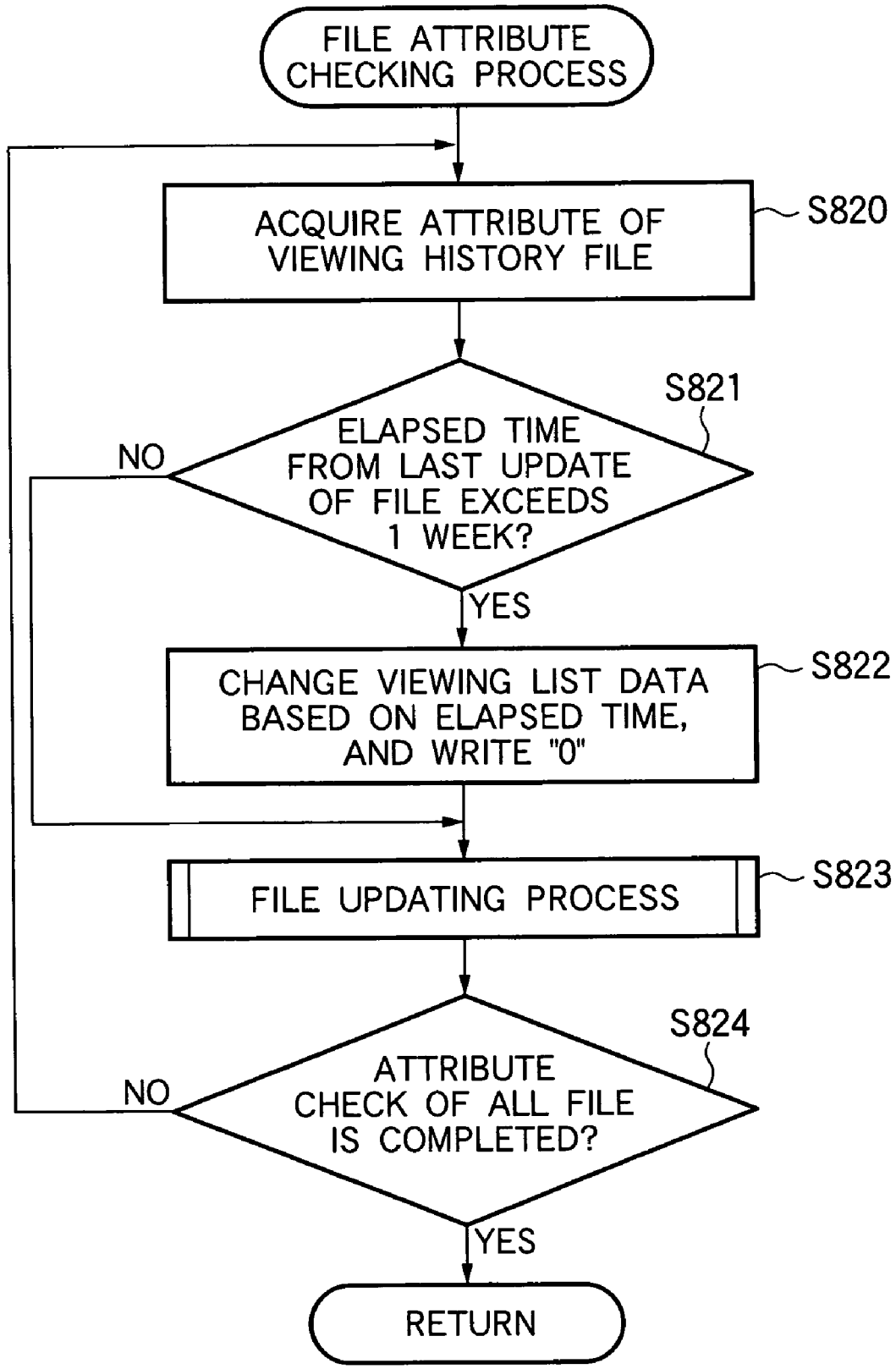
FIG. 46 is a flowchart showing a file attribute checking process in a thirteenth embodiment of the present invention.

FIG. 46 is a flowchart showing the file attribute checking operation of the viewing history executed by the program software under control of the channel controller 25 of the thirteenth embodiment.

In the file attribute checking operation, the channel controller first acquires the file attribute of the viewing history information (step S820). The device compares the last update date of the file based on the file attribute with the current time point, and determines whether or not no updating of the viewing history information was made for a period exceeding one week (step S821). When the file last update date is within one week from the current time point, the device performs the file updating process shown in FIG. 15 (step S823). In the file updating process, the device writes the latest viewing history information as data (FIG. 11) previous by one week.

When a period exceeding one week elapsed for a time period from the file last update data from the current time point, the device shifts the stored viewing history information (FIG. 11) by a period (week) exceeding one week, writes '0' for time data of the viewing history information corresponding to the shifted period (step S822), and executes the file updating process (step S823). In the file updating process, the device writes the latest viewing history information as one-week previous data (FIG. 11).

Thereafter, with respect to all files (history information, program information, etc. of viewing channels), the device determines whether or not checking of the file attribute was completed (step S824). When the checking was completed, the device terminates the file attribute checking operation.

In the thirteenth embodiment, by executing the file attribute check, the device can prevent erroneous determination of a user's favorite program on the basis of old data when the digital broadcast program has not been viewed, for example, from one month ago on.

The device executes the file attribute checking operation shown in FIG. 46 before the file update (that is, update of the viewing history information). However, the device may execute the file attribute checking operation before reading out data about the stored viewing history information.

Fourteenth Embodiment

The fourteenth embodiment corresponds to a modified example of the second embodiment When the preference of the same user was changed, when remarkable change of a program resulted in that the so-far viewing history fails to reflect the user's preference, or when the digital broadcast receiver set was transferred to another user; in order to correctly reflect the new user's preference, the fourteenth embodiment of the present invention is directed to capable of deleting the so-far viewing history according to user's intention.

Figure 47:
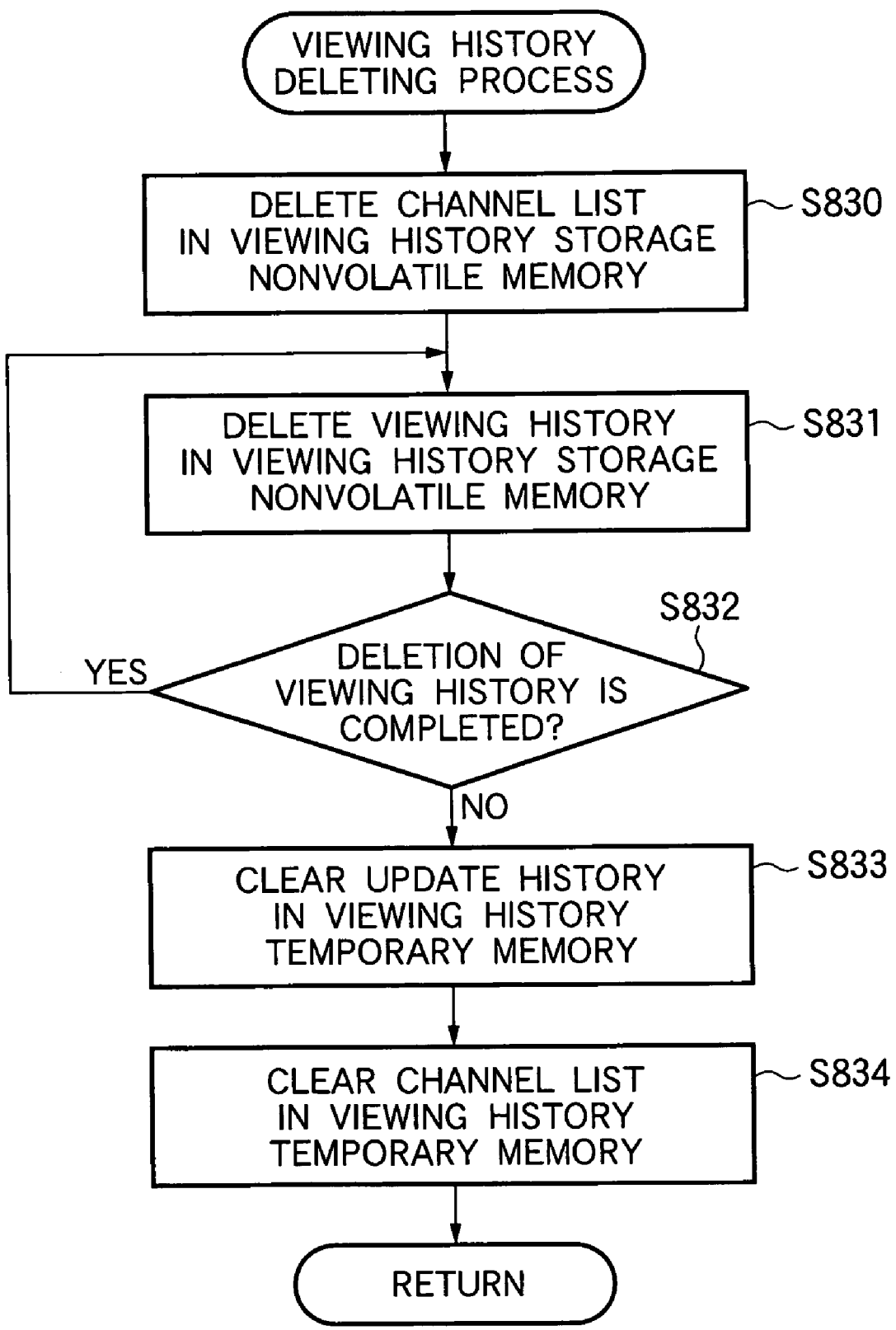
FIG. 47 is a flowchart showing a viewing history deleting process in the fourteenth embodiment of the present invention.

FIG. 47 is a flowchart showing viewing history deleting operation executed by the program software under control of the channel controller 25 in the fourteenth embodiment. In the viewing history deleting operation, all the viewing history information and the channel list are deletion targets.

In the viewing history deleting operation shown in FIG. 47, the device first deletes the channel list (step S830) and then deletes all the viewing history information (steps S831 and S832). The device then clears the update service list stored in the viewing history temporary storage memory 26 (step S833), and also clears even the channel list read out on the viewing history temporary storage memory 26 (step S834).

The viewing history deleting operation in the fourteenth embodiment is executed by the user who operated predetermined operation (for example, user's predetermined button operation of the remote control unit). However, the viewing history deleting operation may be executed when damage of internal data was confirmed.

The fourteenth embodiment can correctly reflect user's latest preference on the viewing history. In addition, when the user was changed, the device can protect old user's private information. When an unrestorable damage occurs in the channel list, the device can maintain a consistency between the channel list and the viewing history by deleting even all the viewing history prepared depending on the channel list and newly preparing new viewing history.

For example, the present invention can store a viewing history of the digital broadcast and be applied to such a device that can recommend a program tending to be viewed by the user in future.

The invention being thus described, it will be obvious that the same may be varied in many ways. Such variations are not to be regarded as a departure from the spirit and scope of the invention, and all such modifications as would be obvious to one skilled in the art are intended to be included within the scope of following claims.

What is claimed is:

1. A recommended program search device comprising:
    a broadcast receiver unit which receives a broadcast wave and converts the broadcast wave to a video signal and an audio signal;
    an operating block which is operated for channel change by a user;
    a time information acquiring block which acquires time information upon the channel change;
    a storage which stores information;
    a viewing history information acquiring block which acquires a viewing channel and a viewing time by the user for each area corresponding to a time division, the viewing history information acquiring block storing viewing history information including the viewing channel and the viewing time that are associated with each area in the storage;
    a program information acquiring block which acquires scheduled broadcast program information, including program time information enabling calculation of a program start time and a program broadcast time for a scheduled broadcast program and channel information about the scheduled broadcast program; and
    a search block which determines a user's favorite program from the scheduled broadcast program on the basis of a result of comparison between the program time information and the channel information included in the scheduled broadcast program information and the viewing channel and the viewing time stored in the storage, wherein the search block determines, as a user's favorite program, one of scheduled broadcast program broadcast on the same channel as the viewing channel included in the viewing history information, which starts broadcasting at the area start time, and the search block determines a program having a longer broadcast time in the area as a user's favorite program, when failing to detect a program which starts broadcasting at the area start time and detecting a program being broadcast an area start time and a program being broadcast at an area end time.

2. The recommended program search device according to claim 1, wherein the storage includes:

a program information storage which stores the scheduled broadcast program information acquired by the program information acquiring block;

a viewing history temporary storage memory which temporarily stores the viewing history information; and a viewing history storage nonvolatile memory which is capable of permanently holding the viewing history information therein;

the recommended program search device further comprising:

a storage controller which manages the viewing history for each area with use of the viewing history temporary storage memory, the storage controller performing a control so as to cause the viewing history information including a channel viewed by the user in the area and a viewing time of the channel to be stored in the viewing history storage nonvolatile memory.

3. The recommended program search device according to claim 1, wherein the area is a time division having a constant time duration for each day of a week.

4. The recommended program search device according to claim 2, wherein the storage controller measures a time for each unit time duration of the area or for each unit time duration which is obtained by dividing the area, the storage controller causing a cumulative sum of the viewing time of the same channel to be stored in the viewing history storage nonvolatile memory.

5. The recommended program search device according to claim 2, wherein the storage stores a channel list including a network ID for identifying a broadcast type, a service ID for identifying a service, and a logic channel associated therewith.

6. The recommended program search device according to claim 2, wherein the viewing history storage nonvolatile memory stores viewing history information for a plurality of weeks, the viewing history information including a logic channel and a viewing time for each logic channel.

7. The recommended program search device according to claim 2, wherein the storage controller, when writing the latest viewing history information including a logic channel and the viewing time in the viewing history storage nonvolatile memory, shifts the already-stored viewing history information, and writes the latest viewing history information therein, and, the storage controller, if a predetermined time period has elapsed since the oldest viewing history information was stored therein, deletes the oldest viewing history information.

8. The recommended program search device according to claim 2, wherein the time information acquiring block outputs a time notification for each division of the area or for each time duration which is obtained by dividing the area, and the storage controller writes the viewing history information in the viewing history storage nonvolatile memory every time the time notification is output.

9. The recommended program search device according to claim 2, wherein the storage controller causes the viewing history storage nonvolatile memory to further store program information regarding a program viewed in the area by the user and the viewing time of the program.

10. The recommended program search device according to claim 2, wherein the storage controller measures a time using a unit time duration, which is obtained by dividing the area, and the storage controller causes a cumulative sum of the viewing time of the same type of the program information to be stored in the viewing history storage nonvolatile memory.

11. The recommended program search device according to claim 1, wherein the viewing history information includes information, which is obtained by associating each area with one or a plurality of the viewing channels and the viewing times for one or a plurality of weeks.

12. The recommended program search device according to claim 1, wherein the search block searches, as a search target, for a channel having a total value of weighted viewing time, when the total value is not smaller than a predetermined threshold, wherein the total value of weighted viewing time is calculated by multiplying a weight coefficient set larger as an acquisition period of the viewing history information is closer to the current time point by the viewing time obtained by the viewing history information acquiring block.

13. The recommended program search device according to claim 1, wherein, when failing to detect a program which starts broadcasting at the area start time and detecting a program being broadcast at the area start time and a program being broadcast at the area end time and when the broadcast time of the program being broadcast at the area start time is equal to the broadcast time of the program being broadcast at the area end time within the area, the search block determines both the program being broadcast at the area start time and the program being broadcast at the area end time as user's favorite programs.

14. The recommended program search device according to claim 2, further comprising:

at least one of an analog broadcast receiver unit which receives an analog broadcast wave and converts the analog broadcast wave to a first video signal and a first audio signal and an external input receiver unit which receives an external input and converts the external input to a second video signal and a second audio signal; and a switch which performs switching operation to select any of at least one of the analog broadcast, the external input, and a digital broadcast, wherein, when the digital broadcast is not selected by the switch, the storage controller stops storing the viewing history information in the viewing history storage nonvolatile memory, and when the digital broadcast is selected by the switch, the storage controller starts storing the viewing history information in the viewing history storage nonvolatile memory.

15. The recommended program search device according to claim 2, further comprising:
at least one of an analog broadcast receiver unit which receives an analog broadcast wave and converts the analog broadcast wave to a first video signal and a first audio signal and an external input receiver unit which receives an external input and converts the external input to a second video signal and a second audio signal; and
a switch which performs switching operation to select any of at least one of the analog broadcast, the external input, and a digital broadcast,
wherein, when the external input is selected by the switch, the storage controller stops storing the viewing history information in the viewing history storage nonvolatile memory, and when the digital broadcast or the analog broadcast is selected by the switch, the storage controller starts storing the viewing history information in the viewing history storage nonvolatile memory.

16. The recommended program search device according to claim 2, wherein the storage controller changes a logic channel to unreceivable network ID and service ID among network IDs and service IDs corresponding to logic channels registered in the channel list.

17. The recommended program search device according to claim 2, wherein, when reading out the viewing history information stored in the viewing history storage nonvolatile memory or writing the latest viewing history information in the viewing history storage nonvolatile memory, the storage controller determines the last update date of the viewing history information, and when the last update date elapses by a time period exceeding one week from the last update date, the storage controller shifts the viewing history information by a time period corresponding to the elapsed duration.

18. The recommended program search device according to claim 2, wherein, when a predetermined operation is conducted by the user or when the storage controller confirms a damage of the viewing history information stored in the viewing history storage nonvolatile memory, the storage controller deletes the stored viewing history information.

19. The recommended program search device according to claim 2, wherein the channel list includes a network ID for identifying a type of broadcast, a service ID for identifying a service, and a logic channel associated therewith, and wherein, when a predetermined operation is conducted by the user or the storage controller confirms a damage of the viewing history information stored in the viewing history storage nonvolatile memory, the storage controller deletes the channel list in addition to the stored viewing history information.

20. The recommended program search device according to claim 2, wherein the time information includes a date, a day of the week and a time upon the channel change.

21. A method of searching for a recommended program to be executed by a device comprising:
a broadcast receiver unit which receives a broadcast wave and converts the broadcast wave to a video signal and an audio signal;
an operating block which is operated for channel change by a user;
a time information acquiring block which acquires time information upon the channel change; and
a storage which stores information,
the method comprising the steps of:
acquiring a viewing channel viewed by the user and a viewing time thereof for each area corresponding to a predetermined time division and storing viewing history information having the viewing channel and the viewing time associated with each area in the storage;
acquiring scheduled broadcast program information including program time information capable of calculating a program start time of a scheduled broadcast program and a program broadcast time thereof and including channel information on the scheduled broadcast programs; and
determining a user's favorite program from the scheduled broadcast programs on the basis of a result of comparison between the program time information and the channel information included in the scheduled broadcast program information and the viewing channel and the viewing time stored in the storage,
wherein a search block determines, as a user's favorite program, one of scheduled broadcast program broadcast on the same channel as the viewing channel included in the viewing history information, which starts broadcasting at the area start time, and
the search block determines a program having a longer broadcast time in the area as a user's favorite program, when failing to detect a program which starts broadcasting at the area start time and detecting a program being broadcast an area start time and a program being broadcast at an area end time.

22. The method of searching for a recommended program according to claim 21,
wherein the storage includes:
a program information storage which stores the scheduled broadcast program information acquired by the program information acquiring block,
a viewing history temporary storage memory which temporarily stores the viewing history information, and
a viewing history storage nonvolatile memory which is capable of permanently holding the viewing history information;
the method further comprising the steps of:
temporarily storing a user's viewing history in the viewing history temporary storage memory to mange the viewing history for each area of a predetermined time division, and
storing viewing history information including a channel viewed by the user in the area and a viewing time of the channel in the viewing history storage nonvolatile memory.

23. A recommended program search device comprising:
a broadcast receiver unit which receives a broadcast wave and converts the broadcast wave to a video signal and an audio signal;
an operating block which is operated for channel change by a user;
a time information acquiring block which acquires time information upon the channel change;
a storage which stores information;
a viewing history information acquiring block which acquires a viewing channel and a viewing time by the user for each area corresponding to a time division, the viewing history information acquiring block storing viewing history information including the viewing channel and the viewing time that are associated with each area in the storage;
a program information acquiring block which acquires scheduled broadcast program information, including program time information enabling calculation of a program start time and a program broadcast time for a scheduled broadcast program and channel information about the scheduled broadcast program; and
a search block which determines a user's favorite program from the scheduled broadcast program on the basis of a result of comparison between the program time information and the channel information included in the scheduled broadcast program information and the viewing channel and the viewing time stored in the storage, wherein, when failing to detect a program which starts broadcasting at the area start time and detecting a program being broadcast at the area start time and a program being broadcast at the area end time and when the broadcast time of the program being broadcast at the area start time is equal to the broadcast time of the program being broadcast at the area end time within the area, the search block determines both the program being broadcast at the area start time and the program being broadcast at the area end time as user's favorite programs.

24. A method of searching for a recommended program to be executed by a device comprising:

a broadcast receiver unit which receives a broadcast wave and converts the broadcast wave to a video signal and an audio signal;

an operating block which is operated for channel change by a user;

a time information acquiring block which acquires time information upon the channel change; and a storage which stores information, the method comprising the steps of:

acquiring a viewing channel viewed by the user and a viewing time thereof for each area corresponding to a predetermined time division and storing viewing history information having the viewing channel and the viewing time associated with each area in the storage;

acquiring scheduled broadcast program information including program time information capable of calculating a program start time of a scheduled broadcast program and a program broadcast time thereof and including channel information on the scheduled broadcast programs; and determining a user's favorite program from the scheduled broadcast programs on the basis of a result of comparison between the program time information and the channel information included in the scheduled broadcast program information and the viewing channel and the viewing time stored in the storage, wherein, when failing to detect a program which starts broadcasting at the area start time and detecting a program being broadcast at the area start time and a program being broadcast at the area end time and when the broadcast time of the program being broadcast at the area start time is equal to the broadcast time of the program being broadcast at the area end time within the area, a search block determines both the program being broadcast at the area start time and the program being broadcast at the area end time as user's favorite programs.

* * * * *